United States Patent [19]
Evans et al.

[11] 4,041,487
[45] Aug. 9, 1977

[54] LOW ELEVATION ANGLE RADAR TRACKING SYSTEM

[75] Inventors: Norol T. Evans, San Pedro; Barry S. Pearlstein, Anaheim; Merlin A. Job, Fullerton; Donald L. Hoagland, Newport Beach, all of Calif.

[73] Assignee: Hughes Aircraft Company, Culver City, Calif.

[21] Appl. No.: 654,822

[22] Filed: Feb. 3, 1976

Related U.S. Application Data

[63] Continuation-in-part of Ser. No. 455,698, March 25, 1974, abandoned.

[51] Int. Cl.² .............................................. G01S 9/02
[52] U.S. Cl. ................................. 343/7.5; 343/16 LS
[58] Field of Search ...................... 343/7.4, 7.5, 16 LS

[56] References Cited

U.S. PATENT DOCUMENTS

| 2,464,258 | 3/1949 | Prichard | 343/16 LS |
| 2,721,320 | 10/1955 | Sommers, Jr. | 343/7.4 |
| 2,784,400 | 3/1957 | Ehrenfried | 343/7.4 |
| 2,817,835 | 12/1957 | Worthington, Jr. | 343/7.4 X |
| 3,849,779 | 11/1974 | Boyd | 343/16 LS X |

Primary Examiner—Malcolm F. Hubler
Attorney, Agent, or Firm—Martin E. Gerry; W. H. MacAllister

[57] ABSTRACT

A radar set for providing accurate low elevation angle tracking of targets by means of controlling the magnitudes of radar detection level which are sequentially switched so that either of a pair of beams is greater in magnitude than is used for two beam tracking.

19 Claims, 6 Drawing Figures

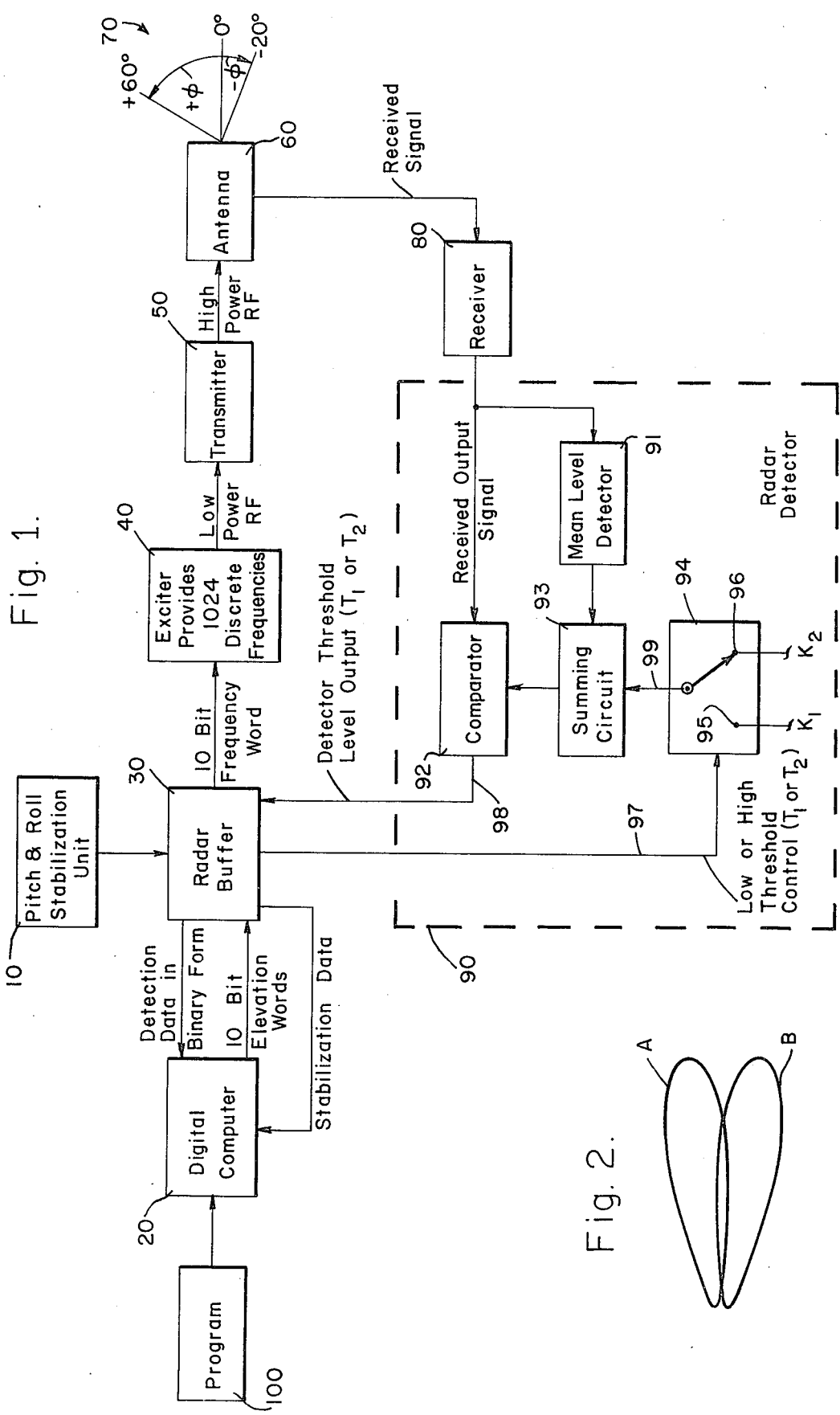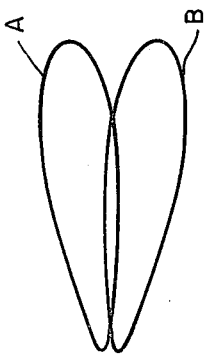

\* Note – If Single Beam Tracking were Used $\Delta\phi = 0$

\*\* Note – In the Actual System These Calculations are Performed in Direction Cosines. They are Shown as Angles for Simplicity.

LOW ELEVATION ANGLE RADAR TRACKING SYSTEM

U.S. GOVERMENT INTEREST

This invention was mechanized under contract with the United States Navy Department.

CROSS-REFERENCED APPLICATION

This application is a continuation-in-part of copending application Ser. No. 455,698 filed Mar. 25, 1974 now abandoned.

BACKGROUND OF THE INVENTION

This invention is in the field of low elevationangle radar tracking, and specifically addressed to a system that enables such tracking to be accurately obtained.

one of the major requirements for radar system including ship-based, land-based and airborne radar system, is to have a tracking system, which may be automatically controlled, for low angle targets such as aircraft.

Because of the earth's curvature, target aircraft are generally of the low-flying short to medium range aircraft, and medium to high flying aircraft at greater ranges.

To understand the problems encountered in the prior art, a brief description of angular elevation tracking heretofore utilized is necessary.

In a pencil beam electronic scanned radar system, the basic approach used for tracking targets in either azimuth or elevation angles is to obtain two masures of the target's position, "beam-split" the resultant measures for accuracy, and then feed the beamsplit information to a track smoothing computer routine which takes out any short term transient measurement errors and produces a smooth plot of the target's actual position. The measures are obtained by either a sequential lobing technique, that is firing two beams, one on each side of the expected predicted target position, or by a monopulse technique wherein two apparent receive beams equally spaced about the transmit beam position are formed. In the former case, the difference in the response of the two transmit beams is then used to provide a measure of how far from the predicted position the actual target is located. For example, the amplitude response of one beam will be greater than that of the other beam since the actual target may be closer to the position of the peak of said one beam, that is, close to the nose of such beam.

However, some of the problems encountered in any of the systems heretofore used were in prior attempts to permit low angle tracking, substantially unsuccessful. Such prior attempts ignored the problem of tracking long range targets and relied on an operator to track reacquisitions of short range targets. Though it may be possible to track short range targets in view of such targets being visible on a search PPI display, it is obviously both ineffective as well as inefficient when more than a few targets are simultaneously present.

Further, the following specific problems prevail in prior art tracking:

Low angle tracks beyond the clutter processing range, that is targets at long range, would get pulled off the target and follow clutter. This would often lead to track splitting situations and hence an observer would lose control of a tracking situation because track symbols would literally be running wild across the display face.

Tracks of low angle medium to long range targets would become lost. They would be pulled off the target track due to multipath effects which produced inaccurate amplitude responses from the beams. This inaccuracy is especially deleterious in a sequential lobing situation, such as is used in a typical radar system, since the two beams are fired at different times and hence have different multipath amplitude distortions.

Low angle short range tracks would be lost due to distortion of the transmit-receive beams. This is caused by part of the beam pattern to be directly in line with the ground or sea and create distortion due to the lower elevation portion of the beam interferring with the ground or sea surface. A distorted beam will not provide true amplitude response and hence the resultant beam splitting would indicate a wrong position for the target.

In order to allow the radar system to operate so as not to be troubled by the above problems, a "fix" was incorporated, which merely dropped all low angle (less than 0.3° ) tracks. This, of course, was not a remedy for insofar as acquisition or tracking of low angle targets, but was rather an avoidance of the problems inherent to the system at that time.

Hence the system heretofore employed was one that did not permit successful tracking of low elevation targets.

Several papers given on this subject also attempted unsuccessfully to resolve the above-stated problem as to low angular targets, at the Proceedings of the International Conference at London, England on Oct. 23-25, 1973.

Paper A74-12376, entitled Accurate Tracking of Low Elevation Targets Over the Sea with Monopulse Radar was published in the publication of English Institution of Electrical Engineers, 1973, pages 160-165. This publication relates to a monopulse radar tracking of targets whose elevation is less than the radar beamwidth above a sea surface. Such tracking becomes unreliable since the radar system tries to null on a composite signal of the target and its image. It is shown that there is a continuous locus equilibrium positions which the radar may follow, as well as isolated regions of equilibrium about the image which can cause loss of tracking. Various schemes are discussed for maintaining track and obtaining elevation data on a low-flying target. The solution however requires three independent beams and hence a complex radar system.

Paper A74-12374, entitled The Low-Angle Tracking Problem, was published in the English publication of the Institution of Electrical Engineers in 1973, pages 146-153. This publication relates to the amplitude and angularspread characteristics of radar reflections from earth surface irregularities, examined on the basis of data obtained from communications experiments. The basic phenomena of surface relfection are shown to produce irregular and unpredictable components as well as the specular (image) reflections. The effects of such on radar tracking are evaluated by considering the combination of the target and reflection signals as a glinting target extended in azimuth and elevation but occupying the same range resolution cell as the desired target.

Paper A74-12377, entitled Multi-Frequency Complex Angle Tracking of Low Level Targets, was published in the English publication of The Institute of Electrical Engineers in 1973, pages 166–171. This publication states that radar tracking of a low-flying target becomes unsatisfactory when the target is at an elevation of less than about two thirds of the radar beamwidth above a fairly smooth surface. This is due to 'glint' between the target and its image, which merge into an unresolved double target. The relative sum and difference signals can be processed to yield a complex indicated angle, but this complex angle cannot be used to determine the real angle uniquely without more information. The present paper describes a method for determination of the real angle by using complex angle measurements at more than one frequency. Digital computer simulation studies of the method indicate that it provides considerable improvement in low-level tracking over a smooth surface, but marginal improvement over rough surfaces. The limiting factor is frequently diffuse reflection from a rough surface, and it appears that this will also limit other methods of implementing complex-angle tracking.

It may be seen from the foregoing that the prior art radars and studies thereof have not provided accurate low elevation and angle target tracking.

In an attempt to overcome the problem of tracking multiple fast moving and low flying targets, a computer program was utilized in conjunction with the radar system. Though it was possible to track at lower elevation angles than heretofore with use of computer software, when used with the low angle mode for single beam tracking, a high false alarm rate of prevailing targets resulted.

INVENTION SUMMARY

Therefore, it is an objective of this invention to provide accurate tracking capability in a radar system for acquisition of low elevation and azimuth angle flying targets as well as acquisition of high angle targets.

Another objective is to provide such radar system with automatic tracking control to make possible handling of numerous targets at the same time.

A further objective is to enable such radar system to operate monopulse as well as to provide multiple sequential signal pulse outputs.

A still further objective is to enable the radar system to track short as well as long range targets.

Yet another objective is to prevent long range target clutter occurring by virtue of track splitting situations, and to prevent loss of low angle data within such clutter.

Still a further objective is to avoid multipath amplitude distortions particularly due to sequential lobing of two radar beams fired at different times and hence to avoid inaccuracies in tracking resulting therefrom.

Yet a further objective is to avoid loss of low angle short range tracks due to the aforesaid distortion of the transmit/receive beams by virtue of the beam pattern being directly in line with ground or sea surface, and thereby avoid beam splitting that results in wrong target position indication.

Briefly, according to this invention, since detection of received radar signals is performed in the radar system, two detection levels or modes of operation are utilized.

A first mode or detection level is utilized for normal tracking. A second mode or detection level is utilized for low elevation tracking of targets. In the second mode, where adjacent sequential elevation beams are used, detection of signals are required only on either of the two beams. In order to prevent false alarms in either of the tracking modes, the second mode of operation or detection level is set about 3db higher in amplitude than the first mode or detection level by means of suitable circuitry that may be built into the receiver detector or provided externally thereto.

BRIEF DESCRIPTION OF DRAWINGS

FIG. 1 is a schematic diagram of a radar system in accordance with this invention.

FIG. 2 is a representation of seuquentially switched antenna lobes in elevation by the radar system.

DETAILED DESCRIPTION

Referring to FIG. 1, a radar transmitter-receiver system is shown, inclusive of the inventive subject matter, used for elevation beam steering.

Stabilization data source 10 comprises the pitch and roll control unit for input to the radar system which feeds data into radar buffer 30 in conventional manner. Such stabilization data is provided as an input to digital computer 20 through buffer 30 in form acceptable by computer 20.

Computer 20 provides ten bit binary words to radar buffer 30 input corresponding to the required degrees of elevation of the radar antenna in accordance with table (1) hereinbelow generally illustrating several degrees of antenna elevation and their binary word equivalent, as exemplary.

Figure 4:
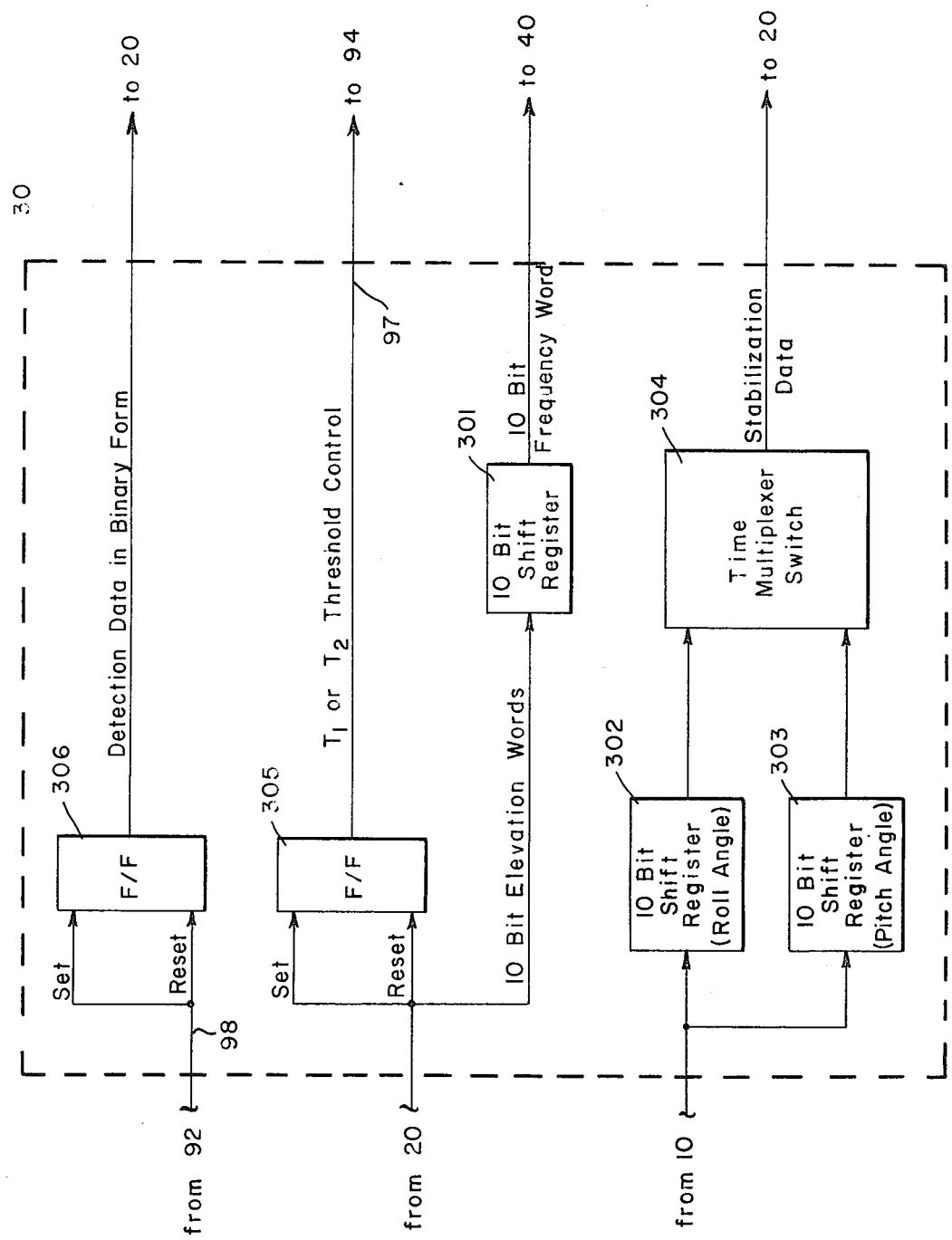
FIG. 4 is a detailed block schematic of the radar buffer shown in FIG. 1.

Such stabilization data provided by source 10 is dumped into 10 bit shift register 302 for temporarily storing roll angle information and into 10 bit shift register 303 for temporarily storing pitch angle information. Input data to registers 302 and 303 is supplied to compensate angular deviation of pitch and roll with respect to reference plane coordinates, which coordinates are provided in computer program 100, and time multiplexer switch 304 will enable roll and pitch angle information to be supplied in sequence to computer 20. Registers 302 and 303 and multiplexer 302 are shown in FIG. 4.

| ANTENNA BEAM ELEVATION COVERAGE | | |
| --- | --- | --- |
| Degrees of Beam Elevation | 10 Bit Binary Form Elevation Word | |
| +60.0 | 0000000000 | |
| +59.9 | 0000000001 | |
| 0 | 0101001100 | (1) |
| −20.0 | 1111111111 | |

Computer 20, by receiving the stabilization data, is enabled to compute the exact elevation of the horizon.

Radar buffer 30 in the return path and resulting from an output of the detector, to be hereinbelow described in greater detail, provides detection data in binary form as an input to computer 20 for processing thereby.

Radar buffer 30 converts the ten bit binary elevation words into ten bit frequency words provided as input to exciter 40. Exciter 40 is designed to provide 1024 discrete frequencies, each frequency representing a specific elevation position of the radar antenna corresponding with the elevation position range shown in table (1). Accordingly, there are 1024 beam positions covering an 80° elevation range in 0.078 degree steps.

The computer adds a half beamwidth or a value of 6 of the 0.078 degree steps to the computed horizon value, and this is the lowest elevation angle sent to buffer 30.

At the appropriate time, the elevation word in terms of frequency is sent to exciter 40 for selection of the required discrete frequency. The selected frequency is fed at low RF power to a suitable amplifier within transmitter 50, and output of transmitter 50 at high power level is fed to radar antenna 60.

Antenna 60 has a frequency scan characteristic as to elevation, so that the selected frequency by exciter 40 determines the elevation angle, as shown in exemplary fashion in table (1), at which the antenna beam, as at 70, is transmitted and/or received. Antenna beam 70 is shown in terms of the earth's horizon at 0°, the angle above the horizon indicated as $+\phi°$, and the angle below the horizon during pitch of the ship bearing the radar system as being $-\phi°$.

It should be noted that when the radar system is installed on a ship the horizon will be constantly changing with respect to the ship's pitch and consequently the zero reference portion of angle $\phi$ as at 70 will be adjusted with change in pitch.

Referring to both FIGS. 1 and 2, and with specific reference to FIG. 2, a pair of antenna lobes A and B as conventionally transmitted by a monopulse radar system at a predetermined sequential period are shown in elevation, and are representative of antenna beam 70.

Though several methods are used for transmitting and receiving radar energy, in the final analysis it is necessary to sequentially switch radar antenna 60 to provide lobe pair A and B in a predetermined sequence.

Lobes A and B will therefore not be present at the same instant of time, but generally lobes A and B will be usable to detect higher flying targets at which time switch 94 will be positioned by means of flip-flop 305, shown in FIG. 4, providing output signal at 97 which activates and switches switch 94, at contact 95 in order to obtain normal offset signal and hence a lower threshold value as seen from table (4) hereinbelow. Either Beam A or B may be used to detect low flying targets in which case switch 94 will be positioned at 96 in order to obtain an offset signal higher by 3db than the offset signal when switch 94 is set at 95 position, and consequently obtain a threshold level higher by 3db than the threshold level when switch 94 is set at position 95, also as seen from table (4) hereinbelow.

It is therefore obvious that selection of high or low threshold levels will be controlled by buffer 30 and may be predetermined by appropriate time sequence controlled by computer 20.

One method used in conventional monopulse radar systems is to receive the sequentially switched antenna lobes A and B in elevation. Another method used is to transmit the sum of the lobes as a single beam and receive either the resultant of the sum and difference of the received beam pair. However, in the latter instance two antenna lobes result anyway, so that insofar as developments of the novel approach herein, the circuitry within the detector to be hereinafter described would generally be applicable and representative of either method.

A signal reflected from a target as sensed by antenna 60 is fed by such antenna to receiver 80.

The output of receiver 80 is generally fed to several components of radar detector 90, as inputs to mean level detector 91 and comparator 92. The output of mean level detector 91 provides a voltage level input to summing circuit 93.

Data from comparator 92 is processed by computer 20, however such data is inputted to flip-flop 306 shown in FIG. 4 to pass or reject the data in accordance with the logic as stated in the truth table at (5) relative flip-flops 305 and 306. Data from flip-flop 306 is passed to computer 20 for processing same, and data from flip-flop 305 provided by computer 20 is passed at 97 to switch 94 to change its position as required.

Threshold level switch 94 is illustrated as a two position mechanical switch (but may be an electronic type switch), which is positioned either at position 95, which is the normal operational threshold level position, or at position 96 which is the position for low altitude operation of the radar system.

An offset signal level $K_1$, which may be a series of binary pulses such as those comprising a five bit binary word, is supplied from within detector 90 to terminal 95. Likewise, an offset signal level $K_2$, also a binary word, is supplied to terminal 96 of switch 94. Switch 94 is controlled as to its position at either 95 or 96, by means of switch command at 97 in order to select threshold $T_1$ or $T_2$.

Accordingly, either threshold level $T_1$ or $T_2$ will be provided at 98 as input to radar buffer 30. Hence, either $T_1$ or $T_2$ threshold will be provided to buffer 30 by summing the signal obtained at 99 with the detected means level voltage provided to summing circuit 93, the output of summing circuit 93 being fed to comparator 92 to provide either $T_1$ or $T_2$ threshold. Threshold levels $T_1$ and $T_2$ are defined by the following equational relationships:

$T_1 = M + K_1$
where $T_1$ is the threshold level for
   normal tracking operation
M is the mean level signal
   provided by mean level
   detector 91
$K_1$ is the offset signal level
   for normal radar elevation
   operation
and, where typically $T_1$ might be in
   the order of 7db. (2)

$T_2 = M + K_2$
where $T_2$ is the threshold level for
   low altitude tracking
   operation
M is the mean level signal
   provided by detector 91
$K_2 = K_1 + 3db$ which is the
   higher offset signal level
   to raise the threshold
   level about 3db above $T_1$. (3)

For a better understanding of the threshold level requirements as inputs to buffer 30, the following table shows signals required in terms of beams A and B for the two modes of operation of the radar system.

| Required for Normal Operational Mode | Required for Low Altitude Operational Mode | |
| --- | --- | --- |
| $T_1$ detection on beam A AND $T_1$ detection on beam B | $T_2$ detection on Beam A OR $T_2$ detection on beam B | (4) |

In the normal operational mode, detection of both beams A and B at threshold level $T_1$ is required to provide date output from buffer 30.

In the low altitude operational mode, detection of either beams A or B at threshold level $T_2$ is sufficient to provide output from buffer 30.

No detailed circuits are required for any of the components discussed, such as components 10, 20, 30, 40, 50, 60 and 80 as these are known in the art. As to radar detector 90, the components thereof such as 91, 92, 93 and 94 are each individually known in the art as circuits, however the method of switching between different threshold levels to provide one pair of beams to be of greater mangitude than the other is not known in the art.

Figure 3A:
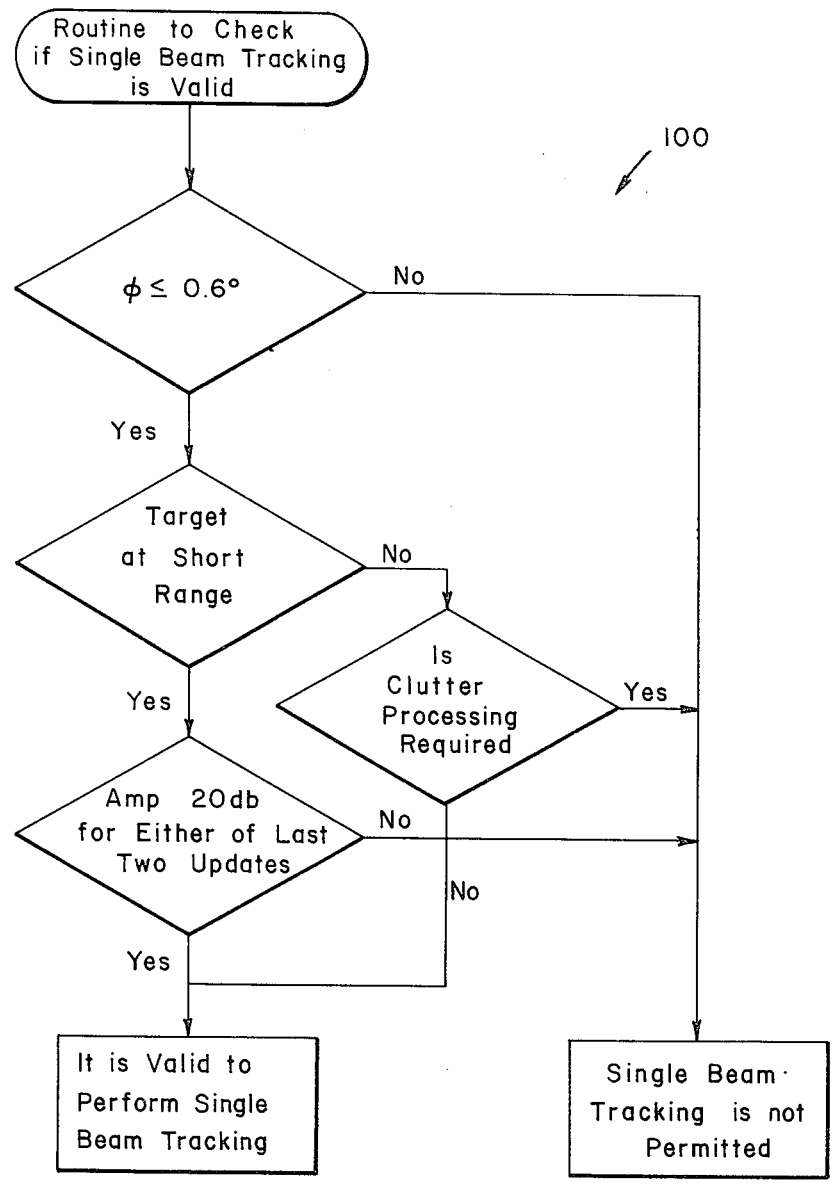
FIG. 3 is an algorithmic representation of several routines denoted as FIGS. 3a, 3b and 3c and converted into machine language to program a computer for rapid control and operation of the radar system. For convenience of discussion FIGS. 3a, 3b and 3c will be referred to hereinbelow as FIG. 3.
Figure 3B:
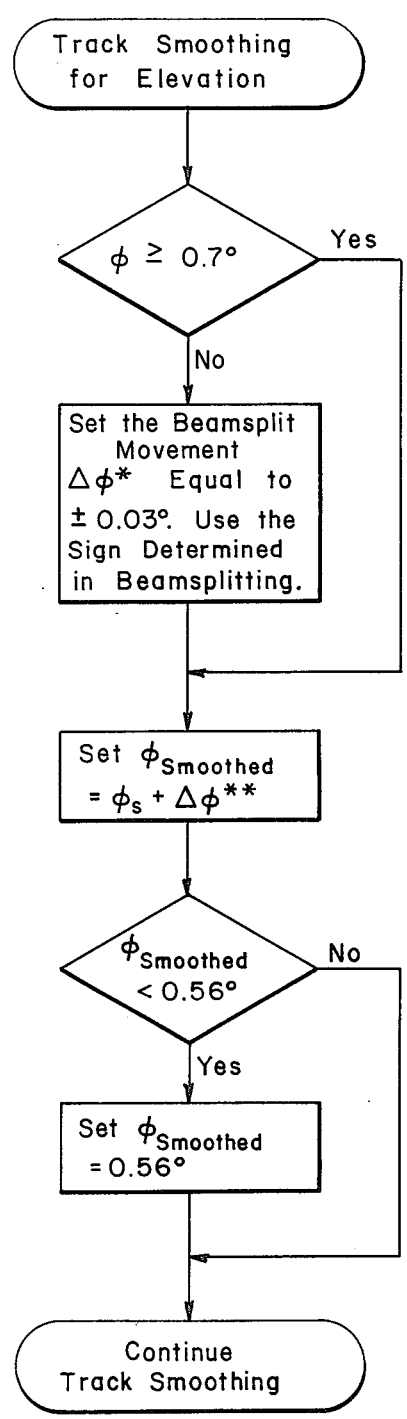
Figure 3C:
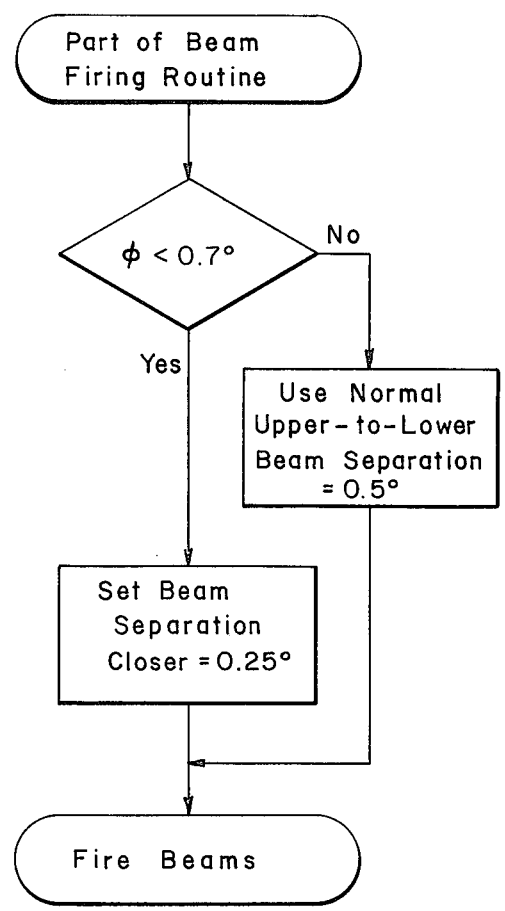

Referring to FIGS. 1, 2 and 3, and particularly to FIG. 3, algorithms from which a computer program designated at 100, are shown; algorithms 100 are directed to routines to check if single beam tracking is valid, for track smoothing for elevation, and for beam firing routine.

The actual computer 20 used was UNIVAC MODEL 1230.

The computer language used is SIMON SYCOL which is a UNIVAC COMPILER language. The actual computer program implementing algorithms 100 is submitted with this specification.

The basic concept of the single beam low elevation tracking technique is to allow a track's range, azimuth and amplitude data to be updated from only one of the two sequentially-lobed beam pairs A or B. In addition, the technique limits the lowest point at which the beam may be fired in elevation. The decision to use a single beam's return, or both beam returns, is based on logic criteria which is described hereinbelow.

The logic criteria are functions of target range, maximum clutter processing range of the system, target elevation, and return signal amplitude. As can be seen from the logic criteria and the algorithmic flow diagrams of the FIG. 3, other less critical steps are also taken. For example as the target goes lower in elevation, the two sequential beams are brought closer together. Although this does make the beam splitting curve less sensitive, it has the advantage of keeping the lower elevation beam from being distorted and hence allows some measure of elevation angle determination through beam splitting.

In the following rules which delineate the single beam low elevation tracking technique, the particular numerical values shown are typically applicable for radar system.

If the target elevation angle, $\phi < 0.6°$ which corresponds to about 0.6 beam widths, this angle permits single beam tracking.

In order to prevent the lower beam from ever being $<0.44°$, the beam pair center is never $<0.56°$.

If the target is at short range (less than 30 nmi) perform single beam tracking only if the target amplitude is sufficiently high to be representative of a real target. This is accomplished by determining if at least one of the last two updates had an amplitude $> 20$ db. This criterion prevents false alarm problems, that is tracks running away on noise or on noise spikes.

If the target range is greater than the effective clutter processng limit, for example long range tracking, and $\phi < 0.6°$ and if it is certain that clutter processing is required to detect the target, then the target track is dropped. Such targets are prevalent at long range and are flying low over land and are therefore very low priortiy tracks for the system. If clutter processing is not required for these long range targets then single beam tracking is permitted.

Fix the amount of beam movement from update to update to small change, for example 0.078°, when the target elevation angle is $< 0.7°$, such as when multipath can have an effect. Eventually, by following the direction, although not the magnitude, of the beam split indications, tracking of the target will be successful. The update rate must be adequate such that target movement does not escape the beam movement avoiding the production of misses.

When $\phi < 0.7°$ decrease the spacing between the two elevation beams, using ½ the previous spacing.

When single beam tracking is permitted, a check of the returns of each beam is made. If either one has a return which correlates with the track, that single return is used to update the track. The track's elevation angle is kept constant. If both beams have correlating returns, then beam splitting and track update proceeds as normal, except, as discussed above, in that the amount of elevation movement permitted is restricted. The essence of this point is that single beam tracking allows, but does not require, a detection from a single beam to be used to keep a target in track.

FIG. 4, shows the three inputs and four outputs therefrom corresponding to FIG. 1. As can be seen, the components are standard storage or shift registers, flip-flops and a time multiplexer, all known in the art, to provide the means for interfacing with components of FIG. 1 designated as 10, 20, 40, 92, and 94. It should be noted that the computer program includes the handling of the various inputs and outputs shown in FIG. 4.

The threshold control signal is provided as shown in FIG. 1 by switching between positions 95 and 96 of switch 94, which threshold levels $T_1$ or $T_2$ are fed at 97 to switch 94 through flip-flop 305 by input from computer of a particular logic level at 20 which logic level is temporarily stored in flip-flop 305 (FIG. 4) until command by computer is issued to switch to another of the binary logic states to select the other threshold as needed. It is obvious that flip-flop 305 is provided to enable temporary storage of a logic state until required to change position of switch 94.

Further, table (4) shows operational modes involve threshold levels, and that the threshold control necessitates the change of position of switch 94 and the threshold control level with each change in antenna elevation.

Input data coming from pitch and roll stabilization unit 10 is shown in FIG. 1 as being inputted into buffer 30. The specification already states that the stabilization data is in form acceptable by computer 20. The binary form of data, since we are using a conventional digital computer is well known in the art. It is therefore inherent in the needs of this system that some storage of the binary data, coming from unit 10, as provided by shift registers 302 and 303 will have to be included, and that a time switching device such as time multiplexer switch 304 to switch the roll angle data words and the pitch angle data words, would have to be provided in the buffer so as to feed such words into the computer for storage and use. It should be noted that computer 20 is able to correct for pitch or roll by correcting the antenna angle by taking the data temporarily stored in registers 302 and 303 in sequence, accomplished by multiplexer 304. As to the 10 bit frequency word provided as input from the computer to exciter 40, the only requirement would be elevation word information in binary form sent by computer 20 through exciter 40 and ultimatelyto antenna 60.

With respect to flip-flop 306 of FIG. 4, this flip-flop only provides a dealy or storage of binary pulse, in terms of the binary state temporarily stored therein for providing detection data in bnary form to computer 20. It is inherent by the showing in FIG. 1 of an input of detector threshold levels $T_1$ or $T_2$, discussed above, and an output of detected data in binary form through the buffer, implying temporary storage of the binary state before sending it on to computer; any binary storage device would do for this purpose but a single one suchas flip-flop 306 is shown as satisfying this situation and implied storage function. Components herein are shown in the Radar Handbook by Skolnik, 1979, McGraw Hill, N.Y. Transmitter 50 is shown at pages 7-44 (Section 7.5) to 7-48. Antenna 60 is shown at page 13-3 (FIG. 3). FIG. 3 also shows buffer 30 in block form combined with computer 20, and transmitter 50 and a frequency generator corresponding to exciter 40. In general, pages 13-1 through 13-27 show standard ways of building the frequency scanned radar system.

With respect to buffer 30, it is a standard circuit used for isolating several components of the system from each other as shown in FIG. 4. It happens to be a convenient location for utilizing therein a means for switching switch 94 to one of two positions. In the illustrated example an electro-mechanical switch 94 is used having contacts 95, and 99 which would be realy contacts, a realy coil thereof would be triggered, symbolically shown at 97; alternatively a solid state switch could be used. The important consideration is that the programmed computer activates the switch at the appropriate time to achieve the desired condition, and hence the computer, based on input information received as to angle $\phi$ level, will command switch 94 to operate as required. Both the flow diagrams FIGS. 3a-3c and the actual computer program used, show the part the computer plays in this regard. As to component 10, this is shown in Radar System Engineering by Ridenour, Radiation Laboratory Series, Vol. 1, at page 308, McGraw Hill, N.Y. 1947, entitled Shipboard Antenna Stabilization. Unit 10 calculates the true horizon at two orthogonal points (box and midship) by use of a gyroscope described on page 308. This data is sent through unit 30 to unit 20 so that the next radar beam is fired not in relative but in true direction space. It should be noted that the computer tracks in true range, elevation and azimuth coordinates. The pitch and roll units measure the deviation in degrees from horizontal. The computer orders a beam fired at a selected elevation and azimuth position. The buffer corrects these angles based on the pitch and roll angles detected, as aforesaid. The buffer 30 is simply a temporary storage unit that interfaces with the real time radar and the programmable computer unit 20. Exciter 40 is simply a group of oscillators providing the 1024 different frequencies.

It should be noted that the Skolnik textbook at page 22-13 (Section 22.3)discusses the problem of reflections at low elevation angles. It states that very poor performance occurs when the beam is pointed one beamwidth above the surface. However demonstration by actual flight testing, good performance at greater than 0.44 beamwidths above the surface, was exhibited with the instant system.

APPENDIX - SIMON SYCOL COMPUTER PROGRAM

```
41077  CFL  0101                                        *
41100  CFB  0000                                        CFB     SYS-PROC  DINSMOOR   2/9/70
41101  C-B  0001                                        ************************************************************
41102  CFB  0020   P113633  00000 A00000 030000         PROCEDURE CFB
41103  CFB  0045   P113634  60130 P73633 113633         RETURN RIL
41104  CFB  0046                                        END-PROC  CFB
41105  CFL  0047                                        *
41106  CFB  0048                                        *
41107  TRAB 0000                                        TRAB    SYS-PROC- JBB SPS-33
41110  TRAB 0001                                        ************************************************************
41111  TRAB 0002                                        ************************************************************
41112  TRAB 0003                                        *
41113  TRAB 0004                                        *       BEAMSPLIT CALCULATES THE TARGET AZIMUTH AND
41114  TRAB 0005                                        *       ELEVATION DIRECTION COSINES USING MEASUREMENTS
41115  TRAB 0006                                        *       TAKEN FROM THE PAIR OF RADAR RETURNS SELECTED BY
41116  TRAB 0007                                        *       TRACK CORRELATION.  THE STABILIZATION ROUTINE IS
41117  TRAB 0008                                        *       THEN CALLED TO TRANSFORM THESE COSINES FROM THE
41120  TRAB 0009                                        *       ANTENNA TO THE STABLE COORDINATE SYSTEM.
41121  TRAB 0010                                        *
41122  TRAB 0011                                        *       INPUTS
41123  TRAB 0012                                        *                REGISTERS
41124  TRAB 0013                                        *                    B2, B3, B4,
41125  TRAB 0014                                        *                VARIABLES
41126  TRAB 0015                                        *                    NONE
41127  TRAB 0016                                        *                TABLES
41130  TRAB 0017                                        *                    SDTESID, SDTTS, TRTWRK
41131  TRAB 0018                                        *       OUTPUTS
41132  TRAB 0019                                        *                REGISTERS
41133  TRAB 0020                                        *                    NONE
41134  TRAB 0021                                        *                VARIABLES
41135  TRAB 0022                                        *                    NONE
41136  TRAB 0023                                        *                TABLES
41137  TRAB 0024                                        *                    SOTUS
41140  TRAB 0025                                        *
41141  TRAB 0026                                        *       PROCEDURES REFERENCED
41142  TRAB 0027                                        *                STA
41143  TRAB 0028                                        *
41144  TRAB 0029   P113635  00000 A0003C 0.0000         PROCEDURE*TRAB-                                          160
41145  TRAB 0030                                        *                                                        160
41146  TRAB 0031                                        *       SET UP AZ, ELEV. BEAMSPLIT CONSTANTS BASED ON    160
41147  TRAB 0032                                        *       STATE OF TEST TARGET.                            160
41150  TRAB 0033                                        *                                                        160
41151  TRAB 0034   P113636  11430 010172 050172         ENT A   W(SDVTTGON) AZERO-  IF AZERO, NO TTG             160
41152  TRAB 0035   P113637  61000 P73645 113645         JP      TRAB01-             TTG, ZERO INTO CONSTANTS    160
41153  TRAB 0036   P113640  11030 016217 056217         ENT A   W(TRVKAZBASE)-                                   160
41154  TRAB 0037   P113641  15030 016218 056216         STR A   W(TRVKAZ)-                                       160
41155  TRAB 0038   P113642  11030 016222 056222         ENT A   W(TRVKELBASE)-                                   160
41156  TRAB 0039   P113643  15030 016221 056221         STR A   W(TRVKEL)-                                       160
41157  TRAB 0040   P113644  61000 P73647 113647         JP      TRAB02-                                          160
```

```
41160  TRAB 0041   P113645  16030 016216 056216  TRAB01  STR B0    W(TRVKAZ)-                                           160
41161  TRAB 0042   P113646  16030 016221 056221          STR B0    W(TRVKEL)-                                           160
41162  TRAB 0043                                       *
41163  TRAB 0044                                       * IS A NONCORRELATED RETURN IN LOWER BEAM
41164  TRAB 0045                                       *
41165  TRAB 0046   P113647  11523 004740 044740  TRAB02  ENT A     U(TRTWRK+PXUP+B3) ANOT-                              160
41166  TRAB 0047   P113650  61000 P73776 113776          JP*TRAB1-YES
.........                                              .....EMU
41167  TRAB 0048   P113651  15030 A40166 000166          STR*A*W(SDXB0+SR2)-LOCATE UPPER RETURN
41170  TRAB 0049                                       *
41171  TRAB 0050                                       * IS A NONCORRELATED RETURN IN UPPER BEAM
41172  TRAB 0051                                       *
41173  TRAB 0052   P113652  11513 004740 044740          ENT*A*L(TRTWRK+PXL0+B3)*ANOT-
41174  TRAB 0053   P113653  61000 P74011 114011          JP*TRAB2-YES
.........                                              .....EMU
41175  TRAB 0054   P113654  15030 A40167 000167          STR*A*W(SDXB7+SR2)-LOCATE LOWER RETURN OF PAIR
41176  TRAB 0054I0                                    *                                                                 041873
41177  TRAB 0054I1                                    * SET UP FILTER FLAG, NEG. IF BOTH FILTERS BAD,                   041873
41200  TRAB 0054I2                                    *     ZERO OTHERWISE.                                             041873
41201  TRAB 0054I3                                    *                                                                 041873
41202  TRAB 0054I5  P113655  10000 A01400 001400          ENT Q    1400-     MASK FOR CP BITS                           041873
41203  TRAB 0054I20 P113656  40024 002320 042320          ENT LP   U(SDTTS+CXMIT+B4)-  CP BITS                          041873
41204  TRAB 0054I25 P113657  21400 A01400 001400          SUB A    1400 AZERO-  IF AZERO, RGPD                          041873
41205  TRAB 0054I30 P113660  61000 P73674 113674          JP       TRAB023-   NOT RGPD, LEAVE FLAG AT ZERO              041873
41206  TRAB 0054I35 P113661  10000 A07400 007400          ENT Q    7400-      MASK FOR FILTER BITS                      041873
.........                                              .....EMU
41207  TRAB 0054I40 P113662  40016 A40000 000000          ENT LP   L(DR+B6+SR2)-    FILTER BITS, UPPER RET.             041873
41210  TRAB 0054I45 P113663  15020 016236 056236          STR A    U(TRVFILTRSV)-   SAVE UPPER FILTER                   041873
.........                                              .....EMU
41211  TRAB 0054I50 P113664  40017 A40000 000000          ENT LP   L(DR+B7+SR2)-    LOWER RET. FILTER                   041873
41212  TRAB 0054I55 P113665  15010 016236 056236          STR A    L(TRVFILTRSV)-   SAVE LOWER FILTER                   041873
41213  TRAB 0054I60 P113666  11000 A01400 001400          ENT A    1400-            PREPARE FOR COMPARE                 041873
41214  TRAB 0054I65 P113667  10000 A06000 006000          ENT Q    6000-            SAME, 4 THRU 12 GOOD                041873
41215  TRAB 0054I70 P113670  04520 016236 056236          COM AQ   U(TRVFILTRSV) YOUT- IF YOUT, BAD                     041873
41216  TRAB 0054I75 P113671  61000 P72674 113674          JP       TRAB023-         LEAVE FLAG AT ZERO                  041873
41217  TRAB 0054I80 P113672  04410 016236 056236          COM AQ   L(TRVFILTRSV) YIN- IF YIN, OK                        041873
41220  TRAB 0054I85 P113673  16070 016235 056235          STR B0   CPW(TRVTRABFIL)- SET FLAG NEGATIVE                   041873
41221  TRAB 0055                                       *
41222  TRAB 0056                                       * CALCULATE CENTER CHANNEL AMPLITUDE DIFFERENCE BETWEEN BEAMS
41223  TRAB 0057                                       *
41224  TRAB 0058   P113674  10000 A00177 000177  TRAB023 ENT Q    CLOGMSK-            LABEL ADDED                       041873
.........                                              .....EMU
41225  TRAB 0059   P113675  40026 A40001 000001          ENT*LP*U(CLOG+B6+SR2)-
41226  TRAB 0060   P113676  15020 004753 044753          STR*A*U(TRTWRK+CLOGUP)-SAVE UPPER BEAM CENTER AMPLITUDE
.........                                              .....EMU
41227  TRAB 0061   P113677  42027 A40001 000001          SUB*LP*U(CLOG+B7+SR2)-
41230  TRAB 0062   P113700  15010 004753 044753          STR*A*L(TRTWRK+CLOGDF)-SAVE DIFFERENCE BETWEEN BEAMS
41231  TRAB 0063                                       *
41232  TRAB 0064                                       * IS HIT WITHIN OVERLAP REGION OF BEAMS
41233  TRAB 0065                                       *
41234  TRAB 0066   P113701  04700 A00006 000006          COM*A*TRMBOR*YMORE-
41235  TRAB 0067   P113702  61000 P74015 114015          JP*TRAB3-ABOVE
41236  TRAB 0068   P113703  04640 A77772 777772          COM*A*X-TRMBOR+1*YLESS-
41237  TRAB 0069   P113704  61000 P74003 114003          JP*TRAB4-BELOW
41240  TRAB 0070                                       *
41241  TRAB 0071                                       * CALCULATE AZIMUTH ERROR SIGNALS FOR BOTH BEAMS
41242  TRAB 0072                                       *
41243  TRAB 0073   P113705  10000 A77400 077400          ENT*Q*RLOGMSK-
.........                                              .....EMU
41244  TRAB 0074   P113706  40016 A40001 000001          ENT*LP*L(PL03+B6+SR2)-
.........                                              .....EMU
41245  TRAB 0075   P113707  42026 A40001 000001          SUB LP   U(LL0G+B6+SR2)-    TAKE OFF APOS                      113
41246  TRAB 0076                                                  DELETE                                                113
41247  TRAB 0077   P113710  03000 A00031 000031          RSH A,   250-                TAKE OFF SKIP                     113
41250  TRAB 0078                                                  DELETE                                                113
41251  TRAB 0079   P113711  22030 016216 056216          MUL*W(TRVKAZ)-
41252  TRAB 0080   P113712  15030 004754 044754          STR*A*W(TRTWRK+AESUP)-SAVE UPPER SIGNAL
41253  TRAB 0081   P113713  10000 A77400 077400          ENT*Q*RLOGMSK-
.........                                              .....EMU
41254  TRAB 0082   P113714  40017 A40001 000001          ENT*LP*L(RLOG+B7+SR2)-
.........                                              .....EMU
41255  TRAB 0083   P113715  42027 A40001 000001          SUB LP   U(LL0G+B7+SR2)-    TAKE OFF APOS                      113
41256  TRAB 0084                                                  DELETE                                                113
41257  TRAB 0085   P113716  03000 A00031 000031          RSH AQ   250-                TAKE OFF SKIP                     113
41260  TRAB 0086                                                  DELETE                                                113
41261  TRAB 0087   P113717  22030 016216 056216          MUL*W(TRVKAZ)-
41262  TRAB 0088                                       *
41263  TRAB 0089                                       * AVERAGE THESE SIGNALS
41264  TRAB 0090                                       *
41265  TRAB 0091   P113720  20030 004754 044754          ADD*A*W(TRTWRK+AESUP)-
41266  TRAB 0092                                       *
41267  TRAB 0093                                       * KEEP SIGNAL WITHIN LIMITS FOR AZIMUTH BEAMSPLITTING
41270  TRAB 0094                                       *
41271  TRAB 0095   P113721  04720 016220 056220  TPAB6   COM*A*U(TRVUAZ)*YMORE-
41272  TRAB 0096   P113722  11020 016220 056220          ENT*A*U(TRVUAZ)-
41273  TRAB 0097   P113723  04650 016220 056220          COM A LX(TRVLAZ) YLESS-
41274  TRAB 0098   P113724  11050 016220 056220          ENT*A*LX(TRVLAZ)-
41275  TRAB 0099                                       *
41276  TRAB 0100                                       * CALCULATE MEASURED AZIMUTH DIRECTION COSINE X
41277  TRAB 0101                                       *
41300  TRAB 0102   P113725  20054 002321 042321          ADD*A*LX(SDTTS+LXF+B4)-
41301  TRAB 0103   P113726  15020 011563 051563          STR*A*U(SDTUS+LXU)-SAVE UNSTABLE LX
41302  TRAB 0104                                       *
41303  TRAB 0105                                       * CALCULATE ELEVATION ERROR SIGNAL
41304  TRAB 0106                                       *
41305  TRAB 0107   P113727  10050 004753 044753          ENT*Q*LX(TRTWRK+CLOGDF)-
41306  TRAB 0108   P113730  22030 016221 056221          MUL*W(TRVKEL)-
41307  TRAB 0109   P113731  07500 A00016 000016          LSH AQ*14D*ANOT-
41310  TRAB 0110   P113732  61000 P73747 113747          JP*TRAB5-NO DEVIATION OR DISABLED
41311  TRAB 0111                                       *
41312  TRAB 0112                                       * KEEP SIGNAL WITHIN LIMITS FOR ELEVATION BEAMSPLITTING
41313  TRAB 0113I                                      *                                                                041773
41314  TRAB 0113I2                                     * IF LZ GREATER THAN 10 DEGREES, USE LARGER LIMITS              041773
41315  TRAB 0113I5                                     *                                                                041773
41316  TRAB 0113I10 P113733  15014 002315 042315          ENT Q    L(SDTTS+LZSA+B4)-    GET LZ                          041773
41317  TRAB 0113I15 P113734  04200 A05435 005435          COM Q    5435 YLESS- IF YLESS, LZ GT 10 DEGREES               041773
41320  TRAB 0113I20 P113735  61000 P73743 113743          JP       TRAB561-  LZ LT 10 DEGREES, ORIG. CODE               041973
```

| | | | | | |
|---|---|---|---|---|---|
| 41321 | TRAB 0114 | P113736 | 04720 D16225 056225 | | |
| 41322 | TRAB 01141 | P113737 | 11020 D16225 056225 | | |
| 41323 | TRAB 01142 | P113740 | 04650 D16225 056225 | | |
| 41324 | TRAB 01143 | P113741 | 11050 D16225 056225 | | |
| 41325 | TRAB 0144 | P113742 | 61000 P73747 113747 | | |
| 41326 | TRAB 01145 | P113743 | 04720 D16224 056224 | TRAB561 | |
| 41327 | TRAB 0115 | P113744 | 11020 D16224 056224 | | |
| 41330 | TRAB 0116 | P113745 | 04650 D16224 056224 | | |
| 41331 | TRAB 0117 | P113746 | 11050 D16224 056224 | | |
| 41332 | TRAB 0118 | | | | |
| 41333 | TRAB 0119 | | | | |
| 41334 | TRAB 0120 | | | | |
| 41335 | TRAB 0121 | P113747 | 20064 D02321 042321 | TRAB5 | |
| 41336 | TRAB 0122 | P113750 | 15010 D11564 051564 | | |
| 41337 | TRAB 0123 | | | | |
| 41340 | TRAB 0124 | | | | |
| 41341 | TRAB 0125 | | | | |
| 41342 | TRAB 0126 | P113751 | 10070 A00000 000000 | | |
| 41343 | TRAB 0127 | P113752 | 22050 D11564 051564 | | |
| 41344 | TRAB 0128 | P113753 | 14030 D04755 044755 | | |
| 41345 | TRAB 0129 | P113754 | 10060 D11563 051563 | | |
| 41346 | TRAB 0130 | P113755 | 22060 D11563 051563 | | |
| 41347 | TRAB 0131 | P113756 | 31030 D16233 056233 | | |
| 41350 | TRAB 0132 | P113757 | 21030 D04755 044755 | | |
| 41351 | TRAB 0133 | P113760 | 03000 A00036 000036 | | |
| 41352 | TRAB 0134 | P113761 | 23070 A00000 000000 | | |
| 41353 | TRAB 0135 | P113762 | 14010 D11563 051563 | | |
| 41354 | TRAB 0136 | | | | |
| 41355 | TRAB 0137 | | | | |
| 41356 | TRAB 0138 | | | | |
| 41357 | TRAB 0139 | P113763 | 11014 502320 042320 | | |
| 41360 | TRAB 0140 | P113764 | 02000 A00015 000015 | | |
| 41361 | TRAB 0141 | P113765 | 10032 D10744 050744 | | |
| 41362 | TRAB 0142 | P113766 | 65030 P75650 115656 | | |
| 41363 | TRAB 014210 | | | | |
| 41364 | TRAB 014212 | | | | |
| 41365 | TRAB 014214 | | | | |
| 41366 | TRAB 014216 | P113767 | 10030 D11563 051563 | | |
| 41367 | TRAB 014218 | P113770 | 14030 D15033 055033 | | |
| 41370 | TRAB 014220 | P113771 | 10030 D11564 051564 | | |
| 41371 | TRAB 014222 | P113772 | 14030 D15034 055034 | | |
| 41372 | TRAB 014224 | P113773 | 10030 D11565 051565 | | |
| 41373 | TRAB 014226 | P113774 | 14030 D15035 055035 | | |
| 41374 | TRAB 014226 | | | | |
| 41375 | TRAB 014230 | | | | |
| 41376 | TRAB 014232 | | | | |
| 41377 | TRAB 0143 | P113775 | 61030 P73835 113635 | | |
| 41400 | TRAB 0144 | | | | |
| 41401 | TRAB 0145 | | | | |
| 41402 | TRAB 0146 | | | .....EMU | |
| 41403 | TRAB 0147 | P113776 | 12713 J04740 044740 | TRAB1 | |
| 41404 | TRAB 01481 | P113777 | 10000 A00177 000177 | | |
| | | | | .....EMU | |
| 41405 | TRAB 01482 | P114000 | 40027 A40001 000001 | | |
| 41406 | TRAB 01483 | P114001 | 15020 D04753 044753 | | |
| 41407 | TRAB 01484 | P114002 | 16010 D04753 044753 | | |
| 41410 | TRAB 0149 | | | | |
| 41411 | TRAB 0150 | | | | |
| 41412 | TRAB 0151 | | | | |
| 41413 | TRAB 0152 | P114003 | 10000 A77400 077400 | TRAB4 | |
| | | | | .....EMU | |
| 41414 | TRAB 0153 | P114004 | 40017 A40001 000001 | | |
| | | | | .....EMU | |
| 41415 | TRAB 0154 | P114005 | 42027 A40001 000001 | | |
| 41416 | TRAB 0155 | | | | |
| 41417 | TRAB 0156 | P114006 | 03000 A00030 000030 | | |
| 41420 | TRAB 0157 | | | | |
| 41421 | TRAB 0158 | P114007 | 22030 D16216 056216 | | |
| 41422 | TRAB 0159 | P114010 | 61000 P73721 113721 | | |
| 41423 | TRAB 0160 | | | | |
| 41424 | TRAB 0161 | | | | |
| 41425 | TRAB 0162 | | | | |
| 41426 | TRAB 0163 | | | | |
| 41427 | TRAB 01641 | P114011 | 10000 A00177 000177 | TRAB2 | |
| | | | | .....EMJ | |
| 41430 | TRAB 01642 | P114012 | 40026 A40001 000001 | | |
| 41431 | TRAB 01643 | P114013 | 15020 D04753 044753 | | |
| 41432 | TRAB 01644 | P114014 | 16010 D04753 044753 | | |
| 41433 | TRAB 0165 | | | | |
| 41434 | TRAB 0166 | | | | |
| 41435 | TRAB 0167 | | | | |
| 41436 | TRAB 0168 | P114015 | 10000 A77400 077400 | TRAB3 | |
| | | | | .....EMU | |
| 41437 | TRAB 0169 | P114016 | 40016 A40001 000001 | | |
| | | | | .....EMU | |
| 41440 | TRAB 0170 | P114017 | 42026 A40001 000001 | | |
| 41441 | TRAB 0171 | | | | |
| 41442 | TRAB 0172 | P114020 | 03000 A00030 000030 | | |
| 41443 | TRAB 0173 | | | | |
| 41444 | TRAB 0174 | P114021 | 22030 D16216 056216 | | |
| 41445 | TRAB 0175 | P114022 | 61000 P73721 113721 | | |
| 41446 | TRAB 0176 | | | | |
| 41447 | TRAB 0177 | | | | |
| 41450 | TRAB 0178 | | | | |
| 41451 | TRAB 0179 | | | | |
| 41452 | TRAG 0000 | | | | |
| 41453 | TRAG 0001 | | | | |
| 41454 | TRAG 0002 | | | | |
| 41455 | TRAG 0003 | | | | |
| 41456 | TRAG 0004 | | | | |
| 41457 | TRAG 0005 | | | | |
| 41460 | TRAG 0006 | | | | |
| 41461 | TRAG 0007 | | | | |
| 41462 | TRAG 0008 | | | | |
| 41463 | TRAG 0009 | | | | |
| 41464 | TRAG 0010 | | | | |
| 41465 | TRAG 0011 | | | | |

```
COM A    U(TRVUELNEW) YMORE-                              041773
ENT A    U(TRVUELNEW)-                                    041773
COM A    LX(TRVUELNEW) YLESS-                             041773
ENT A    LX(TRVUELNEW)-                                   041773
JP       TRAB5-                                           041773
COM A    U(TRVUEL) YMORE-                                 041773
ENT*A*U(TRVUEL)-
COM*A*LX(TRVUEL)*YLESS-
ENT*A*LX(TRVUEL)-

*  CALCULATE MEASURED ELEVATION DIRECTION COSINE Z

ADD*A*UX(SDTTS+LZF+B4)-
STR*A*L(SDTUS+LZU)-SAVE UNSTABLE LZ

*  CALCULATE MEASURED AZIMUTH DIRECTION COSINE Y

ENT*Q*A-
MUL*LX(SDTUS+LZU)-
STR*Q*W(TRTWRK+LZSQ)-
ENT*Q*UX(SDTUS+LXU)-
MUL*UX(SDTUS+LXU)-
ENT*Y-Q*W(TRVONE28)-
SUB*A*W(TRTWRK+LZSQ)-
RSH*AQ*ADD-
SQRT-
STR*Q*L(SDTUS+LYU)-SAVE UNSTABLE LY

*  STABILIZE MEASURED DIRECTION COSINES

ENT*A*L(SDTTS+QUAD+B4)-QUADRANT ID IN A-REGISTER
RSH*A*QUADLSB-
ENT*Q*W(SDTESID+RITIME+B2)-TIME OF RECEIPT IN Q-REGISTER
RJP*STA-                                                  030673

*  EXTRACT SDTUS FOR LATER RECORDING                      030673
                                                          030673
                                                          030673
ENT Q    W(SDTUS+LXU)-                                    030673
STR Q    W(SDTSTABEXT+3)-                                 030673
ENT Q    W(SDTUS+LZU)-                                    030673
STR Q    W(SDTSTABEXT+4)-                                 030673
ENT Q    W(SDTUS+LYS)-                                    030673
STR Q    W(SDTSTABEXT+5)-                                 030673
                                                          030673
*  END OF EXTRACTION OF SDTUS                             030673
                                                          030673
RETURN-NORMAL EXIT

*  DISABLE ELEVATION BEAMSPLITTING

ENT B7   L(TRTWRK+PXLO+B3)- LOCATE LOWER RETURN           041773
ENT Q    177-                MASK FOR CENTER AMP.         041773

ENT LP   U(CLOG+B7+SR2)-     CENTER AMP., LWR BEAM        041773
STR A    U(TRTWRK+CLOGUP)-   STORE IT                     041773
STR B0   L(TRTWRK+CLOGDF)-   DIFFERENCE VALUE             041773

*  CALCULATE AZIMUTH ERROR SIGNAL FOR LOWER BEAM

ENT*Q*RLOGMSK-

ENT*LP*L(RLOG+B7+SR2)-

SUB LP   U(LLOG+B7+SR2)-     TAKE OFF APOS                113
DELETE                                                    113
RSH AQ   24D-                TAKE OFF SKIP                113
DELETE                                                    113
MUL      W(TRVKAZ)-          TAKE OFF ANEG                113
JP*TRAB6-
DELETE                                                    113

*  DISABLE ELEVATION BEAMSPLITTING

ENT Q    177-                CLOG AMPLITUDE MASK          041773

ENT LP   U(CLOG+B6+SR2)-     CLOG AMP., UPPER BEAM        041773
STR A    U(TRTWRK+CLOGUP)-   STORE IT                     041773
STR B0   L(TRTWRK+CLOGDF)-   TO BE USED AS DIFF.          041773

*  CALCULATE AZIMUTH ERROR SIGNAL FOR UPPER BEAM

ENT*Q*RLOGMSK-

ENT*LP*L(RLOG+B6+SR2)-

SUB LP   U(LLOG+B6+SR2)-     TAKE OFF APOS                113
DELETE                                                    113
RSH AQ   24D-                TAKE OFF SKIP                113
DELETE                                                    113
MUL      W(TRVKAZ)-          TAKE OFF ANEG                113
JP*TRAB6-
DELETE                                                    113
END-PROC*TRAB-

TRAG    SYS-PROC- JBB SPS-33
****************************************************
****************************************************

*  THE RANGE GATE WIDTH FOR FIRING THE NEXT SET OF
*  TRACKING BEAMS AT THIS TARGET IS CONSTRUCTED HERE
*  AS THE SUM OF A NON-MANEUVER AND A MANEUVER GATE
*  SIZE.

*  INPUTS
*           REGISTERS
*             B4, B5
```

```
TRAG 0012                                   *              VARIABLES
                                                                NONE
TRAG 0013                                   *              TABLES
TRAG 0014                                   *                   SDTTS, TRTGAG, TRTGAG0, TRTGAG4, TRTGAG9,
TRAG 0015                                   *                   TRTWRK
TRAG 0016                                   *         OUTPUTS
TRAG 0017                                   *              REGISTERS
TRAG 0018                                   *                   NONE
TRAG 0019                                   *              VARIABLES
TRAG 0020                                   *                   NONE
TRAG 0021                                   *              TABLES
TRAG 0022                                   *                   SDTTS, TRTWRK
TRAG 0023                                   *
TRAG 0024                                   *         PROCEDURES REFERENCED
TRAG 0025                                   *              NONE
TRAG 0026                                   *
TRAG 0027                                   *
TRAG 0028  P114023  00000 A00000 000000        PROCEDURE*TRAG-
TRAG 0029  P114024  10024 002317 042317        ENT*Q*U(SDTTS+K+B4)-
TRAG 0030                                   *  DELETE  TRAG0018 THRU TRAG0020                              114
TRAG 0031  P114025  04325 015733 055733        COM Q U(TRTGAG2+NMRG+B5) YMORE- DOES TOTAL EXCEED GOAL  114
TRAG 0032  P114026  10025 015733 055733        ENT Q U(TRTGAG2+NMRG+B5)- USE GOAL VALUE FOR SELECTION  114

TRP  0002                                   ***************************************************************
TRP  0003                                   *
TRP  0004                                   *
TRP  0005                                   *              N O R M A L    T R A C K S
TRP  0006                                   *
TRP  0007                                   *              THE PREDICTION ROUTINE IS CALLED WHEN THERE IS
TRP  0008                                   *              SPACE AVAILABLE IN THE RADAR OUTPUT QUEUE.
TRP  0009                                   *              PREDICTION WILL PREPARE A SET OF TRACKING BEAMS
TRP  0010                                   *              TO BE FIRED.  IT WILL PREPARE THE RADAR OUTPUT
TRP  0011                                   *              BUFFERS AND ADD ONTO THE RADAR OUTPUT QUEUE.
TRP  0012                                   *
TRP  0013                                   *         INPUTS
TRP  0014                                   *
TRP  0015                                   *              REGISTERS
TRP  0016                                   *
TRP  0017                                   *              VARIABLES
TRP  0018                                   *                   CLOCK, SDVIF, SDVINHA, SDVINHB, SDVLMTUF,
TRP  0019                                   *                   SDVLMTUFA, SDVNTP, TRVMINRNG
TRP  0020                                   *              TABLES
TRP  0021                                   *                   SDTETRNOR, SDTETRNORD, SDTFREQ, SDTSU, SDTTS
TRP  0022                                   *         OUTPUTS
TRP  0023                                   *              REGISTERS
TRP  0024                                   *                   NONE
TRP  0025                                   *              VARIABLES
TRP  0026                                   *                   SDVNTP
TRP  0027                                   *              TABLES
TRP  0028                                   *                   SDTETRNORD, SDTSU, SDTTS
TRP  0029                                   *
TRP  0030                                   *         PROCEDURES REFERENCED
TRP  0031                                   *              STB
TRP  0032  P114144  00000 A00000 000000        PROCEDURE TRP
TRP  0033  P114145  16230 014701 054701        STR B2     W(TRVB2)
TRP  0034  P114146  16330 014702 054702        STR B3     W(TRVB3)
TRP  0035  P114147  16430 014703 054703        STR B4     W(TRVB4)
TRP  0036  P114150  16530 014704 054704        STR B5     W(TRVB5)
TRP  0037  P114151  16630 014705 054705        STR B6     W(TRVB6)
TRP  0038                                   *
TRP  0039                                   *              PLACE TRACK ADDRESS IN  B REGISTER
TRP  0040                                   *
TRP  0041                                   *              PLACE THE RELATIVE ADDRESS OF THE TRACK TO
TRP  0042                                   *              BE PREDICTED IN REGISTER B3
TRP  0043                                   *
TRP  0044  P114152  11030 014743 054743        SET TRVESID TO TRVPAESID - *********TEMPORARY***********
           P114153  15030 014777 054777
TRP  0045  P114154  12330 012055 052055        ENT B3     W(SDVNTP)
TRP  0046                                   *
TRP  0047                                   *              IS THERE AN OUTPUT BUFFER AVAILABLE
TRP  0048                                   *                   YES -         CONTINUE
TRP  0049                                   *                   NO  - TRP00180   CHECK ELAPSED TIME SINCE
TRP  0050                                   *                         BUFFER WAS USED
TRP  0051                                   *
TRP  0052  P114155  12630 014743 054743        ENT B3     W(TRVPAESID)
TRP  0053  P114156  11426 011107 051107        ENT A      U(SDTETRNORD+B6+TRACK) AZERO
TRP  0054  P114157  61000 P74202 114202        JP         TRP00180
TRP  0055                                   *
TRP  0056                                   *              DETERMINE QUADRANT
TRP  0057                                   *

TRP  0058  P114160  10033 014753 054753 TRP00050 ENT Q    W(TRVQUADM)
TRP  0059  P114161  40033 002320 042320        ENT LP     W(SDTTS+B3+QUAD)
TRP  0060  P114162  02000 A00015 000015        RSH A      13D
TRP  0061  P114163  15030 014752 054752        STR A      W(TRVQUAD)
TRP  0062                                   *
TRP  0063                                   *              ARE WE IN THE INHIBIT ZONE
TRP  0064                                   *                   YES - CONTINUE, CHECK 1230 INHIBIT        031
TRP  0065                                   *                   NO - GO UP POINTER                        031
TRP  0066                                   *
TRP  0067  P114164  10030 014725 054725        ENT Q      W(TRVINHBM)
TRP  0068  P114165  40023 002313 042313        ENT LP     U(SDTTS+B3+F2)
TRP  0069  P114166  15330 014726 054726        STR A      W(TRVINHBT) ANOT
TRP  0070  P114167  61000 P74207 114207        JP         TRP00200
TRP  0071                                   *
TRP  0072                                   *              IS THE COMPUTER INHIBITED
TRP  0073                                   *                   YES - TRP99900  RETURN
TRP  0074                                   *                   NO  - TRP00200  CONTINUE
TRP  0075                                   *
TRP  0076  P114170  11530 014752 054752        ENT A      W(TRVQUAD) ANOT
TRP  0077  P114171  61000 P74177 114177        JP         TRP00170
TRP  0078  P114172  04700 A00003 000003        COM A      3 YMORE
TRP  0079  P114173  61000 P74177 114177        JP         TRP00170
TRP  0080  P114174  11730 010216 050216        ENT A      W(SDVINHB) ANEG-
TRP  0081  P114175  61000 P74207 114207        JP         TRP00200
TRP  0082  P114176  61000 P74660 114660        JP         TRP99900
TRP  0083  P114177  11730 010215 050215 TRP00170 ENT A    W(SDVINHA) ANEG-
TRP  0084  P114200  61000 P74207 114207        JP         TRP00200
```

```
42104  TRP  0085  P114201  61000 P74660 114660         JP              TRP99900
42105  TRP  0086                                  *                    IF ELAPSED TIME LT MAXIMUM, THEN TRP99900 - EXIT
42106  TRP  0087                                  *                            OTHERWISE, USE THAT BUFFER
                                                  .....EMU
42107  TRP  0088  P114202  11030 A40160 000160  TRP00180  ENT A        W(CLOCK+SR2)
42110  TRP  0089  P114203  21036 L11207 051207         SUB A           W(SDTETRNORD+B6+RPTIME)-
42111  TRP  0090  P114204  04630 D14776 054776         COM A           W(TRVCYCLMX) YLESS
42112  TRP  0091  P114205  61000 P74660 114660         JP              TRP99900
42113  TRP  0092  P114206  61000 P74160 114160         JP              TRP00050
42114  TRP  0093                                  *
42115  TRP  0094                                  *                    MOVE POINTER TO NEXT SET OF BUFFERS
42116  TRP  0095                                  *
42117  TRP  0096  P114207  12430 D14744 054744  TRP00200  ENT B        W(TRVPAROB)
42120  TRP  0097  P114210  11030 D14744 054744         ENT A           W(TRVPAROB)
42121  TRP  0098  P114211  21630 D14742 054742         SUB A           W(TKVNWSE) APOS
42122  TRP  0099  P114212  11030 D14745 054745         ENT A           W(TRVPFAROB)
42123  TRP  0100  P114213  15030 D14744 054744         STR A           W(TRVPAROB)
42124  TRP  0101  P114214  03000 A00036 000036         RSH A           30D
42125  TRP  0102  P114215  23000 A00007 000007         DIV             SDMNROW
42126  TRP  0103  P114216  14030 D14743 054743         STR Q           W(TRVPAESID)
42127  TRP  0104                                  *
42130  TRP  0105                                  *                    BEGIN BUILDING RADAR OUTPUT BUFFERS
42131  TRP  0106                                  *                    PLACE RELATIVE TRACK ADDRESS IN CONTROL TABLE
42132  TRP  0107                                  *                    PLACE TIME OF PREDICTION IN CONTROL TABLE
42133  TRP  0108                                  *
                                                  .....EMU
42134  TRP  0109  P114217  15326 D11107 051107         STR B           U(SDTETRNORD+B6+TRACK)
                                                  .....EMU
42135  TRP  0110  P114220  11030 A40160 000160         ENT A           W(CLOCK+SR2)
42136  TRP  0111  P114221  15036 D11207 051207         STR A           W(SDTETRNORD+B6+RPTIME)
42137  TRP  0112                                                       PROG=SRC
42140  TRP  0113  P114222  11006 A00242 000242         ENT A           SDTETRNOR+B6+RIBCW2
42141  TRP  0114  P114223  15014 A53675 013675         STR A           L(SDTTRNOR+B4+RES135+SR2)
42142  TRP  0115  P114224  11006 A00243 000243         ENT A           SDTETRNOR+B6+RIBCW3
42143  TRP  0116  P114225  15014 A53704 013704         STR A           L(SDTTRNOR+B4+RES133+SR2)
42144  TRP  0117                                                       SYCOL=SRC
42145  TRP  0118  P114226  11036 D10606 050606         ENT A           W(SDTETRNORD+B6+RIBCW2)
42146  TRP  0119  P114227  77500 A02000 000242         STR A           W(SDTETRNOR+B6+1)
                  P114230  15036 A40242 000242
42147  TRP  0120  P114231  11036 D10607 050607         ENT A           W(SDTETRNORD+B6+RIBCW3)
42150  TRP  0121  P114232  15036 A40243 000243         STR A           W(SDTETRNOR+B6+2)
42151  TRP  0122                                  *
42152  TRP  0123                                  *                    MOVE RADAR CONTROL INFORMATION TO OUTPUT BUFFER
42153  TRP  0124                                  *
42154  TRP  0125  P114233  11033 D02320 042320         ENT A           W(SDTTS+B3+CWRD)
                                                  .....EMU
42155  TRP  0126  P114234  15034 A53672 013672         STR A           W(SDTTRNOR+B4+RADCTRL2+SR2)
                                                  .....EMU
42156  TRP  0127  P114235  15034 A53701 013701         STR A           W(SDTTRNOR+B4+RADCTRL3+SR2)
42157  TRP  0128  P114236  11023 D02323 042323         ENT A           U(SDTTS+B3+IPP)
                                                  .....EMU
42160  TRP  0129  P114237  15024 A53675 013675         STR A           U(SDTTRNOR+B4+ERIPP32+SR2)
                                                  .....EMU
42161  TRP  0130  P114240  15024 A53704 013704         STR A           U(SDTTRNOR+B4+ERIPP33+SR2)
42162  TRP  0131                                  *
42163  TRP  0132                                  *                    IS THIS THE TENTATIVE TRACK PHASE
42164  TRP  0133                                  *                      YES - TRP00300  SKIP POSITION PREDICTION
42165  TRP  0134                                  *                      NO  -           CONTINUE
42166  TRP  0135                                  *
42167  TRP  0136  P114241  10030 D14771 054771         ENT Q           W(TRVTNTVM)
42170  TRP  0137  P114242  40423 D02313 042313         ENT LP          U(SDTTS+B3+TNTV) AZERO
42171  TRP  0138  P114243  61000 P74334 114334         JP              TRP00300
42172  TRP  0139                                  *
42173  TRP  0140                                  *                    COMPUTE DELTA TIME SINCE LAST MEASUREMENTS
42174  TRP  0141                                  *                    CORRECT DELTA TIME FOR PREDICTION DELAY
42175  TRP  0142                                  *
                                                  .....EMU
42176  TRP  0143  P114244  11030 A40160 000160         ENT A           W(CLOCK+SR2)
42177  TRP  0144  P114245  21033 D02312 042312         SUB A           W(SDTTS+B3+TIME)
42200  TRP  0145  P114246  20030 D14766 054766         ADD A           W(TRVTIMCN)
42201  TRP  0146  P114247  15030 D14712 054712         STR A           W(TRVDTIME)
42202  TRP  0147                                  *
42203  TRP  0148                                  *                    COMPUTE PREDICTED RANGE
42204  TRP  0149                                  *                    STORE IN TRACK STORE
42205  TRP  0150                                  *
42206  TRP  0151  P114250  10063 D02315 042315         ENT Q           UX(SDTTS+B3+RNGR)
42207  TRP  0152  P114251  22030 D14712 054712         MUL             W(TRVDTIME)
42210  TRP  0153  P114252  07000 A00022 000022         LSH A           18D
42211  TRP  0154  P114253  20013 D02313 042313         ADD A           L(SDTTS+B3+RNGS)-
42212  TRP  0155  P114254  10000 A00000 000000         ENT Q           0
42213  TRP  0156  P114255  03200 A00002 000002         RSH AQ          2 QPOS
42214  TRP  0157  P114256  20000 A00001 000001         ADD A           1
42215  TRP  0158  P114257  15013 D02322 042322         STR A           L(SDTTS+B3+RNGP)
42216  TRP  0159                                  *
42217  TRP  0160                                  *                    MAKE SURE RANGE IS GTEQ TO MINIMUM RANGE
42220  TRP  0161                                  *
42221  TRP  0162  P114260  11030 D14767 054767         ENT A           W(TRVMINRNG)
42222  TRP  0163  P114261  04713 D02322 042322         COM A           L(SDTTS+B3+RNGP) YMORE
42223  TRP  0164  P114262  15013 D02322 042322         STR A           L(SDTTS+B3+RNGP)
42224  TRP  0165                                  *
42225  TRP  0166                                  *                    PREDICT LX AND PLACE IT IN TRACK STORE
42226  TRP  0167                                  *
42227  TRP  0168  P114263  10063 D02316 042316         ENT Q           UX(SDTTS+B3+LXR)
42230  TRP  0169  P114264  22030 D14712 054712         MUL             W(TRVDTIME)
42231  TRP  0170  P114265  07000 A00024 000024         LSH AQ          20D
42232  TRP  0171  P114266  20663 D02314 042314         ADD A           UX(SDTTS+B3+LXSA) APOS
42233  TRP  0172  P114267  61000 P74277 114277         JP              TRP00210
42234  TRP  0173                                  *
42235  TRP  0174                                  *                    CHECK DIRECTIONAL COSINE AGAINST ACCEPTABLE
42236  TRP  0175                                  *                    LIMITS
42237  TRP  0176                                  *
42240  TRP  0177  P114270  04630 D10303 050303         COM A           W(SDVCN1) YLESS-
42241  TRP  0178  P114271  61000 P74305 114305         JP              TRP00225
42242  TRP  0179  P114272  10063 D02316 042316         ENT Q           UX(SDTTS+B3+LXR)
42243  TRP  0180  P114273  14063 D02316 042316         STR Q           CPU(SDTTS+B3+LXR)
42244  TRP  0181  P114274  15040 A00000 000000         CP  A
```

```
42245  TRP  0182   P114275  20030 D10306 050306             ADD A     W(SDVCN2)-
42246  TRP  0183   P114276  61000 P74305 114305             JP        TRP00225
42247  TRP  0184                                  *
42250  TRP  0185   P114277  04730 D10305 050305 TRP00210    COM A     W(SDVCNM1) YMORE-
42251  TRP  0186   P114300  61000 P74305 114305             JP        TRP00225
42252  TRP  0187   P114301  10063 D02316 042316             ENT Q     UX(SDTTS+B3+LXR)
42253  TRP  0188   P114302  14063 D02316 042316             STR Q     CPU(SDTTS+B3+LXR)
42254  TRP  0189   P114303  15040 A00000 000000             CP  A
42255  TRP  0190   P114304  21030 D10306 050306             SUB A     W(SDVCN2)-
42256  TRP  0191                                  *
42257  TRP  0192   P114305  15023 D02325 042325 TRP00225    STR A     U(SDTTS+B3+LXP)
42260  TRP  0193   P114306  15020 D11560 051560             STR A     U(SDTSU+SLX)
42261  TRP  0194                                  *
42262  TRP  0195                                  *                   PREDICT LY AND PLACE IN TRACK STORE
42263  TRP  0196                                  *
42264  TRP  0197   P114307  10053 D02316 042316             ENT Q     LX(SDTTS+B3+LYR)
42265  TRP  0198   P114310  22030 D14712 054712             MUL       W(TRVDTIME)
42266  TRP  0199   P114311  07000 A00024 000024             LSF A     200
42267  TRP  0200   P114312  20653 D02314 042314             ADD A     LX(SDTTS+B3+LYSA) APOS
42270  TRP  0201   P114313  61000 P74323 114323             JP        TRP00240
42271  TRP  0202                                  *
42272  TRP  0203                                  *                   CHECK DIRECTIONAL COSINES AGAINST ACCEPTABLE
42273  TRP  0204                                  *                   LIMITS
42274  TRP  0205                                  *
42275  TRP  0206   P114314  04630 D10303 050303             COM A     W(SDVCN1) YLESS-
42276  TRP  0207   P114315  61000 P74331 114331             JP        TRP00250
42277  TRP  0208   P114316  10053 D02316 042316             ENT Q     LX(SDTTS+B3+LYR)
42300  TRP  0209   P114317  14053 D02316 042316             STR Q     CPL(SDTTS+B3+LYR)
42301  TRP  0210   P114320  15040 A00000 000000             CP  A
42302  TRP  0211   P114321  20030 D10306 050306             ADD A     W(SDVCN2)-
42303  TRP  0212   P114322  61000 P74331 114331             JP        TRP00250
42304  TRP  0213                                  *
42305  TRP  0214   P114323  04730 D10305 050305 TRP00240    COM A     W(SDVCNM1) YMORE-
42306  TRP  0215   P114324  61000 P74331 114331             JP        TRP00250
42307  TRP  0216   P114325  10053 D02316 042316             ENT Q     LX(SDTTS+B3+LYR)
42310  TRP  0217   P114326  14053 D02316 042316             STR Q     CPL(SDTTS+B3+LYR)
42311  TRP  0218   P114327  15040 A00000 000000             CP  A
42312  TRP  0219   P114330  21030 D10306 050306             SUB A     W(SDVCN2)-
42313  TRP  0220                                  *
42314  TRP  0221   P114331  15013 D02325 042325 TRP00250    STR A     L(SDTTS+B3+LYP)
42315  TRP  0222   P114332  15010 D11560 051560             STR A     L(SDTSU+SLY)
42316  TRP  0223                                  *
42317  TRP  0224   P114333  61000 P74340 114340             JP        TRP00350
42320  TRP  0225                                  *
42321  TRP  0226                                  *                   EXTRAPOLATION WILL NOT BE PREFORMED HERE
42322  TRP  0227                                  *                   SMOOTHED DIRECTION COSINES AND SMOOTHED
42323  TRP  0228                                  *                   RANGE WILL BE USED FOR PREDICTED VALUES
42324  TRP  0229                                  *                   UPDATE TRACK STORE AND INITIALIZE STABILIZATION
42325  TRP  0230                                  *                   TABLE
42326  TRP  0231                                  *
42327  TRP  0232   P114334  11033 D02314 042314 TRP00300    ENT A  W(SDTTS+B3+LXYS)-                    -051072
42330  TRP  0233   P114335  15030 D11560 051560             STR A  W(SDTSU+SLX)-                        -051072
42331  TRP  0234                                  *         TRP 0209-0310        DELETED               -051072
42332  TRP  0235   P114336  11013 D02313 042313             ENT A     L(SDTTS+B3+RNGS)
42333  TRP  0236   P114337  03100 A00002 000002             RSH AS    2  SKIP
42334  TRP  0237                                  *
42335  TRP  0238                                  *                   PLACE RANGE IN RADAR OUTPUT BUFFER
42336  TRP  0239                                  *
42337  TRP  0240   P114340  11013 D02322 042322 TRP00350    ENT A     L(SDTTS+B3+RNGP)
*********                                       *****EMU
42340  TRP  0241   P114341  15014 A53674 013674             STR A     L(SDTTRNOR+B4+RRGC2+SR2)
42341  TRP  0242                                  *         SET UP NON- RGPD BEAMS FOR TZR ALIGNMENT PROB    -051072
42342  TRP  0243   P114342  10000 A01400 001400             ENT Q 1400-  CP MASK                          051072
42343  TRP  0244   P114343  40523 D02320 042320             ENT LP U(SDTTS+B3+CWRD) ANOT- P/U CP BITS     -051072
42344  TRP  0245   P114344  61000 P74347 114347             JP TRP00351-    NO RANGE CHANGE IF CP EQ 0    -051072
42345  TRP  0246   P114345  21400 A01400 001400             SUB A 1400 AZERO-   NO RANGE CHANGE HERE IF RGPD  -051072
42346  TRP  0247   P114346  11030 D14773 054773             ENT A     W(TRATZRADJ)-    TZR ADJUSTMENT       041373
*********                                       *****EMU
42347  TRP  0248   P114347  24014 A53674 013674 TRP00351    RPL A+Y L(SDTTRNOR+B4+RRGC2+SR2)-                -051072
*********                                       *****EMU
42350  TRP  0249   P114350  15014 A53703 013703             STR A     L(SDTTRNOR+B4+RRGC3+SR2)
42351  TRP  0250                                  *
42352  TRP  0251                                  *                   PLACE RANGE GATE WIDTH IN THE RADAR OUTPUT
42353  TRP  0252                                  *                   BUFFER
42354  TRP  0253                                  *
42355  TRP  0254   P114351  11023 D02322 042322             ENT A     U(SDTTS+B3+RNGW)
*********                                       *****EMU
42356  TRP  0255   P114352  15024 A53674 013674             STR A     U(SDTTRNOR+B4+RRGW2+SR2)
*********                                       *****EMU
42357  TRP  0256   P114353  15024 A53703 013703             STR A     U(SDTTRNOR+B4+RRGW3+SR2)
42360  TRP  0257                                  *
42361  TRP  0258                                  *                   PLACE LZ IN STABILIZATION TABLE AND
42362  TRP  0259                                  *                   QUADRANT IN THE A REGISTER            031
42363  TRP  0260                                  *
42364  TRP  0261   P114354  11013 D02315 042315             ENT A     L(SDTTS+B3+LZSA)
42365  TRP  0262   P114355  15010 D11561 051561             STR A     L(SDTSU+SLZ)
42366  TRP  0263   P114356  11030 D14752 054752             ENT A     W(TRVQUAD)
42367  TRP  0264                                  *
42370  TRP  0265                                  *             *   S T A B I L I Z A T I O N    *
42371  TRP  0266                                  *
42372  TRP  0267                                  *                *          S T B           *
42373  TRP  0268                                  *
42374  TRP  0269   P114357  65030 P75654 115654             STR
42375  TRP  026901                                *                                                      041373
42376  TRP  026902                                *         DO ST ONLY IF THIS TRACK IS ST TRACK         041373
42377  TRP  026903                                *                                                      041373
42400  TRP  026904  P114360  11023 D02311 042311             ENT A     U(SDTTS+TRACKNO+B3)-   THIS TRACK  UMBER   041373
*********                                       *****EMU
42401  TRP  026905  P114361  21430 A50201 010201             SUB A     W(SDVSTTRKNO+SR2)  AZERO- IF AZERO, DO ST  041373
42402  TRP  026906  P114362  61000 P74373 114373             JP        TRP00353-          NO DATA NEEDED FOR ST   041373
42403  TRP  026910                                *                                                      030673
42404  TRP  026912                                *         EXTRACT SDTSU FOR LATER RECORDING             030673
42405  TRP  026914                                *                                                      030673
42406  TRP  026916  P114363  11030 D11560 051560             ENT A     W(SDTSU+SLX)-                      030673
42407  TRP  026918  P114364  15030 D15030 055030             STR A     W(SDTSTABEXTT-                     030673
42410  TRP  026920  P114365  11030 D11561 051561             ENT A     W(SDTSU+SLZ)-                      030673
```

```
42411  TRP  026922  P114366  15030 C15031 055031           STR A    W(SDTSTABEXT+1)-                              030673
42412  TRP  026924  P114367  11030 D11562 051562           ENT A    W(SDTSU+ULX)-                                 030673
42413  TRP  026926  P114370  15030 D15032 055032           STR A    W(SDTSTABEXT+2)-                              030673
42414  TRP  026928  P114371  11030 D17375 057375           ENT A    W(SDVSGDSR)-   GET GYRO INPUT COUNT           041373
42415  TRP  026930  P114372  15030 D15036 055036           STR A    W(SDTSTABEXT+6)-   SAVE IT
42416  TRP  0270                                        *
42417  TRP  0271                                        *          FREQUENCY CALCULATIONS
42420  TRP  0272                                        *
42421  TRP  0273    P114373  11760 D11561 051561 TRP00353 ENT A    UX(SDTSU+ULZ) ANEG=                           042073
42422  TRP  0274    P114374  20000 A00020 000020           ADD A    20=                                          029
42423  TRP  0275    P114375  21000 A00010 000010           SUB A    10=                                          029
42424  TRP  0276    P114376  52000 A00017 000017           SEL C    17=                                          029
42425  TRP  0277    P114377  15023 D02321 042321           STR A    U(SDTTS+B3+LZF)
42426  TRP  0278                                        *
42427  TRP  0279                                        *          TRUNCATE ROUNDED LZ, ADD INDEX, CHK LIMITS
42430  TRP  0280                                        *
42431  TRP  0281    P114400  02000 A00004 000004           LSH A    4
42432  TRP  0282    P114401  20630 D14522 054522           ADD A    W(SDVIF) APOS
42433  TRP  0283    P114402  61000 P74432 114432           JP       TRP00450
42434  TRP  0284    P114403  04730 D14523 054523           COM A    W(SDVLMTUF) YMORE    /261 D
42435  TRP  0285    P114404  61000 P74437 114437           JP       TRP00460
42436  TRP  0286                                        *
42437  TRP  0287                                        *          LOOK UP TEMPERATURE DIFFERENCE AND FREQUENCY
42440  TRP  0288                                        *          CORRECT FREQUENCY FOR TEMPERATURE
42441  TRP  0289                                        *
42442  TRP  0290    P114405  15030 A40162 000162 TRP00410 STR A    W(BTW0+SR2)
42443  TRP  0291    P114406  12530 D14752 054752           ENT BE   W(TRVQUAD)
42444  TRP  0292    P114407  10055 D10540 050540           ENT Q    LX(SDTEMP+B5)
42445  TRP  0293    P114410  22030 D14525 054525           MUL      W(SDVCONF)
42446  TRP  0294    P114411  01000 A00016 000016           RSH Q    14D
42447  TRP  0295    P114412  11022 D12144 052144           ENT A    U(SDTFREQ+B2+FREQ)-
42450  TRP  0296    P114413  33030 D14714 054714           STR A-S  W(TRVFREQ)
42451  TRP  0297                                        *
42452  TRP  0298                                        *          CHECK RANGE OF ELEVATION DIRECTION COSINE
42453  TRP  0299                                        *          AND CALCULATE UPPER AND LOWER FREQUENCY WORDS
42454  TRP  0300                                        *
42455  TRP  0301    P114414  11060 D11561 051561           ENT A    UX(SDTSU+ULZ)
42456  TRP  0302    P114415  04730 D14734 054734           COM A    W(TRVLZFREQ) YMORE
42457  TRP  0303    P114416  11100 A00004 000004           ENT A    4 SKIP-     LEAVE LOGIC IN FOR               163
42460  TRP  0304    P114417  11000 A00002 000002           ENT A    2- ELEVATION CK, USE CLOSET SPACING          -051072
42461  TRP  0305    P114420  15030 D14711 054711           STR A    W(TRVDELF)
42462  TRP  0306    P114421  20030 D14714 054714           ADD A    W(TRVFREQ)
42463  TRP  0307    P114422  04730 D14524 054524           COM A    W(SDVLMTUFA) YMORE
42464  TRP  0308    P114423  11030 D14524 054524           ENT A    W(SDVLMTUFA)
                                                        ....EMU
42465  TRP  0309    P114424  15024 A53673 013673           STR A    U(SDTTRNOR+B4+RDFU+SR2)
42466  TRP  0310    P114425  11030 D14714 054714           ENT A    W(TRVFREQ)
42467  TRP  0311    P114426  21630 D14711 054711           SUB A    W(TRVDELF) APOS
42470  TRP  0312    P114427  11000 A00000 000000           CL A
                                                        ....EMU
42471  TRP  0313    P114430  15024 A53702 013702           STR A    U(SDTTRNOR+B4+RDFL+SR2)
42472  TRP  0314
42473  TRP  0315    P114431  61000 P74445 114445           JP       TRP00500
42474  TRP  0316                                        *
42475  TRP  0317                                        *          CORRECT FREQUENCY TO A VALUE WITHIN LIMITS
42476  TRP  0318                                        *          AND ADJUST LZ FIRED TO REFLECT THIS CHANGE
42477  TRP  0319                                        *
42500  TRP  0320    P114432  11030 D14522 054522 TRP00450 ENT A    W(SDVIF)
42501  TRP  0321    P114433  06000 A00004 000004           LSH A    4
42502  TRP  0322    P114434  15063 D02321 042321           STR A    CPU(SDTTS+B3+LZF)
42503  TRP  0323    P114435  11000 A00000 000000           CL A
42504  TRP  0324    P114436  61000 P74405 114405           JP       TRP00410
42505  TRP  0325                                        *
42506  TRP  0326    P114437  11030 D14523 054523 TRP00460 ENT A    W(SDVLMTUF)
42507  TRP  0327    P114440  21030 D14522 054522           SUB A    W(SDVIF)
42510  TRP  0328    P114441  06000 A00004 000004           LSH A    4
42511  TRP  0329    P114442  15023 D02321 042321           STR A    U(SDTTS+B3+LZF)
42512  TRP  0330    P114443  11030 D14523 054523           ENT A    W(SDVLMTUF)
42513  TRP  0331    P114444  61000 P74405 114405           JP       TRP00410
42514  TRP  0332                                        *
42515  TRP  0333                                        *
42516  TRP  0334                                        *          PHASE CALCULATIONS
42517  TRP  0335                                        *
42520  TRP  0336                                        *          CALCULATE PHASE BASED ON CONSTANT FROM
42521  TRP  0337                                        *          FREQUENCY TABLE
42522  TRP  0338                                        *
42523  TRP  0339                                        *
42524  TRP  0340    P114445  10012 D12144 052144 TRP00500 ENT Q    L(SDTFREQ+B2+CONP)-
42525  TRP  0341    P114446  22060 D11562 051562           MUL      UX(SDTSU+ULX)-                                029
42526  TRP  0342    P114447  60300 P74451 114451           JP       TRP00503 QNEG-                                029
42527  TRP  0343    P114450  26030 P75627 115627           ADD Q    2000000-                                      029
42530  TRP  0344    P114451  27030 P75630 115630 TRP00503 SUB Q    1000000-                                      029
42531  TRP  0345    P114452  07000 A00013 000013           LSH A    11D
42532  TRP  0346    P114453  15030 D14746 054746           STR A    W(TRVPHASE)
42533  TRP  0347    P114454  10600 A00000 000000           CL Q     APOS-                                        621
42534  TRP  0348    P114455  14100 A00000 000000           STR Q    Q SKIP-   A NEG., ALL SEVENS INTO Q          621
42535  TRP  0349    P114456  60400 P74461 114461           JP       TRP00510 AZERO-                              707
42536  TRP  0350    P114457  23012 D12144 052144           DIV      L(SDTFREQ+B2+CONP)-
42537  TRP  0351    P114460  03000 A00013 000013           RSH A    11D
42540  TRP  0352    P114461  14013 D02321 042321 TRP00510 STR Q    L(SDTTS+B3+LXF)
42541  TRP  0353    P114462  11630 D14746 054746           ENT A    W(TRVPHASE) APOS
42542  TRP  0354    P114463  20000 A02000 002000           ADD A    1024D
42543  TRP  0355                                        *
42544  TRP  0356                                        *          PLACE PHASE IN RADAR OUTPUT BUFFER
42545  TRP  0357                                        *
                                                        ....EMU
42546  TRP  0358    P114464  15014 A53673 013673           STR A    L(SDTTRNOR+B4+RPHU+SR2)
                                                        ....EMU
42547  TRP  0359    P114465  15014 A53702 013702           STR A    L(SDTTRNOR+B4+RPHL+SR2)
42550  TRP  0360                                        *
42551  TRP  0361                                        *          IS THIS AN RGPD BEAM REQUEST
42552  TRP  0362                                        *             YES -        CONTINUE
42553  TRP  0363                                        *
42554  TRP  0364                                        *             NO  - TRP00700
```

```
42555  TRP  0365   P114466  11030 C14756 054756      ENT A    W(TRVRGPDM)
42556  TRP  0366   P114467  10070 A00000 000000      ENT Q    A
42557  TRP  0367   P114470  43433 C02320 042320      COM MASK W(SDTTS+B3+CWRD) AZERO
42560  TRP  0368   P114471  61000 P74553 114553      JP       TRP00700
42561  TRP  0369
42562  TRP  0370                                  *
42563  TRP  0371                                  *          PREPARE A CLEAR BEAM IN ADDITION TO THE
42564  TRP  0372                                  *          NORMAL BEAMS. USE BEAM CONTROL INFORMATION
42565  TRP  0373                                  *          OF UPPER BEAM AND PLACE CLEAR BEAM AT FRONT
42566  TRP  0374                                  *          OF RADAR OUTPUT QUEUE.
                                              ....EMU
42567  TRP  0375   P114472  11034 A53672 013672      ENT A    W(SDTTRNOR+B4+RADCTRL2+SR2)
42570  TRP  0376   P114473  50030 014757 054757      SEL SET  W(TRVRGPDM1)
42571  TRP  0377   P114474  52030 014760 054760      SEL CL   W(TRVRGPDM2)
                                              ....EMU
42572  TRP  0378   P114475  15034 A53663 013663      STR A    W(SDTTRNOR+B4+RADCTRL1+SR2)
42573  TRP  0379                                  *
                                              ....EMU
42574  TRP  0380   P114476  11034 A53702 013702      ENT A    W(SDTTRNOR+B4+RFPY3+SR2)-                    149
                                              ....EMU
42575  TRP  0381   P114477  15034 A53664 013664      STR A    W(SDTTRNOR+B4+RFPX1+SR2)
42576  TRP  0382                                  *
                                              ....EMU
42577  TRP  0383   P114500  11034 A53674 013674      ENT A    W(SDTTRNOR+B4+RNGIW2+SR2)
                                              ....EMU
42600  TRP  0384   P114501  15034 A53665 013665      STR A    W(SDTTRNOR+B4+RNGIW1+SR2)
42601  TRP  0385                                  *
42602  TRP  0386                                  *          DELETE   TRP 0449 THRU TRP 0450              149
42603  TRP  0387                                  *                                                       149
42604  TRP  0388                                  *          CALL TRIP TO CALCULATE NON-CLUTTER IPP FOR THE 149
42605  TRP  0389                                  *          CLEAR BEAM.                                  149
42606  TRP  0390                                  *                                                       149
42607  TRP  0391                                             PROG-SRC                                    051072
42610  TRP  0392   P114502  11000 A13663 013663      ENT A    SDTTRNOR-    TABLE ADDRESS FOR CALL         -051072
42611  TRP  0393                                             SYCOL-SRC                                    051072
42612  TRP  0394   P114503  65030 P75675 115675      TRIP -                                               149
42613  TRP  0395   P114504  13030 P75635 115635      ENT Q    4000077777-     MASK FOR IPP                149
42614  TRP  0396   P114505  08000 A00017 000017      LSH A    150=            IPP INTO UPPER HALF         149
                                              ....EMU
42615  TRP  0397   P114506  41034 A53675 013675      ADD LP   W(SDTTRNOR+B4+ERIPPX2+SR2)-                 149
                                              ....EMU
42616  TRP  0398   P114507  15034 A53666 013666      STR A    W(SDTTRNOR+B4+ERIPPW1+SR2)-                 149
42617  TRP  0399                                  *
42620  TRP  0400                                             PROG-SRC
42621  TRP  0401   P114510  11006 A00241 000241      ENT A    SDTETRNOR+B6+RIBCW1
42622  TRP  0402   P114511  15014 A53666 013666      STR A    L(SDTTRNOR+B4+RESI31+SR2)
42623  TRP  0403                                             SYCOL-SRC
42624  TRP  0404   P114512  11036 010605 050605      ENT A    W(SDTETRNORD+B6+RIBCW1)
42625  TRP  0405   P114513  77600 A02000 000241      STR A    W(SDTETRNOR+B6+0)
                   P114514  15036 A40241 000241
42626  TRP  0406
42627  TRP  0407                                  *
42630  TRP  0408                                  *          CALCULATE AMBIGUOUS RANGE FOR THE OTHER TWO BEAMS
                                              ....EMU
42631  TRP  0409   P114515  10014 A53674 013674      ENT Q    L(SDTTRNOR+B4+RRGC2+SR2)
                                              ....EMU
42632  TRP  0410   P114516  11024 A53675 013675      ENT A    U(SDTTRNOR+B4+ERIPP31+SR2)-                 149
42633  TRP  0411   P114517  52000 A40000 040000      SEL CL   40000
42634  TRP  0412   P114520  15030 014765 054765      STR A    W(TRVTEMP)
42635  TRP  0413   P114521  11000 A00000 000000      CL A
42636  TRP  0414   P114522  23030 014765 054765      DIV      W(TRVTEMP)
42637  TRP  0415   P114523  20030 014773 054773      ADD A    W(TRATZRADJ)-   TZR ADJUSTMENT              041373
                                              ....EMU
42640  TRP  0416   P114524  15014 A53674 013674      STR A    L(SDTTRNOR+B4+RRGC2+SR2)
                                              ....EMU
42641  TRP  0417   P114525  15014 A53703 013703      STR A    L(SDTTRNOR+B4+RRGC3+SR2)
42642  TRP  0418                                  *
42643  TRP  0419
42644  TRP  0420                                  *          PLACE APPROPRIATE INFORMATION IN RADAR OUT QUE
42645  TRP  0421                                  *
42646  TRP  0422   P114526  12230 010460 050460      ENT B    W(SDXROUT)
42647  TRP  0423   P114527  11036 010705 050705      ENT A    W(SDTETRNORD+B6+ROBCW1)
                                              ....EMU
42650  TRP  0424   P114530  15032 A54725 014725      STR A    W(SDTROUTQ+B2+SDRBCW+SR2)
42651  TRP  0425
42652  TRP  0426                                  *
42653  TRP  0427                                  *          IS THIS AN INHIBIT ZONE TRACK
42654  TRP  0428                                  *             YES =         SET APPROPRIATE FLAG
42655  TRP  0429                                  *             NO - TRP00620  CONTINUE
42656  TRP  0430   P114531  11530 014726 054726      ENT A    W(TRVINHBT) ANOT
42657  TRP  0431   P114532  61000 P74537 114537      JP       TRP00620
42660  TRP  0432   P114533  11430 014752 054752      ENT A    W(TRVQUAD) AZERO
42661  TRP  0433   P114534  04700 A00003 000003      COM A    3 YMORE
42662  TRP  0434   P114535  11100 A00001 000001      ENT A    1 SKIP
42663  TRP  0435   P114536  11000 A00002 000002      ENT A    2
                                              ....EMU
42664  TRP  0436   P114537  15022 A54765 014765  TRP00620 STR A  U(SDTROUTQ+B2+SDRINH+SR2)
42665  TRP  0437                                  *
42666  TRP  0438                                             DELETED                                     -051072
                                              ....EMU
42667  TRP  0439   P114540  16012 A54765 014765      CL L(SDTROUTQ+B2+SDRHITS+SR2)-                      -051072
42670  TRP  0440
                                              ....EMU
42671  TRP  0441   P114541  11024 A53666 013666      ENT A    U(SDTTRNOR+B4+ERIPP31+SR2)
42672  TRP  0442   P114542  52000 A40000 040000      SEL CL   40000
                                              ....EMU
42673  TRP  0443   P114543  15012 A55025 015025      STR A    L(SDTROUTQ+B2+SDRIPP+SR2)
42674  TRP  0444   P114544  11000 A00001 000001      ENT A    1
                                              ....EMU
42675  TRP  0445   P114545  15022 A55025 015025      STR A    U(SDTROUTQ+B2+SDRBT+SR2)
42676  TRP  0446
42677  TRP  0447                                  *
42700  TRP  0448   P114546  36030 010460 050460      RPL Y+1  W(SDXROUT)
42701  TRP  0449   P114547  04700 A00040 000040      COM A    SDVROUTL YMORE
42702  TRP  0450   P114550  16030 010460 050460      STR B3   W(SDXROUT)
42703  TRP  0451   P114551  36030 017402 057402      RPL Y+1  W(SDVTRKBCT)-   TRACKING BEAM FIRED COUNT   118
```

```
42704  TRP  0452   P114552  61000 P74574 114574              JP       TRP00800
42705  TRP  0453
42706  TRP  0454                                    *
42707  TRP  0455                                    *                 IS THERE A SIZE REQUEST ON THIS TRACK
42710  TRP  0456                                    *                   YES -         CONTINUE
42711  TRP  0457                                    *                   NO  - TRP00800
42712  TRP  0458
42713  TRP  0459   P114553  10030 014763 054763 TRP00700  ENT Q    W(TRVSIZEM1)
42714  TRP  0460   P114554  40533 002320 042320              ENT LP   W(SDTTS+B3+CWRD) ANOT
42715  TRP  0461   P114555  61000 P74574 114574              JP       TRP00800
42716  TRP  0462                                    *
..........                                          .....EMU
42717  TRP  0463   P114556  11034 A53675 013675              ENT A    W(SDTTRNOR+B4+ERIPP32+SR2)
42720  TRP  0464   P114557  52030 014764 054764              SEL CL   W(TRVSIZEM2)
..........                                          .....EMU
42721  TRP  0465   P114560  15034 A53675 013675              STR A    W(SDTTRNOR+B4+ERIPP32+SR2)
42722  TRP  0466   P114561  20000 A00001 000001              ADD A    1-             BUMP ESI VALUE BY 1        174
..........                                          .....EMU
42723  TRP  0467   P114562  15034 A53704 013704              STR A    W(SDTTRNOR+B4+ERIPP33+SR2)
42724  TRP  0468   P114563  10000 A40077 040077              ENT Q    40077-         CLEAR CP HISTORY           720
42725  TRP  0469   P114564  40013 002323 042323              ENT LP   L(SDTTS+SIZE+B3)-                          720
..........                                          .....EMU
42726  TRP  0470   P114565  15024 A53676 013676              STR A    U(SDTTRNOR+B4+SIZEREQ2+SR2)
42727  TRP  0471
42730  TRP  0472   P114566  11023 002321 042321              ENT A    U(SDTTS+B3+LZF)
42731  TRP  0473   P114567  02000 A00001 000001              RSH A    1-                                         174
42732  TRP  0474   P114570  52000 A00017 000017              SEL CL   17
42733  TRP  0475                                    *                 DELETE  DO NOT NEED TO SET UP QUAD BITS     052
..........                                          .....EMU
42734  TRP  0476   P114571  15014 A53676 013676              STR A    L(SDTTRNOR+B4+SIZEREQ2+SR2)
42735  TRP  0477                                    *
..........                                          .....EMU
42736  TRP  0478   P114572  11034 A53676 013676              ENT A    W(SDTTRNOR+B4+SIZEREQ2+SR2)
..........                                          .....EMU
42737  TRP  0479   P114573  15034 A53705 013705              STR A    W(SDTTRNOR+B4+SIZEREQ3+SR2)
42740  TRP  0480
42741  TRP  0481
42742  TRP  0482                                    *
42743  TRP  0483                                    *                 PREPARE AND COMPLETE RADAR OUTPUT QUEUE
42744  TRP  0484                                    *
42745  TRP  0485   P114574  12230 010460 050460 TRP00800  ENT B2   W(SDXROUT)
42746  TRP  0486   P114575  11036 010706 010706              ENT A    W(SDTETRNORD+B6+ROBCW2)
..........                                          .....EMU
42747  TRP  0487   P114576  15032 A54725 014725              STR A    W(SDTROUTQ+B2+SDRBCW+SR2)
42750  TRP  0488                                    *
42751  TRP  0489                                    *                 IS THIS A SET OF RGPD BEAMS
42752  TRP  0490                                    *                   YES -         CONTINUE
42753  TRP  0491                                    *                   NO  - TRP00810
42754  TRP  0492
42755  TRP  0493   P114577  11030 014756 054756              ENT A    W(TRVRGPDM)
42756  TRP  0494   P114600  10070 A00000 000000              ENT Q    A
42757  TRP  0495   P114601  43433 002320 042320              COM MASK W(SDTTS+B3+CWRD) AZERO
42760  TRP  0496   P114602  61000 P74606 114606              JP       TRP00810
42761  TRP  0497
42762  TRP  0498                                    *                 RGPD IMPLIES 25 HITS PER BEAM
42763  TRP  0499
42764  TRP  0500   P114603  11030 010300 050300              ENT A    W(SDVRGPDHIT)
..........
42765  TRP  0501   P114604  15012 A54765 014765              STR A    L(SDTROUTQ+B2+SDRHITS+SR2)
42766  TRP  0502   P114605  61000 P74611 114611              JP       TRP00820
42767  TRP  0503                                    *
42770  TRP  0504                                    *                 RETRIEVE NUMBER OF HITS PER BEAM
42771  TRP  0505

42772  TRP  0506   P114606  11023 002320 042320 TRP00810  ENT A    U(SDTTS+B3+HPB)
42773  TRP  0507   P114607  52040 A77770 077770              SEL CL   X(77770)
..........                                          .....EMU
42774  TRP  0508   P114610  15012 A54765 014765              STR A    L(SDTROUTQ+B2+SDRHITS+SR2)
42775  TRP  0509                                    *
42776  TRP  0510                                    *                 ARE WE IN THE INHIBIT ZONE
42777  TRP  0511                                    *                   YES -         CONTINUE
43000  TRP  0512                                    *                   NO  - TRP00830
43001  TRP  0513
43002  TRP  0514   P114611  11530 014726 054726 TRP00820  ENT A    W(TRVINHBT) ANOT
43003  TRP  0515   P114612  61000 P74617 114617              JP       TRP00830
43004  TRP  0516
43005  TRP  0517                                    *                 WHICH ZONE ARE WE IN
43006  TRP  0518
43007  TRP  0519   P114613  11430 014752 054752              ENT A    W(TRVQUAD) AZERO
43010  TRP  0520   P114614  04700 A00003 000003              COM A    3 YMORE
43011  TRP  0521   P114615  11100 A00001 000001              ENT A    1 SKIP
43012  TRP  0522   P114616  11000 A00002 000002              ENT A    2
43013  TRP  0523                                    *
..........                                          .....EMU
43014  TRP  0524   P114617  15022 A54765 014765 TRP00830  STR A    U(SDTROUTQ+B2+SDRINH+SR2)
43015  TRP  0525                                    *
..........                                          .....EMU
43016  TRP  0526   P114620  11024 A53675 013675              ENT A    U(SDTTRNOR+B4+ERIPP32+SR2)
43017  TRP  0527   P114621  52000 A40000 040000              SEL CL   40000
..........                                          .....EMU
43020  TRP  0528   P114622  15012 A55025 015025              STR A    L(SDTROUTQ+B2+SDRIPP+SR2)
43021  TRP  0529                                    *
43022  TRP  0530                                    *                 COMPUTE BEAM TYPE
43023  TRP  0531
43024  TRP  0532   P114623  10030 014756 054756              ENT Q    W(TRVRGPDM)
43025  TRP  0533   P114624  40433 002320 042320              ENT LP   W(SDTTS+B3+CWRD) AZERO
43026  TRP  0534   P114625  11000 A00004 000004              ENT A    4
43027  TRP  0535   P114626  15030 014765 054765              STR A    W(TRVTEMP)
43030  TRP  0536   P114627  10030 014755 054755              ENT Q    W(TRVRBCM)
..........                                          .....EMU
43031  TRP  0537   P114630  40024 A53672 013672              ENT LP   U(SDTTRNOR+B4+4ADCTRL2+SR2)
43032  TRP  0538   P114631  02000 A00004 000004              RSH A    4D
43033  TRP  0539   P114632  20030 014765 054765              ADD A    W(TRVTEMP)
..........                                          .....EMU
43034  TRP  0540   P114633  15022 A55025 015025              STR A    U(SDTROUTQ+B2+SDRBT+SR2)
43035  TRP  0541                                    *
```

```
43036  TRP  0542                                    *         INCREMENT BCW IF SIZE REQUEST                         077
43037  TRP  0543                                    *                                                              077
*********                                           *****.EMU
43040  TRP  0544  P114634  11634 A53705 013705                ENT A    W(SDTTRNQR+B4+SIZEREQ3+SR2) APOS-            077
*********                                           *****.EMU
43041  TRP  0545  P114635  36022 A54725 014725                RPL Y+1 U(SDTROUTQ+B2+SDRBCW+SR2)-                    077
43042  TRP  0546                                    *
43043  TRP  0547                                    *         UPDATE POINTER TO RADAR OUTPUT QUEUE
43044  TRP  0548                                    *
43045  TRP  0549  P114636  36030 010460 050460                RPL Y+1  W(SDXROUT)
43046  TRP  0550  P114637  04700 A00040 000040                COM A    SDVROUTL YMORE
43047  TRP  0551  P114640  16030 010460 050460                STR B0   W(SDXROUT)
43050  TRP  0552                                    *
43051  TRP  0553  P114641  12530 010460 050460                ENT B5   W(SDXROUT)
43052  TRP  0554  P114642  36030 017402 057402                RPL Y+1  W(SDVTRKBCT)-   TRACKING BEAM FIRED COUNT   118
43407  RXI  0016                                    *
43410  RXI  0017                                    *         RELEASE LOCKOUTS WHILE COMPUTING DELAY
43411  RXI  0018                                    *
43412  RXI  0019  P114772  60000 A00000 000000                RIL
43413  RXI  0020  P114773  65030 027635 067635                RJP W(RCVRXA) --- GOTO DELAY COMPUTATION
43414  RXI  0021  P114774  66011 A00000 000000                SIL ALL
43415  RXI  0022                                              PROG-SRC
43416  RXI  0023  P114775  75530 A55260 015260  RXI5          IN RXCHAN W(RXVBCWH+SR2) MONITOR- INPUT INTERFERENCE BUFFER
43417  RXI  0024                                              SYCOL-SRC
43420  RXI  0025                                    *
43421  RXI  0026                                    *         RESTORE REGISTERS AND EXIT
43422  RXI  0027                                    *
43423  RXI  0028  P114776  12230 027640 067640                ENT B2 W(RXIVSB2)
43424  RXI  0029  P114777  10030 027637 067637                ENT Q  W(RXIVSQ)
43425  RXI  0030  P115000  11030 027636 067636                ENT A W(RXIVSA)- RESTORE A REGISTER
43426  RXI  0031                                    *
43427  RXI  0032  P115001  60130 P74762 114762                RETURN RIL--- EXIT RXI
43430  RXI  0033                                              END-PROC RXI---
43431  RXE  0000                                    RXE       SYS-PROC RXE-       PALMER 1-72
43432  RXE  0001                                    *********************************************************
43433  RXE  0002                                    *********************************************************
43434  RXE  0003                                    *                C-12  EXTERNAL  INTERRUPT
43435  RXE  0004                                    *                THIS PROCEDURE IS ENTERED DUE TO THE RECEIPT OF
43436  RXE  0005                                    *                AN EXTERNAL INTERRUPT ON C-12.
43437  RXE  0006                                    *                NO DEFINITE PURPOSE HAS BEEN DEFINED FOR THIS
43440  RXE  0007                                    *                PROCEDURE-S USE. STORAGE AREA FOR PATCHES HAS
43441  RXE  0008                                    *                BEEN RESERVED.
43442  RXE  0009                                    *         INPUTS
43443  RXE  0010                                    *                REGISTERS--
43444  RXE  0011                                    *                    NONE
43445  RXE  0012                                    *                VARIABLES--
43446  RXE  0013                                    *                    NONE
43447  RXE  0014                                    *                TABLES--
43450  RXE  0015                                    *                    NONE
43451  RXE  0016                                    *         OUTPUTS
43452  RXE  0017                                    *                REGISTERS--
43453  RXE  0018                                    *                    NONE
43454  RXE  0019                                    *                VARIABLES--
43455  RXE  0020                                    *                    NONE-
43456  RXE  0021                                    *                TABLES--
43457  RXE  0022                                    *                    NONE
43460  RXE  0023                                    *         PROCEDURES REFERENCED--
43461  RXE  0024                                    *                    NONE
43462  RXE  0025  P115002  00000 A00000 000000                PROCEDURE RXE-
43463  RXE  0026  P115003  67500 A00000 000000                TERM RXCHAN OUTPUT-
43464  RXE  0027  P115004  66500 A00000 000000                TERM RXCHAN INPUT-
43465  RXE  0028  P115005  67740 A00000 000000                TERM C17 OUTPUT-
43466  RXE  0029  P115006  66640 A00000 000000                TERM C15 INPUT-    TERMINATE RADAR I/O
43467  RXE  0030  P115007  65030 020330 060330                RJP W(EXVEXR)-
43470  RXE  0031  P115010  60130 P75002 115002                RETURN RIL-
43471  RXE  0032                                              END-PROC RXE
43472  TRAN 0000                                    TRAN      SYS-PROC- JBB SPS-33
43473  TRAN 0001                                    *********************************************************
43474  TRAN 0002                                    *********************************************************
43475  TRAN 0003                                    *
43476  TRAN 0004                                    *         NONCORRELATED BEAM RETURNS ARE USED FOR TRACKING
43477  TRAN 0005                                    *         WHEN CERTAIN SYSTEM CONDITIONS ARE SATISFIED.
43500  TRAN 0006                                    *         TRAN DETERMINES THE VALIDITY OF USING THIS SINGLE
43501  TRAN 0007                                    *         BEAM RETURN TECHNIQUE.
43502  TRAN 0008                                    *
43503  TRAN 0009                                    *         INPUTS
43504  TRAN 0010                                    *                REGISTERS
43505  TRAN 0011                                    *                    B4
43506  TRAN 0012                                    *                VARIABLES
43507  TRAN 0013                                    *                    NONE
43510  TRAN 0014                                    *                TABLES
43511  TRAN 0015                                    *                    SDTTS
43512  TRAN 0016                                    *         OUTPUTS
43513  TRAN 0017                                    *                REGISTERS
43514  TRAN 0018                                    *                    Q, B3
43515  TRAN 0019                                    *                VARIABLES
43516  TRAN 0020                                    *                    NONE
43517  TRAN 0021                                    *                TABLES
43520  TRAN 0022                                    *                    NONE
43521  TRAN 0023                                    *
43522  TRAN 0024                                    *         PROCEDURES REFERENCED
43523  TRAN 0025                                    *                    NONE
43524  TRAN 0026                                    *
43525  TRAN 0027  P115011  03000 A00000 000000                PROCEDURE-TRAN-
43526  TRAN 0028  P115012  11014 002315 042315                ENT A  L(SDTTS+LZSA+B4)-  LZ SMOOTHED                041673
43527  TRAN 0029  P115013  04700 A00253 000253                COM A  253 YMORE- IF YMORE, LESS THAN .5 DEGREES     041673
43530  TRAN 0030  P115014  61030 P75011 115011                RETUR.-           SB TRACKING NOT VALID             041673
43531  TRAN 0031  P115015  11014 002322 042322                ENT A  L(SDTTS+RNGP+B4)- PREDICTED RANGE            041673
43532  TRAN 0032  P115016  04700 A01334 001334                COM A  1334 YMORE- IF YMORE, RG LT 30 MILES         041673
43533  TRAN 0033  P115017  61000 P75026 115026                JP     TRAN1-     SB TRACKING OK, SET FLAG NEG.     041673
43534  TRAN 0034  P115020  11024 002326 042326                ENT A  U(SDTTS+TAMP1+B4)-  1 BACK AMP.              041673
43535  TRAN 0035  P115021  04700 A00051 000051                COM A  51 YMORE- IF YMORE, AMP LTEQ 20DB            041673
43536  TRAN 0036  P115022  61000 P75026 115026                JP     TRAN1-     SB OK, GO SET FLAG NEG.           041673
43537  TRAN 0037  P115023  11014 002326 042326                ENT A  L(SDTTS+TAMP2+B4)-  2 BACK AMP.              041673
43540  TRAN 0038  P115024  04600 A00051 000051                COM A  51 YLESS- IF YLESS, AMP GT 20DB, SB OK       041673
```

```
43541  TRAN 0039   P115025  61030 P75011 115011     RETURN-              SB TRACKING NOT VALID           041673
43542  TRAN 0052                                  *
43543  TRAN 0053                                    DECLARE SINGLE RETURN PROCESSING VALID
43544  TRAN 0054                                  *
43545  TRAN 0055   P115026  16070 016234 056234   TRAN1   STR B0   CPW(TRVTRANSBF)- SAYS CHECK ALREADY MADE  041673
43546  TRAN 0056   P115027  10000 A00177 000177           ENT*3*CLOGMSK-GET CENTER CHANNEL AMPLITUDE EXTRACTOR
43547  TRAN 0057   P115030  36030 P75011 115011           SPL*Y+1*W(TRAN)-NORMAL EXIT
43550  TRAN 0058   P115031  61030 P75011 115011           RETURN-
43551  TRAN 0059                                          END-PROC*TRAN-
43552  TRAU 0060                                  *
43553  TRAU 0061                                  *
43554  TRAU 0000                                    TRAU    SYS-PROC- JBB SPS-33
43555  TRAU 0001                                  ****************************************************************
43556  TRAU 0002                                  ****************************************************************
43557  TRAU 0003                                  *
43560  TRAU 0004                                  *         THE UPDATE RATE IS MAINTAINED HERE AS A FUNCTION
43561  TRAU 0005                                  *         OF TRACK TYPE AND STATUS, TARGET RANGE, AND
43562  TRAU 0006                                  *         OCCURRENCE OF MISSES.  THE UPDATE RATE FOR HIGH
43563  TRAU 0007                                  *         DATA RATE (ENGAGED) TRACKS IS SPECIFIED BY NTDS
43564  TRAU 0008                                  *         AND TENTATIVE TRACKS ARE MAINTAINED AT AN UPDATE
43565  TRAU 0009                                  *         RATE ONE STEP HIGHER THAN AN ESTABLISHED TRACK
43566  TRAU 0010                                  *         IN THE SAME RANGE SECTOR.
43567  TRAU 0011                                  *
43570  TRAU 0012                                  *     INPUTS
45106  EMU  0390   P115601  21030 020106 060106           SUB A W(EMVLPONCL)
45107  EMU  0391   P115602  52030 020312 060312           SEL CL W(TEXVSPOS)
45110  EMU  0392   P115603  04630 020126 060126           COM A W(EMVLPONDT) YLESS
45111  EMU  0393   P115604  61030 P75302 115302           RETURN---                                         119
45112  EMU  0394                                  *
45113  EMU  0395                                  *  LONG PULSE WITH CFA ON NEEDS TO BE FIRED
45114  EMU  0396                                  *  SET OP FLAG AND BEAM TYPE
45115  EMU  0397                                  *
45116  EMU  0398   P115605  11000 A00002 000002   EMU16   ENT A 2-
45117  EMU  0399   P115606  15010 010205 050205           STR A   L(SDVEXEMB)-  LP ON
45120  EMU  0400   P115607  16060 010206 050206           STR B0 CPU(SDVEXEMB)- SET EMB OP FLAG
45121  EMU  0401                                  *
45122  EMU  0402                                    UPDATE  LP AND LPON TIME
45123  EMU  0403                                  *
                                                  *....EMU
45124  EMU  0404   P115610  11030 A00106 000106           ENT A W(CLOCK+SR2)
45125  EMU  0405   P115611  15030 020105 060105           STR A W(EMVLPCL)
45126  EMU  0406   P115612  15030 020106 060106           STR A W(EMVLPONCL)
45127  EMU  0407   P115613  61030 P75302 115302           RETURN ---                                       119
45130  EMU  0408                                  *
45131  EMU  0409                                  *  E X I T  E N E R G Y  M A N A G E M E N T
45132  EMU  0410                                  *
45133  EMU  0411                                  *  UPDATE EM POWER TABLE AND POINTER
45134  EMU  0412                                  *
45135  EMU  0413   P115614  12430 020116 060116   EMU17   ENT B4 W(EMXPOWER)
45136  EMU  0414   P115615  16064 020043 060043           STR B0 CPU(EMTPOWER+EMP4+B4) -  INDICATE SLOT NEEDS UPDAT
45137  EMU  0415   P115616  71400 A00037 000037           BSK B4 37
45140  EMU  0416   P115617  20000 A00000 000000           ADD A 0 -                  NO OP
45141  EMU  0417   P115620  16430 020116 060116           STR B4 W(EMXPOWER)
45142  EMU  0418   P115621  61030 P75302 115302           JP W(EMU)
45143  EMU  0419   P115622  61030 P75302 115302           RETURN-
45144  EMU  0420                                  *
45145  EMU  0421                                  *  ZERO ONE ENTRY IN PWR. TBL. DURING EMCON MODE           024
45146  EMU  0422   P115623  16034 020003 060003   EMU18   STR B0 W(EMTPOWER+EMP3+B4)-                        024
45147  EMU  0423   P115624  16034 020043 060043           STR B0 W(EMTPOWER+EMP4+B4)-                        024
45150  EMU  0424   P115625  61000 P75614 115614           JP EMU17-                                          024
45151  EMU  0425                                  *                                                         024
45152  EMU  0426                                  *                                                         024
45153  TRA  0000                                    TRA     SYS-PROC- JBB SPS-33
45154  TRA  0001                                  ****************************************************************
45155  TRA  0002                                  ****************************************************************
45156  TRA  0003                                  *
45157  TRA  0004                                  *         TRACK UPDATE IS CALLED BY THE EXECUTIVE PROGRAM
45160  TRA  0005                                  *         EACH TIME THE RETURNS FROM A SET OF BEAMS
45161  TRA  0006                                  *         INITIATED BY TRACKING ARE DETECTED IN THE RADAR
45162  TRA  0007                                  *         INPUT BUFFER.  THE A-REGISTER CONTAINS THE ESI OF
45163  TRA  0008                                  *         THE LAST BEAM IN THE SET.
45164  TRA  0009                                  *
45165  TRA  0010                                  *    INPUTS
45166  TRA  0011                                  *
45167  TRA  0012                                  *         REGISTERS
45170  TRA  0013                                  *              A, B0
45171  TRA  0014                                  *         VARIABLES
45172  TRA  0015                                  *              SDVCMCE, SDVETRBCA, SDVNTR, SDVTA, SDVTR,
45173  TRA  0016                                  *              TRVALL28, TRVAZCK, TRVELCK, TRVHTC,
45174  TRA  0017                                  *              TRVINDET, TRVLHO, TRVL1H, TRVMIDLX,
45175  TRA  0018                                  *              TRVONE28, TRVPP, TRVRAIN, TRVSEA, TRVSRMSK,
                                                  *              TRVUIH
45176  TRA  0019                                  *
45177  TRA  0020                                  *         TABLES
45100  TRA  0021                                  *              SDTESID, SDTESILOC, SDTRHDR, SDTPNTR, SDTTS,
45101  TRA  0022                                  *              SDTUS, TRTABS, TRTCLIPP, TRTCLIPP1, TRTGAG0,
45102  TRA  0023                                  *              TRTGAG1, TRTGAG2, TRTGAG3, TRTGAG4, TRTGAG6,
45103  TRA  0024                                  *              TRTGAG7, TRTGAG8, TRTGAG10, TRTGAG11,
45104  TRA  0025                                  *              TRTIPP, TRTKJC, TRTWRK
45105  TRA  0026                                  *
45106  TRA  0027                                  *    OUTPUTS
45107  TRA  0028                                  *
45110  TRA  0029                                  *         REGISTERS
45111  TRA  0030                                  *              NONE
45112  TRA  0031                                  *         VARIABLES
45113  TRA  0032                                  *              SDVLZL, SDVNTR, SDVQUAD, SDVSECTOR, SDVTLX,
45114  TRA  0033                                  *              SDVTLY, SDVTLZ, SDVTR, SDVTRKADD, SDVTULZ,
45115  TRA  0034                                  *              TRVPP
45116  TRA  0035                                  *         TABLES
45117  TRA  0036                                  *              SDTESID, SDTRHDR, SDTRNTR, SDTTRINDET,
                                                  *              SDTTS, TRTWRK
45120  TRA  0037                                  *
45121  TRA  0038                                  *    PROCEDURES REFERENCED
45122  TRA  0039                                  *              CCN, CFP, DR$TKEXT, SCC, SCRA, SCRC, SCRT, TRAB,
45123  TRA  0040                                  *              TRAG, TRAH, TRAM, TRAN, TRAU
45124  TRA  0041   P120000  00000 A00000 000000           PROCEDURE*TRA-
45125  TRA  0042                                  *
```

```
45126  TRA  0043  P120001  16030 D14675 054675          CL  W(TRVCPVRBL)-   INIT CP FLAGX                   -051072
45127  TRA  0044  P120002  16030 D12050 052050          CL  W(TRVCPFLAG)-   INIT CP FLAGX                   -051072
45130  TRA  0044  P120003  16030 D16234 056234          STR BU  W(TRVTRANSBF)-  CLEAR SINGLE BEAM FLAG       041673
45131  TRA  0044  P120004  16030 D16235 056235          STR BU  W(TRVTRABFIL)-  CLEAR FILTER FLAG            041673
45132  TRA  0045  P120005  21000 A00200 000200          SUB*A*TRMESILOC-REDUCE ESI TO INDEX
45133  TRA  0046                               *
45134  TRA  0047                               *        WERE BEAMS FIRED AT A HIGH DATA RATE TRACK
45135  TRA  0048                               *
45136  TRA  0049  P120006  04600 A00056 000056          COM*A*SDMFTRHDR*YLESS-
45137  TRA  0050  P120007  15120 C04765 044765          STR*A*U(TRTWRK+TRKTYP)*SKIP-SET NORMAL TRACK FLAG
45140  TRA  0051  P120010  15060 C04765 044765          STR*A*CPU(TRTWRK+TRKTYP)=SET HIGH DATA RATE FLAG
**********                                   *****EMU
45141  TRA  0052  P120011  15030 A40162 010162          STR*A*W(SDXB2+SR2)-                                      172
45142  TRA  0053                               *                                                                 172
45143  TRA  0054                               *        IF THESE RETURNS ARE FROM A FIRING WHERE THE UPDATE      172
45144  TRA  0055                               *        INTERVAL WAS TOO SMALL, IGNORE THE RETURNS. PROCESS      172
45145  TRA  0056                               *        RETURNS AFTER THE NEXT FIRING.                           172
45146  TRA  0057                               *                                                                 172
45147  TRA  0058                               *        ARE RETURNS FROM A HDR TRACK                             172
45150  TRA  0059                               *             YES - OK TO PROCESS                                 172
45151  TRA  0060                               *             NO  - CHECK FURTHER                                 172
45152  TRA  0061                               *                                                                 172
45153  TRA  0062  P120012  04700 A00056 000056          COM A   SDMFTRHDR YMORE-   IF YMORE, NO                  172
45154  TRA  0063  P120013  61000 P60056 120024          JP      TRA002-            YES, OK TO PROCESS            172
45155  TRA  0064                               *                                                                 172
45156  TRA  0065                               *        ARE RETURNS FROM A CONFIRMATION FIRING                   172
45157  TRA  0066                               *             YES - PROCESS THE RETURNS                           172
45160  TRA  0067                               *             NO  - CHECK UPDATE TIME INTERVAL                    172
45161  TRA  0068                               *                                                                 172
45162  TRA  0069  P120014  11022 D11044 051044          ENT A   U(SDTESID+TRKLOC+B2)-                            172
**********                                   *****EMU
45163  TRA  0070  P120015  15030 A40164 000164          STR A   W(SDXB4+SR2)-                                    172
45164  TRA  0071  P120016  11664 D02327 042327          ENT A   UX(SDTTS+SPLIT+B4) APOS- IF POS., NOT CONF.      172
45165  TRA  0072  P120017  61000 P60024 120024          JP      TRA002-            GO PROCESS RETURNS            172
45166  TRA  0073  P120020  11032 D10744 050744          ENT A   W(SDTESID+RITIME+B2) LOWER (AM RETURN TIME       172
45167  TRA  0074  P120021  21034 002312 042312          SUB A   W(SDTTS+TIME+B4)-  TIME OF LAST UPDATE           172
45170  TRA  0075  P120022  04600 A00310 000310          COM A   2000 YLESS-        IF YLESS, PROCESS RETURNS     172
45171  TRA  0076  P120023  61030 P60000 120000          RETURN-                    TIME IS TOO SHORT, IGNORE    172
45172  TRA  0077                               *
45173  TRA  0078                               *        WERE BEAMS ACTUALLY INITIATED BY TRACKING
45174  TRA  0079                               *
45175  TRA  0080  P120024  11522 D11044 051044  TRA002  ENT A   U(SDTESID+TRKLOC+B2) ANOT-                       172
45176  TRA  0081  P120025  61030 P50000 120000          RETURN-TO THE EXECUTIVE WHEN NO
45177  TRA  0199                               *
45200  TRA  0200                               *        SAVE TRACK STORE ITEM LOCATION ASSOCIATED WITH THESE BEAMS
45201  TRA  0201                               *
45202  TRA  0202  P120026  11022 D11044 051044          ENT A   U(SDTESID+TRKLOC+B2)-   REL. ADDR. OF TRACK      172
**********                                   *****EMU
45203  TRA  0203  P120027  15030 A40164 000164          STR*A*W(SDXB4+SR2)-
45204  TRA  0204                               *
45205  TRA  0205                               *        WAS TRACK DROPPED SINCE BEAMS WERE FIRED
45206  TRA  0206                               *
45207  TRA  0207  P120030  11514 D02311 042311          ENT A   L(SDTTS+TRKN+B4) ANOT- IF ANOT, NO              041773
45210  TRA  0208  P120031  61000 P62300 122300          JP*TRA998-YES
45211  TRA  0209                               *
45212  TRA  0210                               *        CALCULATE TIME ELAPSED SINCE LAST UPDATE
45213  TRA  0211                               *
45214  TRA  0212                               *        DROP TRACKS                                             051072
45215  TRA  0213  P120032  11054 C02315 042315          ENT A LX(SDTTS+LZSA+B4)- PICKUP ANGLE                   051072
45216  TRA  0214  P120033  04700 A00253 000253          COM A   253 YMORE-  IF YMORE, LZ LTEQ .6 DEGREES        041673
45217  TRA  0215  P120034  61000 P60052 120052          JP      TRA155-     DO NOT DROP                         041673
45220  TRA  0215  P120035  11000 A04350 004350          ENT A   4350-       93 MILES                            041673
45221  TRA  0215  P120036  04714 D02322 042322          COM A   L(SDTTS+RNGP+B4) YMORE- IF YMORE, RG GT 93      041673
45222  TRA  0215  P120037  61000 P60052 120052          JP      TRA155-     DO NOT DROP                         041673
45223  TRA  0215  P120040  10000 A60000 060000          ENT G   60000-      CC BITS MASK                        041673
45224  TRA  0215  P120041  40022 011343 051343          ENT LP  U(SDTESID+INTER-1+B2)- UP. BM INT. CC BITS      041673
45225  TRA  0216  P120042  21500 A60000 060000          SUB A   60000 ANOT- IF ANOT, NOT RGPD                   041673
45226  TRA  0216  P120043  61000 P60047 120047          JP      TRA154-     IS RGPD, SET UP TO DROP             041673
45227  TRA  0216  P120044  40022 C11344 051344          ENT LP  U(SDTESID+INTER+B2)- LWR BM INT. CC BITS        041673
45230  TRA  0216  P120045  21400 A60000 060000          SUB A   60000 AZERO- IF AZERO, RGPD                     041673
45231  TRA  0216  P120046  61000 P60052 120052          JP      TRA155-     NOT RGPD ON EITHER, NO DROP         041673
45232  TRA  0216  P120047  11000 A00031 000031  TRA154  ENT A   31-         ENOUGH MISSES TO CAUSE DROP         041673
45233  TRA  0217  P120050  15014 D02317 042317          STR A   L(SDTTS+J+B4)-                                 -051072
45234  TRA  0218  P120051  61000 P63137 123137          JP      TRA51-      PROCESS MISS                       -051072
45235  TRA  0219                               *                                                               041473
45236  TRA  021901                             *        CHECK LIMIT BITS - IF BOTH ARE ZERO, NO CHANGE.        041473
45237  TRA  021902                             *        IF EITHER OR BOTH BITS ARE NOT ZERO, THEN              041473
45240  TRA  021903                             *        IF RGPD WAS FIRED AND IF                               041473
45241  TRA  021904                             *        1) TDA ON, IF VVA+15DB LESS THAN OR EQUAL TO 30DB,     041473
45242  TRA  021905                             *              USE IT AS NEW VVA.                               041473
45243  TRA  021906                             *        2) TDA ON, IF VVA+15DB GREATER THAN 30DB, THEN TURN    041473
45244  TRA  021907                             *              TDA OFF, USE ORIGINAL VVA AS NEW VVA.            041973
45245  TRA  021908                             *        3) TDA OFF, USE ORIG. VVA +15DB AS NEW VVA.            041473
45246  TRA  021909                             *        IF LP_4 OR LPC2                                        041473
45247  TRA  021910                             *        A) CHANGE TO LPC1.                                     041473
45250  TRA  021911                             *        IF 1), 2), 3), OR A), DO NOT PROCESS THESE             041473
45251  TRA  021912                             *        RETURNS, BUT JUMP TO PLACE WHERE EXTRACTION            041473
45252  TRA  021913                             *        AND RECORDING IS DONE.                                 041473
45253  TRA  021914                             *                                                               041473
45254  TRA  021916  P120052  10000 A00001 000001 TRA155 ENT G   1-          MASK FOR LIMIT BIT                 041473
45255  TRA  021918  P120053  40422 011343 051343        ENT LP  U(SDTESID+INTER-1+B2) AZERO-                    041973
45256  TRA  021919  P120054  61000 P60057 120057        JP      TRA15503-   UPPER BEAM LIMIT BIT SET           041473
45257  TRA  021920  P120055  40522 011344 051344        ENT LP  U(SDTESID+INTER+B2) ANOT-                       041473
45260  TRA  021922  P120056  61000 P60113 120113        JP      TRA156-     NEITHER BIT SET, NO CHANGE         041473
45261  TRA  021924  P120057  10024 002320 042320 TRA15503 ENT Q U(SDTTS+CXMIT+B4)- WORD WITH CP BITS TO A      041473
45262  TRA  021926  P120060  40000 A01400 001400        ENT LP  1400-       KEEP CP BITS ONLY                   041473
45263  TRA  021928  P120061  21400 A01400 001400        SUB A   1400 AZERO- IF AZERO, RGPD                      041473
45264  TRA  021930  P120062  61000 P60105 120105        JP      TRA15512-   NOT RGPD, MAKE LP CHECK            041473
45265  TRA  021932  P120063  13014 002320 042320        ENT LP  L(SDTTS+TDAA+B4)-  TDA WORD INTO Q             041473
45266  TRA  021934  P120064  40500 A00001 000001        ENT LP  ANOT-       IF ANOT, TDA IS ON                  041473
45267  TRA  021936  P120065  61000 P60100 120100        JP      TRA15510-   TDA OFF                             041473
45270  TRA  021938  P120066  40000 A00160 000160        ENT LP  160-        KEEP VVA BITS ONLY                  041473
45271  TRA  021940  P120067  23000 A00060 000060        ADD A   60-         ADD 15 DB TO VALUE IN A             041473
45272  TRA  021942  P120070  15030 D16227 056227        STR A   W(TRAVVASAVE)- SAVE NEW VVA                     041473
45273  TRA  021944  P120071  04700 A00160 000160        COM A   160 YMORE- IF YMORE, VVA NOT MORE THAN 30DB    041473
```

| | | | | | | | | |
|---|---|---|---|---|---|---|---|---|
| 45274 | TRA | 021946 | P120072 | 40100 A77577 077577 | | ENT LP | 77577 SKIP- CLEAR TOA BIT, TURN TOA OFF | 041473 |
| 45275 | TRA | 021948 | P120073 | 61000 P60102 120102 | | JP | TRA15523- GO PUT VVA IN A INTO SDTTS | 041473 |
| 45276 | TRA | 021950 | P120074 | 15014 D02320 042320 | | STR A | L(SDTTS+TDAA+B4)- INTO SDTTS | 041473 |
| 45277 | TRA | 021952 | P120075 | 11030 D16227 056227 | | ENT A | W(TRAVVASAVE)- GET SAVED VVA | 041473 |
| 45300 | TRA | 021954 | P120076 | 21000 A00060 000060 | | SUB A | 60- LESS 15 DB | 041473 |
| 45301 | TRA | 021956 | P120077 | 61000 P60102 120102 | | JP | TRA15523- GO PUT VVA IN A INTO SDTTS | 041473 |
| 45302 | TRA | 021958 | P120100 | 40000 A00160 000160 | TRA15510 | ENT LP | 160- KEEP VVA BITS ONLY | 041473 |
| 45303 | TRA | 021960 | P120101 | 20000 A00060 000060 | | ADD A | 60- NOW HAVE OLD VVA + 15DB | 041473 |
| 45304 | TRA | 021962 | P120102 | 10000 A77617 077617 | TRA15523 | ENT Q | 77617- VVA REPLACE MASK | 041473 |
| 45305 | TRA | 021964 | P120103 | 57014 D02320 042320 | | SE SJ | L(SDTTS+TDAA+B4)- VVA INTO WORD | 041473 |
| 45306 | TRA | 021966 | P120104 | 61000 P62276 122276 | | JP | TRA9991- END PROCESSING, GO RECORD | 041473 |
| 45307 | TRA | 021968 | P120105 | 40000 A00060 000060 | TRA15512 | ENT LP | 60- KEEP TE BITS ONLY | 041473 |
| 45310 | TRA | 021970 | P120106 | 21400 A00060 000060 | | SUB A | 60 AZERO- IF AZERO, TE IS 10 | 041473 |
| 45311 | TRA | 021972 | P120107 | 61000 P60113 120113 | | JP | TRA156- NO CHANGE | 041473 |
| 45312 | TRA | 021974 | P120110 | 40000 A77770 077770 | | ENT LP | 77770- KEEP ALL BUT HITS PER BEAM | 041473 |
| 45313 | TRA | 021976 | P120111 | 15024 D02320 042320 | | STR A | U(SDTTS+CXNIT+B4)- PUT WORD BACK | 041473 |
| 45314 | TRA | 021978 | P120112 | 61000 P62276 122276 | | JP | TRA9991- END PROCESSING, GO RECORD | 041473 |
| 45315 | TRA | 021982 | | | | | | 041473 |
| 45316 | TRA | 021984 | | | | * END OF PROCESSING OF LIMIT BITS | | 041473 |
| 45317 | TRA | 021986 | | | | * | | 041473 |
| 45320 | TRA | 021988 | P120113 | 10032 D10744 050744 | TRA156 | ENT Q | W(SDTESID+RITIME+52)- IN TIME OF LWR BEAM | 041473 |
| 45321 | TRA | 0220 | P120114 | 27034 D02312 042312 | | SUB*Q*W(SDTTS+TIME+B4)-BEAM IN SET | | |
| 45322 | TRA | 0221 | P120115 | 14030 D04766 044766 | | STR*Q*W(TRTWRK+TIMEDF)-SAVE ELAPSED TIME | | |
| 45323 | TRA | 0222 | | | * | | | |
| 45324 | TRA | 0223 | | | * | IS THIS A TENTATIVE TRACK | | |
| 45325 | TRA | 0224 | | | * | | | |
| 45326 | TRA | 0225 | P120116 | 11424 D02313 042313 | | ENT*A*U(SDTTS+TNTV+B4)-AZERO- | | |
| 45327 | TRA | 0226 | P120117 | 52540 A67777 767777 | | SEL*CL*-TNTVMSK*ANOT- | | |
| 45330 | TRA | 0227 | P120120 | 15120 D04770 044770 | | STR*A*U(TRTWRK+STATUS)*SKIP-SET ESTABLISHED TRACK FLAG | | |
| 45331 | TRA | 0228 | P120121 | 15160 D04770 044770 | | STR*A*CPU(TRTWRK+STATUS)*SKIP-SET TENTATIVE TRACK FLAG | | |
| 45332 | TRA | 0229 | P120122 | 61000 P60142 120142 | | JP*TRA16-NO | | |
| 45333 | TRA | 0230 | | | * | | | |
| 45334 | TRA | 0231 | | | * | EXTRAPOLATE PRIORITY RANGE FOR THIS LOOK | | |
| 45335 | TRA | 0232 | | | * | | | |
| 45336 | TRA | 0233 | P120123 | 22064 D02315 042315 | | MUL*UX(SDTTS+RNGR+B4)- | | |
| 45337 | TRA | 0234 | P120124 | 03000 A00014 000014 | | RSH*AQ*12D- | | |
| 45340 | TRA | 0235 | P120125 | 26014 D02313 042313 | | ADD*Q*L(SDTTS+RNGS+B4)- | | |
| 45341 | TRA | 0236 | P120126 | 01000 A00002 000002 | | RSH*Q*2- | | |
| 45342 | TRA | 0237 | P120127 | 14014 D02322 042322 | | STR*Q*L(SDTTS+RNGP+B4)-SAVE EXTRAPOLATED RANGE | | |
| 45343 | TRA | 0238 | | | * | | | |
| 45344 | TRA | 0239 | | | * | EXTRAPOLATE PRIORITY AZIMUTH DIRECTION COSINES FOR THIS | | |
| 45345 | TRA | 0240 | | | * | LOOK | | |
| 45346 | TRA | 0241 | | | * | | | |
| 45347 | TRA | 0242 | P120130 | 10064 D02316 042316 | | ENT*Q*UX(SDTTS+LXR+B4)- | | |
| 45350 | TRA | 0243 | P120131 | 22030 D04766 044766 | | MUL*W(TRTWRK+TIMEDF)- | | |
| 45351 | TRA | 0244 | P120132 | 03000 A00012 000012 | | RSH*AQ*10D- | | |
| 45352 | TRA | 0245 | P120133 | 26064 D02314 042314 | | ADD*Q*UX(SDTTS+LXSA+B4)- | | |
| 45353 | TRA | 0246 | P120134 | 14024 D02325 042325 | | STR*Q*U(SDTTS+LXP+B4)-SAVE EXTRAPOLATED LX | | |
| 45354 | TRA | 0247 | P120135 | 10054 D02316 042316 | | ENT*Q*LX(SDTTS+LYR+B4)- | | |
| 45355 | TRA | 0248 | P120136 | 22030 D04766 044766 | | MUL W(TRTWRK+TIMEDF)- | | 820 |
| 45356 | TRA | 0249 | P120137 | 03000 A00012 000012 | | RSH AQ 10D- | | 820 |
| 45357 | TRA | 0250 | P120140 | 26054 D02314 042314 | | ADD Q LX(SDTTS+LYSA+B4)- | | -051072 |
| 45360 | TRA | 0251 | P120141 | 14014 D02325 042325 | | STR Q L(SDTTS+LYP+B4)- EXTRAPOLATED LY | | 820 |
| 45361 | TRA | 0252 | | | * | | | 988 |
| 45362 | TRA | 0253 | | | * | | | 988 |
| 45363 | TRA | 0254 | | | * | SET UP CLUTTER HISTORY, SET UP FLAG TO SAY | | 988 |
| 45364 | TRA | 0255 | | | * | WHETHER TO CHANGE CLUTTER MODE OR STAY THE SAME | | 988 |
| 45365 | TRA | 0256 | | | * | | | 988 |
| 45366 | TRA | 0257 | P120142 | 11000 A00003 000003 | TRA15 | ENT A | 3- MORE THAN 3 MISSES | 988 |
| 45367 | TRA | 0258 | P120143 | 04614 D02317 042317 | | COM A | L(SDTTS+J+B4) YLESS- IF YLESS, NO | 030673 |
| 45370 | TRA | 0259 | P120144 | 61000 P60226 120226 | | JP | TRA1606- YES, DO NOT DO CP | 988 |
| 45371 | TRA | 0260 | | 10000 A01400 001400 | | ENT Q | CPMSK- | 988 |
| 45372 | TRA | 0261 | P120145 | 40024 D02320 042320 | | ENT LP | U(SDTTS+CP+B4)- GET CLUTTER CODE | 988 |
| 45373 | TRA | 0262 | P120147 | 21400 A01400 001400 | | SUB A | 1400 AZERO- IF AZERO, CC IS 11 | 988 |
| 45374 | TRA | 0263 | P120150 | 61000 P60230 120230 | | JP | TRA1602- RGPD NOT FIRED | 988 |
| 45375 | TRA | 0264 | P120151 | 11000 A04350 004350 | | ENT A | 4350- 100 MILES | 988 |
| 45376 | TRA | 0265 | P120152 | 04614 D02322 042322 | | COM A | L(SDTTS+RNGP+B4) YLESS- IS RG OVER 100 MI. | 988 |
| 45377 | TRA | 0266 | P120153 | 61000 P60226 120226 | | JP | TRA1606- YES | 988 |
| 45400 | TRA | 0267 | P120154 | 10000 A60000 060000 | | ENT Q | CCINMSK- NO, GET MASK OF 60000 | 988 |
| 45401 | TRA | 0268 | P120155 | 40022 D11342 051342 | | ENT LP | U(SDTESID+CCIN-2+B2)- | 820 |
| 45402 | TRA | 0269 | P120156 | 02000 A00015 000015 | | RSH A | 13D- KEEP CP BITS ONLY | 820 |
| 45403 | TRA | 0270 | P120157 | 21400 A00001 000001 | | SUB A | 1 AZERO- IF AZERO, BAD CC | 820 |
| 45404 | TRA | 0271 | P120160 | 20100 A00001 000001 | | ADD A | 1 SKIP- | 820 |
| 45405 | TRA | 0272 | P120161 | 11000 A00003 000003 | | ENT A | 3- IS 01, USE 11, NO CHG | 820 |
| 45406 | TRA | 0273 | P120162 | 04600 A00003 000003 | | COM A | 3 YLESS- IF YLESS, CP IS 11 | 820 |
| 45407 | TRA | 0274 | P120163 | 61000 P60202 120202 | | JP | TRA1603- SEE IF CAN GO LOWER | 820 |
| 45410 | TRA | 0275 | P120164 | 15030 D14675 054675 | | STR A | W(TRVCPVRBL)- TEMPORARY SAVE | 820 |
| 45411 | TRA | 0276 | P120165 | 06000 A00006 000006 | TRA1601 | LSH A | 6- | 820 |
| 45412 | TRA | 0277 | P120166 | 15030 D12051 052051 | | STR A | W(TRKCPSAV)- | 820 |
| 45413 | TRA | 0278 | P120167 | 10000 A07700 007700 | | ENT Q 7700- CP HISTORY BIT MSK | 051072 |
| 45414 | TRA | 0279 | P120170 | 40014 D02323 042323 | | ENT LP | L(SDTTS+LWRDC+B4)- | 820 |
| 45415 | TRA | 0280 | P120171 | 52000 A06000 006000 | | SEL CL | 6000- KNOCK OFF 2 OLDEST BITS | 820 |
| 45416 | TRA | 0281 | P120172 | 06000 A00002 000002 | | LSH A | 2- | 820 |
| 45417 | TRA | 0282 | P120173 | 24030 D12051 052051 | | RPL A+Y | W(TRKCPSAV)- | 820 |
| 45420 | TRA | 0283 | P120174 | 10000 A40077 040077 | | ENT Q | 40077- | 820 |
| 45421 | TRA | 0284 | P120175 | 41014 D02323 042323 | | ADD LP | L(SDTTS+LWRDC+B4)- | 820 |
| 45422 | TRA | 0285 | P120176 | 15014 D02323 042323 | | STP A | L(SDTTS+LWRDC+B4)- | 820 |
| 45423 | TRA | 0286 | P120177 | 11030 D14675 054675 | | ENT A | W(TRVCPVRBL)- | 820 |
| 45424 | TRA | 0287 | P120200 | 15030 D12050 052050 | | STR A | W(TRVCPFLAG)- | 820 |
| 45425 | TRA | 0288 | P120201 | 61000 P60311 120311 | | JP | TRA1699- | 820 |
| 45426 | TRA | 0289 | P120202 | 10014 D02323 042323 | TRA1603 | ENT Q | L(SDTTS+LWRDC+B4)- CP HISTORY WORD | 820 |
| 45427 | TRA | 0290 | P120203 | 05000 A00022 000022 | | LSH Q | 18D- CP BITS LEFT JUSTIFIED | 820 |
| 45430 | TRA | 0291 | P120204 | 11000 A00000 000000 | | CL | A- | 820 |
| 45431 | TRA | 0292 | P120205 | 07000 A00002 000002 | | LSH A | 2- | 820 |
| 45432 | TRA | 0293 | P120206 | 15030 D12051 052051 | | STR A | W(TRKCPSAV)- | 820 |
| 45433 | TRA | 0294 | P120207 | 11000 A00000 000000 | | CL | A- | 820 |
| 45434 | TRA | 0295 | P120210 | 07000 A00002 000002 | | LSH A | 2- | 820 |
| 45435 | TRA | 0296 | P120211 | 24030 D12051 052051 | | RPL A+Y | W(TRKCPSAV)- | 820 |
| 45436 | TRA | 0297 | P120212 | 11000 A00000 000000 | | CL | A- | 820 |
| 45437 | TRA | 0298 | P120213 | 07000 A00002 000002 | | LSH A | 2- | 820 |
| 45440 | TRA | 0299 | P120214 | 24030 D12051 052051 | | RPL A+Y | W(TRKCPSAV)- | 820 |
| 45441 | TRA | 0300 | P120215 | 21500 A00007 000007 | | SUB A | 7 ANOT- | 820 |
| 45442 | TRA | 0301 | P120216 | 61000 P60226 120226 | | JP | TRA1606- | 820 |
| 45443 | TRA | 0302 | P120217 | 20000 A00007 000007 | | ADD A | 7- | 820 |
| 45444 | TRA | 0303 | P120220 | 21500 A00004 000004 | | SUB A | 4 ANOT- | 820 |
| 45445 | TRA | 0304 | P120221 | 61000 P60226 120226 | | JP | TRA1606- | 820 |

```
45446  TRA  0305   P120222  11000 A00003 000003             ENT A 3                                                 -051072
45447  TRA  0306   P120223  15030 D14675 054675             STR A W(TRVCPVRBL)-                                     -051072
45450  TRA  0307   P120224  11000 A00002 000002             ENT A       2-                      GO LOWER FOR HISTORY    820
45451  TRA  0308   P120225  61000 P60165 120165             JP          TRA1601-                                        820
45452  TRA  0309   P120226  16070 D12050 052050 TRA1606     STR B       CPW(TRVCPFLAG)-         SAYS GO LOWER           820
45453  TRA  0310   P120227  61000 P60311 120311             JP          TRA1699-                CONTINUE MODE SELECTION 820
45454  TRA  0311   P120230  10000 A60000 050000 TRA1602     ENT Q       CCINMSK-                                        820
45455  TRA  0312   P120231  40022 D11344 051344             ENT LP      U(SDTESID+CCIN+B2)-                             820
45456  TRA  0313   P120232  02000 A00015 000015             RSH A       13D-                                            820
45457  TRA  0314   P120233  04700 A00003 000003             COM A       3 YMORE-   IF YMORE, CC IS NOT 11               820
45460  TRA  0315   P120234  61000 P60250 120250             JP          TRA1610-                CC IS 11, STORE 3       820
45461  TRA  0316   P120235  40022 D11343 051343             ENT LP      U(SDTESID+CCIN-1+B2)-                           820
45462  TRA  0317   P120236  02000 A00015 000015             RSH A       13D-                                            820
45463  TRA  0318   P120237  04700 A00003 000003             COM A       3 YMORE-  IF YMORE, CC IS NOT 11                820
45464  TRA  0319   P120240  61000 P60250 120250             JP          TRA1610-                CC IS 11, STORE 3       820
45465  TRA  0320   P120241  40022 D11344 051344             ENT LP      U(SDTESID+CCIN+B2)-                             820
45466  TRA  0321   P120242  21400 A40000 040000             SUB A       40000 AZERO-                                    820
45467  TRA  0322   P120243  61000 P60246 120246             JP          TRA1611-                BOTH NOT 10, NO CHANGE  820
45470  TRA  0323   P120244  40022 D11343 051343             ENT LP      U(SDTESID+CCIN-1+B2)- 1 IS 10, CHECK OTHER      820
45471  TRA  0324   P120245  21400 A40000 040000             SUB A       40000 AZERO-            IF AZERO, BOTH 10, GO DOWN820
45472  TRA  0325   P120246  11130 A00000 000000 TRA1611     CL A        SKIP-      BOTH NOT 10, NO CHG                  820
45473  TRA  0326   P120247  11000 A00002 000002             ENT A       2-         SAYS GO DOWN                         988
45474  TRA  0327   P120250  15030 D12050 052050 TRA1610     STR A       W(TRVCPFLAG)-                                   820
45475  TRA  0328   P120251  60400 P60165 120165             JP          TRA1601 AZERO-          IF AZERO, NO CHANGE     820
45476  TRA  0329   P120252  11000 A00000 000000             CL          A-                                              820
45477  TRA  0330   P120253  10014 D02323 042323             ENT Q       L(SDTTS+LWRDC+B4)-  CP HISTORY WORD             820
45500  TRA  0331   P120254  05000 A00022 000022             LSH Q       18D-                    CP BITS LEFT JUSTIFIED  820
45501  TRA  0332   P120255  07000 A00002 000002             LSH A       2-                                              820
45502  TRA  0333   P120256  15030 D12051 052051             STR A       W(TRKCPSAV)-                                    820
45503  TRA  0334   P120257  11000 A00000 000000             CL          A-                                              820
45504  TRA  0335   P120260  07000 A00002 000002             LSH AQ      2-                                              820
45505  TRA  0336   P120261  24030 D12051 052051             RPL A+Y     W(TRKCPSAV)-                                    820
45506  TRA  0337   P120262  11000 A00000 000000             CL          A-                                              820
45507  TRA  0338   P120263  07000 A00002 000002             LSH AQ      2-                                              820
45510  TRA  0339   P120264  24030 D12051 052051             RPL A+Y     W(TRKCPSAV)-                                    820
45511  TRA  0340   P120265  15000 A00000 000000             STR A Q-                                                -051072
45512  TRA  0341   P120266  31400 A00010 000010             ENT Y-Q 10 AZERO-  CK FOR SUM OF 10 OR 6                -051072
45513  TRA  0342   P120267  31500 A00006 000006             ENT Y-Q 6 ANOT-  CK FOR 6                               -051072.
45514  TRA  0343   P120270  61000 P60303 120303             JP TRA1607-   10 OR 6 FOR SUM                           -051072
45515  TRA  0344   P120271  31400 A00007 000007             ENT Y-Q 7 AZERO-  CK FOR 7 OR 4                         -051072
45516  TRA  0345   P120272  31500 A00004 000004             ENT Y-Q 4 ANOT-  CK FOR 4                               -051072
45517  TRA  0346   P120273  61000 P60276 120276             JP TRA1608-   SUM EQ 7 OR 4                             -051072
45520  TRA  0347                                    *       TRA 007187-007189   DELETED                             -051072
45521  TRA  0348   P120274  11030 D12050 052050             ENT A       W(TRVCPFLAG)-           CP BITS INTO A          820
45522  TRA  0349   P120275  61000 P60165 120165             JP          TRA1601-                                        820
45523  TRA  0350   P120276  11030 D12050 052050 TRA1608     ENT A       W(TRVCPFLAG)-           CP BITS                 820
45524  TRA  0351   P120277  21500 A00002 000002             SUB A       2 ANOT-                 IF ANOT, CP NOT 2       820
45525  TRA  0352   P120300  61000 P60226 120226             JP          TRA1606-                GO SAY GO LOWER         820
45526  TRA  0353   P120301  11030 D12050 052050             ENT A       W(TRVCPFLAG)-           CP INTO A               820
45527  TRA  0354   P120302  61000 P60165 120165             JP          TRA1601-                                        820
45530  TRA  0355   P120303  11030 D12050 052050 TRA1607     ENT A       W(TRVCPFLAG)-           GET THIS CP             820
45531  TRA  0356   P120304  04600 A00003 000003             COM A       3 YLESS-                IF YLESS, CP IS 3       820
45532  TRA  0357   P120305  61000 P60165 120165             JP          TRA1601-                                        820
45533  TRA  0358                                    *       INHIBIT ENTRY/LEAVE CP IF RANGE GT 100MI                -051072
45534  TRA  0359   P120306  11000 A04350 004350             ENT A 4350-   100 MI                                    -051072
45535  TRA  0360   P120307  04614 D02322 042322             COM A L(SDTTS+B4+RNGP) YLESS-  IS RANGE GT 100 MI       -051072
45536  TRA  0361   P120310  16030 D12050 052050             CL W(TRVCPFLAG)-  YES, INHIBIT                          -051072
45537  TRA  0362                                    *                                                                   130
45540  TRA  0363                                    *       SET UP XR5 WITH A VALUE TO BE USED TO INDICATE              130
45541  TRA  0364                                    *       AN UPDATE RATE                                              130
45542  TRA  0365                                    *                                                                   130
45543  TRA  0366   P120311  11760 D04765 044765 TRA1699     ENT A       UX(TRTWRK+TRKTYP) ANEG-  IS TRACK HDR           820
45544  TRA  0367   P120312  61000 P60323 120323             JP          TRA163-                  NO                     130
45545  TRA  0368   P120313  11654 D02311 042311             ENT A       LX(SDTTS+UPR+B4) APOS- IS IT A .1 SEC HDR       130
45546  TRA  0369   P120314  10100 A00007 000007             ENT Q       7  SKIP-                 YES                    130
45547  TRA  0370   P120315  11120 D15720 055720             ENT A       U(TRTGAG1+RMAX) SKIP-  NO                       130
45550  TRA  0371   P120316  61000 P60326 120326             JP          TRA165-                                         130
45551  TRA  0372   P120317  04714 D02313 042313             COM A       L(SDTTS+RNGS+B4) YMORE-  IS RANGE GREATER       130
45552  TRA  0373   P120320  10100 A00005 000005             ENT Q       5 SKIP-                  THAN 15 NM - NO        130
45553  TRA  0374   P120321  10000 A00006 000006             ENT Q       6-                                   YES        130
45554  TRA  0375   P120322  61000 P60326 120326             JP          TRA165-.                                        130
45555  TRA  0376   P120323  10000 A34000 034000 TRA163      ENT Q       UPRTMSK-                                        130
45556  TRA  0377   P120324  40014 D02311 042311             ENT LP      L(SDTTS+UPRT+B4)-                               130
45557  TRA  0378   P120325  03000 A00051 000051             RSH AQ      UPRTLSB+30D-                                    130
                                                    .....EMU
.........
45560  TRA  0379   P120326  14030 A40165 000165 TRA165      STR Q       W(SDXB5+SR2)-   SAVE UPDATE RATE INDEX          130
45561  TRA  0380                                    *
45562  TRA  0381                                    *       RANGE CORRELATION COMPARES RETURNS FROM THE LOWER BEAM WITH
45563  TRA  0382                                    *       THOSE FROM THE UPPER, OBTAINING A SERIES OF BEST RANGE
45564  TRA  0383                                    *       MATCHES.  PAIRS ARE SELECTED FOR TRACK CORRELATION BASED ON
45565  TRA  0384                                    *       THEIR SEPARATION SATISFYING A RANGE BIN CRITERION.
45566  TRA  0385                                    *
45567  TRA  0386                                    *       ARE ANY RETURNS IN LOWER BEAM
45570  TRA  0387                                    *
45571  TRA  0388   P120327  11012 D10544 050544             ENT A       L(SDTESID+RIBCWSA+B2)- CHG WAS REMOVE LABEL    130
                                                    .....EMU
.........
45572  TRA  0389   P120330  04712 A40200 000200             COM*A*L(SDTESILOC+RIBCWS+B2+SR2)*YMORE-
45573  TRA  0390   P120331  61000 P63103 123103             JP*TRA1-LOWER BEAM VOID
                                                    .....EMU
.........
45574  TRA  0391   P120332  15030 A40167 000167             STR*A*W(SDXB7+SR2)-SAVE STARTING LOCATION OF LIST
                                                    .....EMU
.........
45575  TRA  0392   P120333  11012 A40200 000200             ENT*A*L(SDTESILOC+RIBCWS+B2+SR2)-
45576  TRA  0393   P120334  04722 D10544 050544             COM*A*U(SDTESID+RIBCWEA+B2)*YMORE-KEEP ENDING LOCATION
45577  TRA  0394   P120335  11022 D10544 050544             ENT*A*U(SDTESID+RIBCWEA+B2)-WITHIN INPUT LIST
45600  TRA  0395   P120336  15010 D04752 044752             STR*A*L(TRTWRK+ENDLO)-SAVE ENDING LOCATION
45601  TRA  0396                                    *
45602  TRA  0397                                    *       ARE ANY RETURNS IN UPPER BEAM
45603  TRA  0398                                    *
45604  TRA  0399   P120337  11012 D10543 050543             ENT*A*L(SDTESID+RIBCWSA-1+B2)-
                                                    .....EMU
.........
45605  TRA  0400   P120340  04712 A40177 000177             COM*A*L(SDTESILOC+RIBCWS-1+B2+SR2)*YMORE-
45606  TRA  0401   P120341  61000 P63061 123061             JP*TRA2-UPPER BEAM VOID
                                                    .....EMU
.........
45607  TRA  0402   P120342  15030 A40166 000166             STR*A*W(SDXB6+SR2)-SAVE STARTING LOCATION
                                                    .....EMU
.........
45610  TRA  0403   P120343  11012 A40177 000177             ENT*A*L(SDTESILOC+RIBCWS-1+B2+SR2)-
45611  TRA  0404   P120344  04722 D10543 050543             COM*A*U(SDTESID+RIBCWEA-1+B2)*YMORE-KEEP ENDING LOCATION
```

```
45612  TRA  0405   P120345  11022 210543 050543          ENT*A*U(SDTESID+RIBCWEA-1+B2)-WITHIN INPUT LIST
45613  TRA  0406                                         STR*A*U(TRTWRK+ENDUP)-SAVE ENDING LOCATION
45614  TRA  0407                                    *
45615  TRA  0408                                    *    FIND 1 RETURN FROM EACH BEAM CLOSEST IN RANGE
45616  TRA  0409                                    *
45617  TRA  0410   P120347  12300 A00011 000011          ENT*B3*TRMRPB-1-SET WORKING STORAGE LIMITS
                                                    ....EMU
45620  TRA  0411   P120350  10026 A40000 000000 TRA9     ENT*Q*U(DR+B6+SR2)-COMPARE DELTA RANGES
                                                    ....EMU
45621  TRA  0412   P120351  04227 A40000 000000          COM*Q*U(DR+B7+SR2)*YLESS-
45622  TRA  0413   P120352  61000 P60405 120405          JP*TRA3-LOWER EXCEEDS UPPER
                                                    ....EMU
45623  TRA  0414   P120353  27527 A40000 000000          SUB*Q*U(DR+B7+SR2)*QNOT-
45624  TRA  0415   P120354  61000 P60367 120367          JP*TRA4-UPPER EQUALS LOWER
45625  TRA  0416   P120355  14010 004765 044765 TRA7     STR*Q*L(TRTWRK+DRDIF)-SAVE RANGE DIFFERENCE
45626  TRA  0417   P120356  11007 A00002 000002          ENT*A*B7+TRMWPR-IS LOWER BEAM LIST EXHAUSTED
45627  TRA  0418   P120357  04710 004752 044752          COM*A*L(TRTWRK+ENDLO)-
45630  TRA  0419   P120360  61000 P60475 120475          JP*TRA5-YES
                                                    ....EMU
45631  TRA  0420   P120361  15030 A40167 000167          STR*A*W(SDXB7+SR2)-STEP TO NEXT LOWER RETURN
                                                    ....EMU
45632  TRA  0421   P120362  10026 A40000 000000          ENT*Q*U(DR+B6+SR2)-DOES LOWER NOW EXCEED UPPER
                                                    ....EMU
45633  TRA  0422   P120363  04227 A40000 000000          COM*Q*U(DR+B7+SR2)*YLESS-
45634  TRA  0423   P120364  61000 P60444 120444          JP*TRA6-YES
                                                    ....EMU
45635  TRA  0424   P120365  27427 A40000 000000          SUB*Q*U(DR+B7+SR2)*QZERO-ARE THEIR RANGES EQUAL
45636  TRA  0425   P120366  61000 P60355 120355          JP*TRA7-NO
45637  TRA  0426                                    *
45640  TRA  0427                                    *    SAVE LOCATION OF THIS PAIR
45641  TRA  0428                                    *
                                                    ....EMU
45642  TRA  0429   P120367  16623 004740 044740 TRA4     STR*B6*U(TRTWRK+PXUP+B3)-
                                                    ....EMU
45643  TRA  0430   P120370  16713 004740 044740          STR*B7*L(TRTWRK+PXLO+B3)-
45644  TRA  0431                                    *
45645  TRA  0432                                    *    AVERAGE THE DELTA RANGES FROM THIS PAIR
45646  TRA  0433                                    *
                                                    ....EMU
45647  TRA  0434   P120371  11026 A40000 000000          ENT*A*U(DR+B6+SR2)-
                                                    ....EMU
45650  TRA  0435   P120372  20027 A40000 000000          ADD*A*U(DR+B7+SR2)-
45651  TRA  0436   P120373  15033 004753 044753          STR*A*W(TRTWRK+RAVE+B3)-SAVE THIS AVERAGE
45652  TRA  0437                                    *
45653  TRA  0438                                    *    IS EITHER LIST OF RETURNS EXHAUSTED
45654  TRA  0439                                    *
45655  TRA  0440   P120374  11006 A00002 000002          ENT*A*B6+TRMWPR-
45656  TRA  0441   P120375  04720 004752 044752          COM*A*U(TRTWRK+ENDUP)*YMORE-
45657  TRA  0442   P120376  61000 P60506 120506          JP*TRA8-UPPER EXHAUSTED
                                                    ....EMU
45660  TRA  0443   P120377  15030 A40166 000166          STR*A*W(SDXB6+SR2)-
45661  TRA  0444   P120400  11007 A00002 000002 TRA11    ENT*A*B7+TRMWPR-
45662  TRA  0445   P120401  04710 004752 044752          COM*A*L(TRTWRK+ENDLO)*YMORE-
45663  TRA  0446   P120402  61000 P60506 120506          JP*TRA8-LOWER EXHAUSTED
                                                    ....EMU
45664  TRA  0447   P120403  15030 A40167 000167          STR*A*W(SDXB7+SR2)-
45665  TRA  0448                                    *
45666  TRA  0449                                    *    STEP TO NEXT RETURN IN LIST
45667  TRA  0450                                    *
45670  TRA  0451   P120404  72300 P60350 120350          BJP*B3*TRA9-RESUME SEARCH
                                                    ....EMU
45671  TRA  0452   P120405  31027 A40000 000000 TRA3     ENT*Y-Q*U(DR+B7+SR2)-
45672  TRA  0453   P120406  15010 004765 044765 TRA13    STR*A*L(TRTWRK+DRDIF)-SAVE RANGE DIFFERENCE
45673  TRA  0454   P120407  11006 A00002 000002          ENT*A*B6+TRMWPR-IS UPPER BEAM LIST EXHAUSTED
45674  TRA  0455   P120410  04720 004752 044752          COM*A*U(TRTWRK+ENDUP)*YMORE-
45675  TRA  0456   P120411  61000 P60475 120475          JP*TRA5-YES
                                                    ....EMU
45676  TRA  0457   P120412  15030 A40166 000166          STR*A*W(SDXB6+SR2)-STEP TO NEXT UPPER RETURN
                                                    ....EMU
45677  TRA  0458   P120413  10026 A40000 000000          ENT*Q*U(DR+B6+SR2)-IS LOWER STILL GREATER
                                                    ....EMU
45700  TRA  0459   P120414  04227 A40000 000000          COM*Q*U(DR+B7+SR2)*YLESS-
45701  TRA  0460   P120415  61000 P60405 120405          JP*TRA3-YES
                                                    ....EMU
45702  TRA  0461   P120416  27527 A40000 000000          SUB*Q*U(DR+B7+SR2)*QNOT-ARE THEIR RANGES EQUAL
45703  TRA  0462   P120417  61000 P60367 120367          JP*TRA4-YES
45704  TRA  0463   P120420  04210 004765 044765          COM*Q*L(TRTWRK+DRDIF)*YLESS-IS THIS PAIR CLOSER THAN PRIOR
45705  TRA  0464   P120421  61000 P60355 120355          JP*TRA7-YES
45706  TRA  0465                                    *
45707  TRA  0466                                    *    DOES PREVIOUS PAIR SATISFY RANGE BIN REQUIREMENT
45710  TRA  0467                                    *
45711  TRA  0468   P120422  11000 A00200 000200          ENT*A*TRMBIN-
45712  TRA  0469   P120423  04610 004765 044765          COM*A*L(TRTWRK+DRDIF)*YLESS-
45713  TRA  0470   P120424  61000 P60437 120437          JP*TRA10-NO
45714  TRA  0471                                    *
45715  TRA  0472                                    *    SAVE LOCATION OF THIS PAIR
45716  TRA  0473                                    *
45717  TRA  0474   P120425  11006 A00000 000000          ENT*A*B6-
45720  TRA  0475   P120426  21000 A00002 000002          SUB*A*TRMWPR-
45721  TRA  0476   P120427  15023 004740 044740          STR*A*U(TRTWRK+PXUP+B3)-
45722  TRA  0477                                    *    DELETE USE OF B5 HERE                         130
                                                    ....EMU
45723  TRA  0478   P120430  16713 004740 044740          STR*B7*L(TRTWRK+PXLO+B3)-
45724  TRA  0479                                    *
45725  TRA  0480                                    *    AVERAGE THE DELTA RANGES FROM THIS PAIR
45726  TRA  0481                                    *
45727  TRA  0482   P120431  12606 A77775 777775          ENT B6    B6-2-     POINT TO PREVIOUS RETURN   130
                                                    ....EMU
45730  TRA  0483   P120432  11026 A40000 000000          ENT A    U(DR+B6+SR2)-                        130
45731  TRA  0484   P120433  12606 A00002 000002          ENT B6    B6+2-     POINTS TO CURRENT RETURN NOW  130
                                                    ....EMU
45732  TRA  0485   P120434  20027 A40000 000000          ADD*A*U(DR+B7+SR2)-
45733  TRA  0486   P120435  15033 004753 044753          STR*A*W(TRTWRK+RAVE+B3)-SAVE THIS AVERAGE
45734  TRA  0487   P120436  61000 P60400 120400          JP*TRA11-STEP LOWER RETURN LIST
45735  TRA  0488   P120437  11007 A00002 000002 TRA10    ENT*A*B7+TRMWPR-IS LOWER BEAM LIST EXHAUSTED
45736  TRA  0489   P120440  04710 004752 044752          COM*A*L(TRTWRK+ENDLO)*YMORE-
```

```
45737  TRA  0490    P120441  61000 P60505 120505              JP*TRA12-YES
45740  TRA  0491    P120442  15030 A40167 000167     ....EMU  STR*A*W(SDXB7+SR2)-STEP TO NEXT LOWER RETURN
45741  TRA  0492    P120443  61000 P60350 120350              JP*TRA9-RESUME SEARCH
45742  TRA  0493    P120444  31027 A40000 000000 TRA6 ....EMU ENT*Y-Q*U(DR+B7+SR2)-
45743  TRA  0494    P120445  04610 C04765 044765              COM*A*L(TRTWRK+DRDIF)*YLESS-IS THIS PAIR CLOSER THAN PRIOR
45744  TRA  0495    P120446  61000 P60406 120406              JP*TRA13-YES
45745  TRA  0496                                       *
45746  TRA  0497                                       *
45747  TRA  0498                                       *      DOES PREVIOUS PAIR SATISFY RANGE BIN REQUIREMENT
45750  TRA  0499    P120447  10000 A00200 000200              ENT*Q*TRMBIN-
45751  TRA  0500    P120450  04210 C04765 044765              COM*Q*L(TRTWRK+DRDIF)*YLESS-
45752  TRA  0501    P120451  61000 P60470 120470              JP*TRA14-NO
45753  TRA  0502                                       *
45754  TRA  0503                                       *      SAVE LOCATION OF THIS PAIR
45755  TRA  0504    P120452  16623 D04740 044740     ....EMU  STR*B6*U(TRTWRK+PXUP+B3)-
45756  TRA  0505    P120453  11007 A00000 000000              ENT*A*B7-
45757  TRA  0506    P120454  21000 A00002 000002              SUB*A*TRMWPR-
45760  TRA  0507    P120455  15013 D04740 044740              STR*A*L(TRTWRK+PXLO+B3)-
45761  TRA  0508                                       *      DELETE USE OF B5 HERE                              130
45762  TRA  0509                                       *
45763  TRA  0510                                       *
45764  TRA  0511                                       *      AVERAGE THE DELTA RANGES FROM THIS PAIR
45765  TRA  0512    P120456  11026 A40000 000000     ....EMU  ENT*A*U(DR+B6+SR2)-
45766  TRA  0513    P120457  12707 A77775 777775              ENT B7   B7-2-    POINT TO PREVIOUS RETURN        130
45767  TRA  0514    P120460  20027 A40000 000000     ....EMU  ADD A    U(DR+B7+SR2)-                             130
45770  TRA  0515    P120461  12707 A00002 000002              ENT B7   B7+2-    POINTS TO CURRENT RETURN NOW    130
45771  TRA  0516    P120462  15033 D04753 044753              STR*A*W(TRTWRK+RAVE+B3)-SAVE THIS AVERAGE
45772  TRA  0517                                       *
45773  TRA  0518                                       *
45774  TRA  0519                                       *      IS UPPER BEAM LIST EXHAUSTED
45775  TRA  0520    P120463  11006 A00002 000002              ENT*A*B6*TRMWPR-
45776  TRA  0521    P120464  04720 D04752 044752              COM*A*U(TRTWRK+ENDUP)*YMORE-
45777  TRA  0522    P120465  61000 P60506 120506              JP*TRA8-YES
46000  TRA  0523    P120466  15030 A40166 000166     ....EMU  STR*A*W(SDXB6+SR2)-STEP TO NEXT UPPER RETURN
46001  TRA  0524    P120467  72300 P60350 120350              BJP*B3*TRA9-RESUME SEARCH
46002  TRA  0525    P120470  11006 A00002 000002 TRA14        ENT*A*B6*TRMWPR-IS UPPER BEAM LIST EXHAUSTED
46003  TRA  0526    P120471  04720 D04752 044752              COM*A*U(TRTWRK+ENDUP)*YMORE-
46004  TRA  0527    P120472  61000 P60505 120505              JP*TRA12-YES
46005  TRA  0528    P120473  15030 A40166 000166     ....EMU  STR*A*W(SDXB6+SR2)-STEP TO NEXT UPPER RETURN
46006  TRA  0529    P120474  61000 P60350 120350              JP*TRA9-RESUME SEARCH
46007  TRA  0530                                       *
46010  TRA  0531                                       *
46011  TRA  0532                                       *      DOES LAST PAIR SATISFY RANGE BIN REQUIREMENT
46012  TRA  0533    P120475  11000 A00200 000200 TRA5         ENT*A*TRMBIN-
46013  TRA  0534    P120476  04610 C04765 044765              COM*A*L(TRTWRK+DRDIF)*YLESS-
46014  TRA  0535    P120477  61000 P60505 120505              JP*TRA12-NO
46015  TRA  0536                                       *
46016  TRA  0537                                       *
46017  TRA  0538                                       *      SAVE LOCATION AND AVERAGE DELTA RANGE OF THIS LAST PAIR
46020  TRA  0539    P120500  16623 D04740 044740     ....EMU  STR*B6*U(TRTWRK+PXUP+B3)-
46021  TRA  0540    P120501  16713 D04740 044740     ....EMU  STR*B7*L(TRTWRK+PXLO+B3)-
46022  TRA  0541    P120502  11026 A40000 000000     ....EMU  ENT*A*U(DR+B6+SR2)-
46023  TRA  0542    P120503  20027 A40000 000000              ADD*A*U(DR+B7+SR2)-
46024  TRA  0543    P120504  15133 D04753 044753              STR*A*W(TRTWRK+RAVE+B3)*SKIP-
46025  TRA  0544                                       *
46026  TRA  0545                                       *
46027  TRA  0546                                       *      HAVE ANY PAIRS CORRELATED
46030  TRA  0547    P120505  71300 A00011 000011 TRA12        BSK*B3*TRMRPB-1-
46031  TRA  0548    P120506  10124 D02322 042322 TRA8         ENT*Q*U(SDTTS+RNGW+B4)*SKIP-GET RANGE GATE WIDTH
46032  TRA  0549    P120507  61000 P63015 123015              JP*TRA15-NO
46033  TRA  0550                                       *
46034  TRA  0551                                       *
46035  TRA  0552                                       *      TRACK CORRELATION ROUTES PROCESSING OF RANGE CORRELATED RE-
46036  TRA  0553                                       *      TURNS TO ONE OF THE FOLLOWING SEGMENTS, BASED ON WHERE IN
46037  TRA  0554                                       *      THE RANGE GATE THEY OCCUR-
46040  TRA  0555                                       *      -SPLIT DETECTION AND CONFIRMATION.
46041  TRA  0556                                       *      -PRIORITY TRACK UPDATE.
46042  TRA  0557                                       *      -TRIAL TRACK UPDATE.
46043  TRA  0558                                       *      -TARGET MISSES.
46044  TRA  0559                                       *
46045  TRA  0560                                       *      FIND PAIR NEAREST PREDICTED RANGE
46046  TRA  0561    P120510  01000 A00001 000001              RSH*Q*1-
46047  TRA  0562    P120511  14020 D04767 044767              STR*Q*U(TRTWRK+GCENTR)-SAVE GATE CENTER
46050  TRA  0563    P120512  14023 D04752 044752              STR*Q*U(TRTWRK+RAVE-1+B3)-AVOID TABLE OVERRUN
46051  TRA  0564    P120513  05000 AC0007 000007              LSH*Q*7-MATCH TO INPUT
46052  TRA  0565    P120514  31633 D04753 044753 TRA22        ENT*Y-Q*W(TRTWRK+RAVE+B3)*APOS-FIND FIRST RANGE INBOARD OF
46053  TRA  0566    P120515  61000 P60522 120522              JP*TRA21-CENTER
46054  TRA  0567    P120516  71300 A00011 000011              BSK*B3*TRMRPB-1-
46055  TRA  0568    P120517  61000 P60514 120514              JP*TRA22-
46056  TRA  0569    P120520  12300 A00011 000011              ENT*B3*TRMRPB-1-NONE FOUND
46057  TRA  0570    P120521  61000 P60525 120525              JP*TRA23-SHORTEST RANGE IS CLOSEST
46060  TRA  0571    P120522  27433 C04752 044752 TRA21        SUB*Q*W(TRTWRK+RAVE-1+B3)*QZERO-
46061  TRA  0572    P120523  04370 A60000 000000              COM*Q*A*YMORE-CLOSER IS INBOARD
46062  TRA  0573    P120524  72300 P60525 120525              BJP*B3*TRA23-CLOSER IS AT OR OUTBOARD OF CENTER
46063  TRA  0574                                       *
46064  TRA  0575                                       *
46065  TRA  0576                                       *      CALCULATE MEASURED RANGE FOR THIS PAIR
46066  TRA  0577    P120525  11660 D04770 044770 TRA23        ENT*A*UX(TRTWRK+STATUS)*APOS-SELECT RANGE FIRED BASED ON
46067  TRA  0578    P120526  10114 D02313 042313              ENT*Q*L(SDTTS+RNGS+B4)*SKIP-TRACK STATUS
46070  TRA  0579    P120527  10114 D02322 042322              ENT*Q*L(SDTTS+RNGP+B4)*SKIP-PREDICTED WHEN ESTABLISHED
46071  TRA  0580    P120530  01000 AC0002 000002              RSH*Q*2-SMOOTHED WHEN TENTATIVE
46072  TRA  0581    P120531  27020 D04767 044767              SUB*Q*U(TRTWRK+GCENTR)-
46073  TRA  0582    P120532  05000 A00007 000007              LSH*Q*7-
46074  TRA  0583    P120533  14030 D04752 044752              STR*Q*W(TRTWRK+GSTART)-SAVE RANGE GATE START
46075  TRA  0584    P120534  26033 D04753 044753              ADD*Q*W(TRTWRK+RAVE+B3)-
```

```
46076  TRA  0585  P120535  01000 A00005 000005         RSH*Q*5-
46077  TRA  0586  P120536  14010 004767 044767         STR*Q*L(TRTWRK+RNGME)-SAVE MEASURED RANGE
46100  TRA  0587                                *
46101  TRA  0588                                *      IS TARGET IN THE NON-MANEUVER GATE
46102  TRA  0589                                *
46103  TRA  0590                                *      DELETE - XR5 NOW SET UP AT LABEL TRA16        130
46104  TRA  0591                                *      DELETE TRA 0280 THRU TRA 0296                 130
46105  TRA  0592  P120537  10000 A00777 000777         ENT Q    777-     NM RANGE GATE WIDTH MASK    406
46106  TRA  0593  P120540  40014 002311 042311         ENT LP   L(SDTTS+NMRGW+B4)-                   148
46107  TRA  0594  P120541  15030 016200 056200         STR A    W(TRANMGWSAV)-     SAVE NM RANGE GATE WIDTH  148
46110  TRA  0595  P120542  11020 004767 044767         ENT A    U(TRTWRK+GCENTR)-                    148
46111  TRA  0596  P120543  10020 004767 044767         ENT Q    U(TRTWRK+GCENTR)-                    148
46112  TRA  0597  P120544  07000 A00001 000001         LSH AQ   1-       SCALE IT 1 MORE THAN NMRGW  148
46113  TRA  0598  P120545  21030 016200 056200         SUB A    W(TRANMGWSAV)-     A HAS START OF NMG  148
46114  TRA  0599  P120546  26030 016200 056200         ADD Q    W(TRANMGWSAV)-     Q HAS END OF NMG  148
46115  TRA  0600  P120547  07000 A00006 000006         LSH AQ   6-       SCALE SAME AS DELTA RANGE   148
46116  TRA  0601  P120550  21000 A00100 000100         SUB A    100-     TO MAKE YIN WORK CORRECTLY  127
46117  TRA  0602  P120551  04433 004753 044753         COM*AQ*W(TRTWRK+RAVE+B3)*YIN-IS TARGET IN NON-MANEUVER GATE
46120  TRA  0603  P120552  61000 P62533 122533         JP*TRA26-NO
46121  TRA  0604                                *
46122  TRA  0605                                *      IS ANOTHER TARGET ALSO IN THE NON-MANEUVER GATE
46123  TRA  0606                                *
**********                                      *****EMU
46124  TRA  0607  P120553  16330 A40166 000166         STR*B3*W(SDXB6+SR2)-
46125  TRA  0608  P120554  04536 004752 044752         COM*AQ*W(TRTWRK+RAVE-1+B6)*YOUT-
46126  TRA  0609  P120555  72600 P60561 120561         BJP*B6*TRA27-
46127  TRA  0610  P120556  71600 A00011 000011         BSK*B6*TRMRPB-1-
46130  TRA  0611  P120557  04436 004753 044753         COM*AQ*W(TRTWRK+RAVE+B6)*YIN-
46131  TRA  0612  P120560  61000 P60632 120632         JP*TRA28-NO
46132  TRA  0613                                *
46133  TRA  0614                                *      SPLIT DETECTION AND CONFIRMATION IS REQUIRED WHEN MULTIPLE
46134  TRA  0615                                *      HITS OCCUR IN THE NON-MANEUVER GATE.  THE TRACKING SCHED-
46135  TRA  0616                                *      ULER IS INSTRUCTED TO FIRE PRIORITY CONFIRMATION BEAMS.
46136  TRA  0617                                *      FOLLOWING RECEIPT OF MULTI-HIT RETURNS FROM THESE BEAMS,
46137  TRA  0618                                *      CROSS CORRELATION IS PERFORMED, AND A SPLIT DECLARED.  HIGH
46140  TRA  0619                                *      DATA RATE AND TENTATIVE TRACKS ARE INELIGIBLE FOR SPLIT-
46141  TRA  0620                                *      TING.
46142  TRA  0621                                *
46143  TRA  0622                                *
46144  TRA  0623                                *      IS THIS A HIGH DATA RATE TRACK
46145  TRA  0624                                *
46146  TRA  0625  P120561  11860 004765 044765 TRA27  ENT*A*UX(TRTWRK+TRKTYP)*APOS-
46147  TRA  0626  P120562  61000 P60642 120642         JP*TRA32-YES
46150  TRA  0627                                *
46151  TRA  0628                                *      WERE CONFIRMATION BEAMS FIRED
46152  TRA  0629                                *
46153  TRA  0630  P120563  11664 002327 042327         ENT*A*UX(SDTTS+SPLIT+B4)*APOS-
46154  TRA  0631  P120564  61000 P60576 120576         JP*TRA33-YES
46155  TRA  0632                                *
46156  TRA  0633                                *      IS THIS A TENTATIVE TRACK
46157  TRA  0634                                *
46160  TRA  0635  P120565  10260 004770 044770         ENT*Q*UX(TRTWRK+STATUS)*QPOS-
46161  TRA  0636  P120566  61000 P60642 120642         JP*TRA32-YES
46162  TRA  0637                                *
46163  TRA  0638                                *      IS THIS TRACK LINKED TO ANOTHER BY A PREVIOUS SPLIT
46164  TRA  0639                                *
**********                                      *****EMU
46165  TRA  0640  P120567  15430 A40167 000167         STR A    W(SDXB7+SR2) AZERO- IF AZERO, NO     171
46166  TRA  0641  P120570  61000 P60642 120642         JP       TRA32-              YES             171
46167  TRA  0642                                *
46170  TRA  0643                                *      DELETE SPLIT LINKED TRACK CORRELATION.  SINCE THIS  171
46171  TRA  0644                                *      AS A RETURN IN THE NON-MANEUVER GATE, THE CHECKS    171
46172  TRA  0645                                *      THAT WERE MADE HERE HAVE ALREADY BEEN SATISFIED.    171
46173  TRA  0646                                *      DELETE FROM TRA 0341 THRU TRA 0383                  171
46174  TRA  0647                                *
46175  TRA  0648                                *      IS A PREVIOUS SET OF CONFIRMATION BEAMS WAITING TO BE FIRED
46176  TRA  0649                                *
46177  TRA  0650  P120571  11430 014750 054750         ENT A    W(TRVPP) AZERO-              LABEL OFF  577
46200  TRA  0651  P120572  61000 P60642 120642         JP*TRA32-YES
46201  TRA  0652                                *
46202  TRA  0653                                *      SIGNAL SCHEDULER TO FIRE TRACKING PRIORITY CONFIRMATION
46203  TRA  0654                                *      BEAMS AT PRIORITY POSITION
46204  TRA  0655                                *
46205  TRA  0656  P120573  16430 014750 054750         STR*B4*W(TRVPP)-
46206  TRA  0657  P120574  16064 002327 042327         STR*B0*CPU(SDTTS+SPLIT+B4)-SET CONFIRMATION BEAM FIRED FLAG
46207  TRA  0658  P120575  61000 P62300 122300         JP*TRA998-TAKE NO FURTHER ACTION ON THIS TRACK
46210  TRA  0659                                *
46211  TRA  0660                                *      DELETE TRA 0397 THRU TRA 0406 - SPLIT CORRELATION   171
46212  TRA  0661                                *
46213  TRA  0662                                *      CROSS CORRELATE THIS TARGET WITH ALL TRACKS CAPABLE OF BE-
46214  TRA  0663                                *      ING WITHIN ITS CORRELATION VOLUME
46215  TRA  0664                                *
46216  TRA  0665  P120576  11020 016241 056241 TRA33  ENT*A*U(TRVELCK)-SET TRACKING ELEVATION CHECK LIMIT
46217  TRA  0666  P120577  15030 014574 054574         STR*A*W(SDVLZL)-
46220  TRA  0667  P120600  11014 002313 042313         ENT*A*L(SDTTS+RNGS+B4)-SET CORRELATEE RANGE
46221  TRA  0668  P120601  15030 014602 054602         STR*A*W(SDVTR)-
46222  TRA  0669  P120602  16014 002313 042313         STR*B0*L(SDTTS+RNGS+B4)-ELIMINATE THIS TRACK FROM CONSIDER-
46223  TRA  0670  P120603  11064 002314 042314         ENT*A*UX(SDTTS+LXSA+B4)-ATION
46224  TRA  0671  P120604  15030 014577 054577         STR*A*W(SDVTLX)-SET LX
46225  TRA  0672  P120605  11054 002314 042314         ENT*A*LX(SDTTS+LYSA+B4)-SET LY
46226  TRA  0673  P120606  15030 014600 054600         STR*A*W(SDVTLY)-
46227  TRA  0674  P120607  11054 002315 042315         ENT*A*LX(SDTTS+LZSA+B4)-SET LZ
46230  TRA  0675  P120610  15030 014601 054601         STR*A*W(SDVTLZ)-
46231  TRA  0676  P120611  11054 002321 042321         ENT*A*LX(SDTTS+LXF+B4)-SET LX FIRED
46232  TRA  0677  P120612  15030 014605 054605         STR*A*W(SDVTULX)-
46233  TRA  0678  P120613  11014 002320 042320         ENT*A*L(SDTTS+QUAD+B4)-SET QUADRANT
46234  TRA  0679  P120614  02000 A00015 000015         BSH*A*QUADLSB-
46235  TRA  0680  P120615  15030 014575 054575         STR*A*W(SDVQUAD)-
46236  TRA  0681  P120616  65030 P77400 137400         JP*SCC-
46237  TRA  0682  P120617  11030 014602 054602         ENT*A*W(SDVTR)-RESTORE RANGE OF THIS TRACK
46240  TRA  0683  P120620  15014 002313 042313         STR*A*L(SDTTS+RNGS+B4)-
46241  TRA  0684                                *
46242  TRA  0685                                *      DOES ANY TRACK CORRELATE WITH THIS TARGET
46243  TRA  0686                                *
46244  TRA  0687  P120621  11430 014576 054576         ENT*A*W(SDVTA)*AZERO-
46245  TRA  0688  P120622  61000 P60630 120630         JP*TRA37-YES
```

```
46246  TRA  0689                                          *
46247  TRA  0690                                          *        CALCULATE MEASURED RANGE OF SPLITTING TARGET
46250  TRA  0691                                          *
46251  TRA  0692   P120623  10030 D04752 044752                    ENT*Q*W(TRTWRK+GSTART)-
46252  TRA  0693   P120624  26036 D04753 044753                    ADD*Q*W(TRTWRK+RAVE+B6)-
46253  TRA  0694   P120625  01000 A00005 000005                    RSH*Q*5-
46254  TRA  0695   P120626  14010 D04760 044760                    STR Q      L(TRTWRK+RSPLIT)-   SAVE FOR NEW TRACK SETUP  096
46255  TRA  0696   P120627  61000 P60642 120642                    JP*TRA32-FOR CREATION OF NEW TRACK IN UPDATING
46256  TRA  0697                                          *
46257  TRA  0698                                          *        LINK THESE TWO TRACKS TOGETHER
46260  TRA  0699                                          *
.........                                                 .....EMU
46261  TRA  0700   P120630  16427 D02327 042327 TRA37              STR*B4*U(SDTTS+SPLIT+B7)-
.........                                                 .....EMU
46262  TRA  0701   P120631  16724 D02327 042327                    STR*B7*U(SDTTS+SPLIT+B4)-
46263  TRA  0702                                          *
46264  TRA  0703                                          *        WAS THIS FIRING FOR SPLIT CONFIRMATION
46265  TRA  0704                                          *
46266  TRA  0705   P120632  11764 D02327 042327 TRA28              ENT A      UX(SDTTS+SPLIT+B4) ANEG- IF ANEG., YES             171
46267  TRA  0706   P120633  61000 P60636 120636                    JP         TRA2812-                                            171
46270  TRA  0707   P120634  16024 D02327 042327                    STR*B0*U(SDTTS+SPLIT+B4)-CLEAR CONFIRMATION BEAM FLAG
46271  TRA  0708   P120635  61000 P60642 120642                    JP         TRA32-     NOT LINKED, GO PROCESS RETURNS            171
46272  TRA  0709                                          *                                                                     171
46273  TRA  0710                                          *        BREAK LINKAGE OF LINKED TRACKS                               171
46274  TRA  0711                                          *                                                                     171
46275  TRA  0712   P120636  60400 P60642 120642 TRA2812            JP         TRA32  AZERO-                                       171
.........                                                 .....EMU
46276  TRA  0713   P120637  15030 A40167 000167                    STR A      W(SDXB7+SR2)-                                       171
46277  TRA  0714   P120640  16024 D02327 042327                    STR B0     U(SDTTS+SPLIT+B4)-                                  171
46300  TRA  0715   P120641  16027 D02327 042327                    STR B0     U(SDTTS+SPLIT+B7)-                                  171
46301  TRA  0716                                          *
46302  TRA  0717                                          *
46303  TRA  0718                                          *        PRIORITY TRACK UPDATE PROCESSES A SINGLE HIT IN THE NON-
46304  TRA  0719                                          *        MANEUVER GATE.
46305  TRA  0720                                          *
46306  TRA  0721                                          *
46307  TRA  0722                                          *
46310  TRA  0723                                          *        DROP ANY TRIAL ASSOCIATED WITH THIS TRACK
46311  TRA  0724                                          *
46312  TRA  0725   P120642  16034 D02333 042333 TRA32              STR*B0*W(SDTTS+KJT+B4)-
46313  TRA  0726                                          *
46314  TRA  0727                                          *        INCREASE SMOOTHING CONFIDENCE
46315  TRA  0728                                          *
46316  TRA  0729   P120643  11414 D02317 042317                    ENT*A*L(SDTTS+J+B4)*AZERO-IS PRIORITY MISS COUNT ZERO
46317  TRA  0730   P120644  37114 D02317 042317                    RPL Y-1    L(SDTTS+J+B4) SKIP- NO, DECREMENT MISS COUNT  134
46320  TRA  0731   P120645  10124 D02317 042317                    ENT Q      U(SDTTS+K+B4) SKIP- YES, HAS PRIORITY HIT     134
46321  TRA  0732   P120646  61000 P60662 120662                    JP*TRA29-
46322  TRA  0733                                          *        DELETE TRA 0470                                               134
46323  TRA  0734   P120647  11025 D15733 055733                    ENT A      U(TRTGAG2+NMRG+B5)- COUNT REACHED GOAL VALUE  134
46324  TRA  0735   P120650  04625 D15746 055746                    COM A      U(TRTGAG3+NMRG+B5) YLESS-                     134
46325  TRA  0736   P120651  11025 D15746 055746                    ENT A      U(TRTGAG3+NMRG+B5)-                           134
46326  TRA  0737   P120652  04270 A00000 000000                    COM Q      A  YLESS-            IF YLESS, YES             134
46327  TRA  0738   P120653  36024 D02317 042317                    RPL*Y+1*U(SDTTS+K+B4)-INCREMENT HIT COUNT WHEN NO
46330  TRA  0739                                          *
46331  TRA  0740                                          *        IS THIS A TENTATIVE TRACK
46332  TRA  0741                                          *
46333  TRA  0742   P120654  10260 D04770 044770                    ENT*Q*UX(TRTWRK+STATUS)*QPOS-
46334  TRA  0743                                          *
46335  TRA  0744                                          *        HAVE ENOUGH PRIORITY HITS OCCURRED TO DECLARE THIS AN ES-
46336  TRA  0745                                          *        TABLISHED TRACK
46337  TRA  0746                                          *
46340  TRA  0747   P120655  04625 D16076 056076                    COM*A*U(TRTGAG11+EST+B5)*YLESS-
46341  TRA  0748   P120656  61000 P60662 120662                    JP*TRA29-NO
46342  TRA  0749                                          *
46343  TRA  0750                                          *        RESET TENTATIVE TRACK INDICATOR
46344  TRA  0751                                          *
46345  TRA  0752   P120657  10040 A67777 767777                    ENT*Q*-TNTVMSK-
46346  TRA  0753   P120660  44024 D02313 042313                    RPL*LP*U(SDTTS+FLAGS+B4)-
46347  TRA  0754   P120661  16020 D04770 044770                    STR*B0*U(TRTWRK+STATUS)-SET ESTABLISHED TRACK FLAG
46350  TRA  0755                                          *
46351  TRA  0756                                          *        BEAMSPLIT PRIORITY HIT
46352  TRA  0757                                          *
46353  TRA  0758   P120662  65030 P77401 137401 TRA29              RJP*TRAB-
46354  TRA  0759                                          *
46355  TRA  0760                                          *        LOCATE COEFFICIENTS FOR SMOOTHING DIRECTION COSINES AND CO-
46356  TRA  0761                                          *        SINE VELOCITIES
46357  TRA  0762                                          *
46360  TRA  0763   P120663  10024 D02317 042317 TRA292             ENT Q U(SDTTS+K+B4)- IS PRI. HIT COUNT AT OR OVER GOAL  141
46361  TRA  0764   P120664  04325 D15746 055746                    COM*Q*U(TRTGAG3+SXYZG+B5)*YMORE-
46362  TRA  0765   P120665  10125 D15746 055746                    ENT*Q*U(TRTGAG3+SXYZG+B5)*SKIP-USE GOAL VALUE FOR K
46363  TRA  0766   P120666  71606 A00000 000000                    BSK*B6*B6-NO
46364  TRA  0767   P120667  12600 A00030 000030                    ENT*B6*TRMKMAX-SELECT STEADY STATE COEFFICIENTS
46365  TRA  0768   P120670  11514 D02317 042317                    ENT*A*L(SDTTS+J+B4)*ANOT-HAVE PRIORITY MISSES OCCURRED
46366  TRA  0769   P120671  61000 P60700 120700                    JP*TRA30-LOCATE COEFFICIENTS DIRECTLY FROM K
46367  TRA  0770   P120672  27700 A00002 000002                    SUB*Q*TRMKINIT*QNEG-YES
46370  TRA  0771   P120673  22100 A00013 000013                    MUL*TRMJMAX*SKIP-
46371  TRA  0772   P120674  10170 A00000 000000                    ENT*Q*A*SKIP-
46372  TRA  0773   P120675  26014 D02317 042317                    ADD*Q*L(SDTTS+J+B4)-
.........                                                 .....EMU
46373  TRA  0774   P120676  14030 A40163 000163                    STR*Q*W(SDXB3+SR2)-
46374  TRA  0775   P120677  10023 D16255 056255                    ENT*Q*U(TRTKJC+KXYZ+B3)-SELECT COORDINATE USING K AND J
46375  TRA  0776   P120700  27400 A00002 000002 TRA30              SUB*Q*TRMKINIT*QZERO-LOCATE SMOOTHING COEFFICIENTS
.........                                                 .....EMU
46276  TRA  0777   P120701  34030 A40166 000166                    RPL*Y+Q*W(SDXB6+SR2)-
46377  TRA  0778                                          *
46400  TRA  0779                                          *        LOCATE COEFFICIENTS FOR SMOOTHING RANGE AND RANGE RATE
46401  TRA  0780                                          *
46402  TRA  0791   P120702  10024 D02317 042317                    ENT Q      U(SDTTS+K+B4)-  HIT COUNT                         041473
46403  TRA  0792   P120703  04325 D15733 055733                    COM Q      U(TRTGAG2+NMRG+B5) YMORE- IF YMORE, NOT GL    041473
46404  TRA  0793   P120704  10125 D15733 055733                    ENT Q      U(TRTGAG2+NMRG+B5) SKIP- AT GOAL              041473
46405  TRA  0794   P120705  71707 A00000 000000                    BSK B7     B7-      NOT AT GOAL , ZERO INTO B7, SKIP     041473
46406  TRA  0795   P120706  12700 A00030 000030                    ENT B7     TRMKMAX-   AT GOAL, 30 TO INDEX STEADY ST     041473
46407  TRA  0796   P120707  11514 D02317 042317                    ENT*A*L(SDTTS+J+B4)*ANOT-HAVE PRIORITY MISSES OCCURRED
46410  TRA  0797   P120710  61000 P60717 120717                    JP*TRA31-LOCATE COEFFICIENTS DIRECTLY FROM K
46411  TRA  0798   P120711  27700 A00002 000002                    SUB*Q*TRMKINIT*QNEG-YES
```

```
46412  TRA  0789   P120712  22100 A00013 000013          MUL*TRMJMAX*SKIP-
46413  TRA  0790   P120713  10170 A00000 000000          ENT*Q*A*SKIP-
46414  TRA  0791   P120714  26014 D02317 042317          ADD*Q*L(SDTTS+J+B4)-
**********                                       ....EMU
46415  TRA  0792   P120715  14030 A40163 000163          STR*Q*W(SDXB3+SR2)-
46416  TRA  0793   P120716  10013 D16255 056255          ENT*Q*L(TRTKJC+KRNG+B3)-SELECT COORDINATE USING K AND J
46417  TRA  0794   P120717  27400 A00002 000002  TRA31   SUB*Q*TRMKINIT*QZERO-LOCATE SMOOTHING COEFFICIENTS
**********                                       ....EMU
46420  TRA  0795   P120720  34030 A40167 000167          RPL*Y+Q*W(SDXB7+SR2)-
46421  TRA  0796                                  *
46422  TRA  0797                                  *      SMOOTH AZIMUTH AND ELEVATION DIRECTION COSINES
46423  TRA  0798                                  *
46424  TRA  0799                                  *      SMOOTH LZ FIRST                                    650
                                                                                                            650
46425  TRA  0800                                                                                            650
46426  TRA  0801   P120721  10060 D11564 051564          ENT Q    UX(SDTUS+LZS)-       STABLE LZ            650
46427  TRA  0802   P120722  27054 D02315 042315          SUB Q    LX(SDTTS+LZSA+B4)-   OLD SMOOTHED LZ      650
46430  TRA  0803   P120723  22026 D04772 044772          MUL      U(TRTABS+ALPHA+B6)-                       650
46431  TRA  0804   P120724  03000 A00016 000016          RSH AQ   14D-                                      650
46432  TRA  08051                                 *                                                         041673
46433  TRA  08052                                 *      GO DO MINIMUM ANGLE CHECK FOR MIN. ADJUSTMENT      041673
46434  TRA  08053                                 *                                                         041673
46435  TRA  08054   P120725  65000 P60760 120760         SJP      TRA3105-                                  041673
46436  TRA  08055   P120726  26054 D02315 042315         ADD Q    LX(SDTTS+LZSA+B4)-                        041673
46437  TRA  08056   P120727  04200 A00240 000240         COM Q    240 YLESS-          IF YLESS, LZ OK      041673
46440  TRA  08057   P120730  10000 A00240 000240         ENT Q    240-                LZ WAS TOO LOW, GET MINIMUM  041673
46441  TRA  08058   P120731  14014 D02315 042315         STR Q    L(SDTTS+LZSA+B4)-   NEW LZ               041673
46442  TRA  0806                                  *                                                         650
46443  TRA  0807                                  *      DETERMINE WHETHER TO USE LX OR LY AS BEST. IF ABSOLUTE 650
46444  TRA  0808                                  *      VALUE OF LX IS LESS THAN .707, LX IS BEST. COMPUTE  650
46445  TRA  0809                                  *      LY FROM LX, LZ. IF ABSOLUTE VALUE OF LX IS NOT LESS 650
46446  TRA  0810                                  *      THAN .707D, DO LY, THEN LX FROM LXY, LZ.           650
46447  TRA  0811                                                                                            650
46450  TRA  0812   P120732  11030 D14561 054561          ENT A    K(SCVNEGLX45)-       -.70711D, 14D         650
46451  TRA  0813   P120733  10030 D14560 054560          ENT Q    W(SCVLX45)-          +.70711D, 14D         650
46452  TRA  0814   P120734  04460 D11565 051565          COM A.   UX(SDTUS+LXS) YIN-   IF YIN, LX OK         650
46453  TRA  0815   P120735  61000 P60770 120770          JP       TRA3110-             GO DO LY FIRST        650
46454  TRA  0816                                                                                            650
46455  TRA  0817                                  *      SMOOTH LX                                          650
46456  TRA  0818                                                                                            650
46457  TRA  0819   P120736  10060 D11565 051565          ENT Q    UX(SDTUS+LXS)-       STABLE LX            650
46460  TRA  0820   P120737  27064 D02325 042325          SUB Q    UX(SDTTS+LXP+B4)-                         650
46461  TRA  0821   P120740  22026 D04772 044772          MUL      U(TRTABS+ALPHA+B6)-                       650
46462  TRA  0822   P120741  03000 A00016 000016          RSH AQ   14D-                                      650
46463  TRA  0823   P120742  26064 D02325 042325          ADD Q    UX(SDTTS+LXP+B4)-                         650
46464  TRA  0824   P120743  14024 D02314 042314          STR Q    U(SDTTS+LXSA+B4)-    STORE NEW SMOOTHED LX 650
46465  TRA  0825                                  *                                                         650
46466  TRA  0826                                  *      COMPUTE LY USING SQUARE ROOT                       650
46467  TRA  0827                                                                                            650
46470  TRA  0828   P120744  22064 D02314 042314          MUL      UX(SDTTS+LXSA+B4)-   LX SQUARED           650
46471  TRA  0829   P120745  14030 D14772 054772          STR Q    W(TRVSVLXYSQ)-                            650
46472  TRA  0830   P120746  10054 D02315 042315          ENT Q    LX(SDTTS+LZSA+B4)-                        650
46473  TRA  0831   P120747  22054 D02315 042315          MUL      LX(SDTTS+LZSA+B4)-   LZ SQUARED           650
46474  TRA  0832   P120750  31030 D16233 056233          ENT Y-Q  W(TRVONE28)-                              650
46475  TRA  0833   P120751  21030 D14772 054772          SUB A    W(TRVSVLXYSQ)-                            650
46476  TRA  0834   P120752  03000 A00036 000036          RSH AQ   30D-                                      650
46477  TRA  0835   P120753  23070 A00000 000000          SQRT-                                              707
46500  TRA  0836   P120754  11750 D11565 051565          ENT A    LX(SDTUS+LYS) ANEG-  NEED SIGN            650
46501  TRA  0837   P120755  14114 D02314 042314          STR Q    L(SDTTS+LYSA+B4) SKIP-                    650
46502  TRA  0838   P120756  14054 D02314 042314          STR Q    CPL(SDTTS+LYSA+B4)-                       650
46503  TRA  0839   P120757  61000 P61011 121011          JP       TRA315-                                   041773
46504  TRA  08391                                 *                                                         041773
46505  TRA  08391B                                *      IF LZ IS BELOW A GIVEN ANGLE, APPLY MINIMUM CHANGE 041773
46506  TRA  08392C                                *                                                         041773
46507  TRA  08392S  P120760  00000 A00000 000000  TRA3105 ENTRY-                                            041773
46510  TRA  08393C  P120761  11014 D02315 042315          ENT A    L(SDTTS+LZSA+B4)-   GET LZ               041773
46511  TRA  08393S  P120762  04700 A00310 000310          COM A    310 YMORE-          IF YMORE, ANGLE BELOW MIN.  041773
46512  TRA  08394C  P120763  61030 P60760 120760          EXIT-                        NOT BELOW MIN. ANGLE, OK   041773
46513  TRA  08394S  P120764  07000 A00036 000036          LSH AQ   30D-                CORRECTION INTO A          041777
46514  TRA  08395C  P120765  10600 A00010 000010          ENT Q    10 APOS-            MINIMUM CORRECTION         041773
46515  TRA  08395S  P120766  14000 A00000 000000          STR Q    Q-   ORIG. ADJ. NEG., MAKE THIS ADJ. NEG.  041773
46516  TRA  08396D  P120767  61030 P60760 120760          EXIT-                        RETURN TO CALLER, ADJ. IN Q 041773
46517  TRA  0840                                  *                                                         650
46520  TRA  0841                                  *      SMOOTH LY, THEN COMPUTE LX                         650
46521  TRA  0842                                                                                            650
46522  TRA  0843   P120770  10050 D11565 051565  TRA3110  ENT Q   LX(SDTUS+LYS)-       STABLE LY            650
46523  TRA  0844   P120771  27054 D02325 042325           SUB Q   LX(SDTTS+LYP+B4)-    OLD SMOOTHED LY      650
46524  TRA  0845   P120772  22026 D04772 044772           MUL     U(TRTABS+ALPHA+B6)-                       650
46525  TRA  0846   P120773  03000 A00016 000016           RSH AQ  14D-                                      650
46526  TRA  0847   P120774  26054 D02325 042325           ADD Q   LX(SDTTS+LYP+B4)-                         650
46527  TRA  0848   P120775  14014 D02314 042314           STR Q   L(SDTTS+LYSA+B4)-    STORE NEW SMOOTHED LY 650
46530  TRA  0849                                  *                                                         650
46531  TRA  0850                                  *      COMPUTE LX USING SQUARE ROOT                       650
46532  TRA  0851                                                                                            650
46533  TRA  0852   P120776  22054 D02314 042314           MUL     LX(SDTTS+LYSA+B4)-                        650
46534  TRA  0853   P120777  14030 D14772 054772           STR Q   W(TRVSVLXYSQ)-                            650
46535  TRA  0854   P121000  10054 D02315 042315           ENT Q   LX(SDTTS+LZSA+B4)-                        650
46536  TRA  0855   P121001  22054 D02315 042315           MUL     LX(SDTTS+LZSA+B4)-                        650
46537  TRA  0856   P121002  31030 D16233 056233           ENT Y-Q W(TRVONE28)-                              650
46540  TRA  0857   P121003  21030 D14772 054772           SUB A   W(TRVSVLXYSQ)-                            650
46541  TRA  0858   P121004  03000 A00036 000036           RSH AQ  30D-                                      650
46542  TRA  0859   P121005  23070 A00000 000000           SQRT-                                             650
46543  TRA  0860   P121006  11760 D11565 051565           ENT A   UX(SDTUS+LXS) ANEG-  NEED SIGN            650
46544  TRA  0861   P121007  14124 D02314 042314           STR Q   U(SDTTS+LXSA+B4) SK-                      650
46545  TRA  0862   P121010  14064 D02314 042314           STR Q   CPU(SDTTS+LXSA+B4)-                       650
46546  TRA  0863                                  *                                                         650
46547  TRA  0864                                  *      SMOOTH AZIMUTH DIRECTION COSINE VELOCITIES         650
46550  TRA  0865                                                                                            650
46551  TRA  0866   P121011  10060 D11565 051565  TRA315   ENT Q   UX(SDTUS+LXS)-       SMOOTH LX DOT        650
46552  TRA  0867   P121012  27064 D02325 042325           SUB*Q*UX(SDTTS+LXP+B4)-
46553  TRA  0868   P121013  22016 D02325 042325           MUL*L(TRTABS+BETA+B6)-
46554  TRA  0869   P121014  23030 D04766 044766           DIV*W(TRTWRK+TIMEDF)-
46555  TRA  0870   P121015  01000 A00004 000004           RSH*Q*4-
46556  TRA  0871   P121016  34064 D02316 042316           RPL*Y+Q*UX(SDTTS+LXR+B4)-SAVE LX DOT SMOOTHED
46557  TRA  0872   P121017  10050 D11565 051565           ENT*Q*LX(SDTUS+LYS)-SMOOTH LY DOT
46560  TRA  0873   P121020  27054 D02325 042325           SUB*Q*LX(SDTTS+LYP+B4)-
46561  TRA  0874   P121021  22016 D04772 044772           MUL*L(TRTABS+BETA+B6)-
```

```
46562 TRA 0875   P121022 23030 D04766 044766          DIV*W(TRTWRK+TIMEDF)-
46563 TRA 0876   P121023 01000 A00004 000004          RSH*Q*4-
46564 TRA 0877   P121024 34054 D02316 042316          RPL*Y+Q*LX(SDTTS+LYR+B4)-SAVE LY DOT SMOOTHED
46565 TRA 0878                                *
46566 TRA 0879                                *       SMOOTH RANGE
46567 TRA 0880                                *
46570 TRA 0881   P121025 10014 D02322 042322          ENT*Q*L(SDTTS+RNGP+B4)-
46571 TRA 0882   P121026 05000 A00002 000002          LSH*Q*2-
46572 TRA 0883   P121027 14010 D04757 044757          STR*Q*L(TRTWRK+RNGPS)-
46573 TRA 0884   P121030 27010 D04767 044767          SUB*Q*L(TRTWRK+RNGME)-
46574 TRA 0885   P121031 14050 D04765 044765          STR*Q*CPL(TRTWRK+RNGDV)-SAVE MEASURED DEVIATION
46575 TRA 0886   P121032 11027 D04772 044772          ENT A     U(TRTABS+ALPHA+B7)-  ALPHA FROM TABLE      041673
46576 TRA 08861  P121033 04730 D16232 056232          COM A     W(TRALPHAMIN) YMORE- IF YMORE, USE MIN     041673
46577 TRA 08862  P121034 22127 D04772 044772          MUL       U(TRTABS+ALPHA+B7) SKIP- USE TABLE VALUE   041673
46600 TRA 08863  P121035 22030 D16232 056232          MUL       W(TRALPHAMIN)-         USE MIN. VALUE      041673
46601 TRA 0887   P121036 03000 A00016 000016          RSH*AQ*14D-
46602 TRA 0888   P121037 31010 L04757 044757          ENT*Y-Q*L(TRTWRK+RNGPS)-
46603 TRA 0889   P121040 15014 D02313 042313          STR*A*L(SDTTS+RNGS+B4)-SAVE RANGE SMOOTHED
46604 TRA 0890                                *
46605 TRA 0891                                *       SMOOTH RANGE RATE
46606 TRA 0892                                *
46607 TRA 0893   P121041 10050 D04765 044765          ENT*Q*LX(TRTWRK+RNGDV)-
46610 TRA 0894   P121042 11017 D04772 044772          ENT A     L(TRTABS+BETA+B7)-  BETA FROM TABLE        041673
46611 TRA 08941  P121043 04730 D04766 044766          COM A     W(TRTWRK+TIMEDF) YMORE- IF YMORE, USE MIN  041673
46612 TRA 08942  P121044 22117 D04772 044772          MUL       L(TRTABS+BETA+B7) SKIP- USE TABLE VALUE    041673
46613 TRA 08943  P121045 22030 D04766 044766          MUL       W(TRTWRK+TIMEDF)-    USE MIN. VALUE        041673
46614 TRA 0895   P121046 23030 D04766 044766          DIV*W(TRTWRK+TIMEDF)-
46615 TRA 0896   P121047 01000 A00002 000002          RSH*Q*2-
46616 TRA 0897   P121050 34064 D02315 042315          RPL*Y+Q*UX(SDTTS+RNGR+B4)-SAVE RANGE RATE SMOOTHED
46617 TRA 0898                                *
46620 TRA 0899                                *
46621 TRA 0900                                *       MODE SELECTION SPECIFIES THE RADAR SETTINGS FOR FIRING THE
46622 TRA 0901                                *       NEXT PAIR OF TRACKING BEAMS BASED ON TARGET AMPLITUDE AND
46623 TRA 0902                                *       RANGE, AND CLUTTER CONDITIONS.
46624 TRA 0903                                *
46625 TRA 0904                                *
46626 TRA 0905                                *
46627 TRA 0906                                *       SAVE SMALLER CENTER CHANNEL AMPLITUDE
46630 TRA 0907                                *
46631 TRA 0908   P121051 10350 D04753 044753 TRA45    ENT Q     LX(TRTWRK+CLOGDF) QNEG-                           820
46632 TRA 0909   P121052 31120 D04753 044753          ENT*Y-Q*U(TRTWRK+CLOGUP)*SKIP-LOWER IS SMALLER
46633 TRA 0910   P121053 11020 D04753 044753          ENT*A*U(TRTWRK+CLOGUP)-UPPER IS SMALLER
46634 TRA 0911   P121054 15030 D16201 056201          STR A     W(TRAAMPSAVE)-                                    137
46635 TRA 09111  P121055 10250 D04753 044753          ENT Q     LX(TRTWRK+CLOGDF) QPOS-                        041473
46636 TRA 09112  P121056 14000 A00000 000000          STR Q     Q-          WAS NEG., MAKE IT POS.             041473
46637 TRA 09113  P121057 11024 D02320 042320          ENT A     U(SDTTS+CXMIT+B4)-  WORD WITH CP MODE          041473
46640 TRA 09114  P121060 52400 A76377 076377          SEL CL    76377 AZERO-    KEEP CP BITS ONLY              041473
46641 TRA 09115  P121061 34030 D16201 056201          RPL Y+Q   W(TRAAMPSAVE)- CP WAS USED, SAVE LARGER        041473
46642 TRA 0912   P121062 10000 A00160 000160          ENT Q     VVAMSK-                                           137
46643 TRA 0913   P121063 40014 D02320 042320          ENT LP    L(SDTTS+VVA+B4)-     GET VVA                      137
46644 TRA 0914   P121064 03000 A00042 000042          RSH AQ    VVALSB+30D-          INTO LSBS OF Q               137
46645 TRA 0915   P121065 22000 A00012 000012          MUL       TRMVVA-    CONVERT VVA CODE TO DB                 137
46646 TRA 0916   P121066 26030 D16201 056201          ADD Q     W(TRAAMPSAVE)-    NOW HAVE TRUE AMPLITUDE         137
46647 TRA 0917   P121067 07000 A00036 000036          LSH AQ    30D-                 INTO A REGISTER              137
46650 TRA 0918   P121070 10034 D02326 042326          ENT*Q*W(SDTTS+TAMPS+B4)-
46651 TRA 0919   P121071 14010 D16201 056201          STR Q     L(TRAAMPSAVE)-   TWO BACK AMP. SAVED           041473
46652 TRA 09191  P121072 03000 A00017 000017          RSH AQ    15D-                                           041473
46653 TRA 0920   P121073 11014 D02320 042320          ENT A     L(SDTTS+TDAA+B4)-  WORD WITH TDA BIT           041473
46654 TRA 09201  P121074 52400 A77577 077577          SEL CL    77577 AZERO-      KEEP TDA BIT, IF 0, OFF      041473
46655 TRA 09202  P121075 26030 P77354 137354          ADD Q     3600000-          ADD 15DB TO THIS AMP.        041473
46656 TRA 0921   P121076 14034 D02326 042326          STR*Q*W(SDTTS+TAMPS+B4)-UPDATE HISTORY
46657 TRA 0922                                *
46660 TRA 0923                                *       AVERAGE WITH AMPLITUDES FROM LAST TWO LOOKS
46661 TRA 0924                                *
46662 TRA 0925   P121077 01000 A00017 000017          RSH*Q*15D-
46663 TRA 0926   P121100 30014 D02326 042326          ENT*Y+Q*L(SDTTS+TAMP2+B4)-
46664 TRA 0927   P121101 20020 D04757 044757          ADD*A*U(TRTWRK+TAMP3)-
46665 TRA 0928   P121102 03000 A00036 000036          RSH*AQ*30D-
46666 TRA 0929   P121103 23000 A00003 000003          DIV*3-
46667 TRA 0930   P121104 14020 D04757 044757          STR*Q*U(TRTWRK+TAMPA)-SAVE THIS AVERAGE
46670 TRA 0931                                *                                                                     407
46671 TRA 0932                                *       SAVE CLUTTER MODE LAST FIRED                                  407
46672 TRA 0933                                *                                                                     407
46673 TRA 0934   P121105 10024 D02320 042320          ENT Q     U(SDTTS+CXMIT+B4)-                                407
46674 TRA 0935   P121106 14020 D04760 044760          STR Q     U(TRTWRK+LASTCP)-                                 407
46675 TRA 0936   P121107 14030 D14676 054676          STR Q W(TRVCPSAVE)-  SAVE IN TEMP                     -051072
46676 TRA 0937                                *
46677 TRA 0938                                *       WERE THESE BEAMS FIRED IN CLUTTER MODE
46700 TRA 0939                                *
46701 TRA 0940   P121110 10024 D02320 042320          ENT*Q*U(SDTTS+CP+B4)-
46702 TRA 0941   P121111 40400 A01400 001400          ENT*LP*CPMSK*AZERO-
46703 TRA 0942   P121112 61000 P61151 121151          JP*TRA62-YES
46704 TRA 0943                                *
46705 TRA 0944                                *       IS CLUTTER MODE DEMANDED BY HARDWARE
46706 TRA 0945                                *
46707 TRA 0946                                *       TRA 0618-06216        DELETED-                         -051072
46710 TRA 0947   P121113 11030 D12050 052050          ENT A       W(TRVCPFLAG)-                                   720
46711 TRA 0948   P121114 21500 A00003 000003          SUB A       3 ANOT-    IF ANOT, NOT REQUESTED           720
46712 TRA 0949   P121115 61000 P61540 121540          JP          TRA63-     REQUESTED                        720
46713 TRA 0950                                *
46714 TRA 0951                                *       DELETE INTERRUPT WORD, BIT 14 CHECK HERE, DO LATER     308
46715 TRA 0952                                *
46716 TRA 0953                                *       IN THE ABSENCE OF CLUTTER, MODE SELECTION MAINTAINS THE
46717 TRA 0954                                *       TARGET AMPLITUDE ABOVE A MARGINAL AND BELOW A SATURATION
46720 TRA 0955                                *       LEVEL BY VARYING AMPLIFICATION AND ATTENUATION SETTINGS,
46721 TRA 0956                                *       AND TRANSMIT ENERGY.
46722 TRA 0957                                *
46723 TRA 0958                                *
46724 TRA 0959                                *
46725 TRA 0960                                *       IS AVERAGE TARGET AMPLITUDE MARGINAL
46726 TRA 0961                                *
46727 TRA 0962   P121116 11020 D04757 044757          ENT A       U(TRTWRK+TAMPA)-                     LABEL OFF  577
46730 TRA 0963   P121117 04700 A00074 000074          COM A       TRMNCA2    YMORE-    IF YMORE, MARGINAL         405
46731 TRA 0964   P121120 61000 P61553 121553          JP*TRA71-NO
46732 TRA 0965                                *
46733 TRA 0966                                *       IS TDA AMPLIFICATION APPLIED
```

```
46734  TRA  0967                                  *
46735  TRA  0968  P121121  10014 002320 042320      ENT*Q*L(SDTTS+CRECV+B4)-
46736  TRA  0969  P121122  40500 A00200 000200      ENT*LP*TDAMSK*ANOT-YES
46737  TRA  0970  P121123  11100 A00200 000200      ENT*A*TDAMSK*SKIP-NO
46740  TRA  0971  P121124  40100 A00160 000160      ENT*LP*VVAMSK*SKIP-
46741  TRA  0972                                  *
46742  TRA  0973                                  * APPLY TDA AMPLIFICATION OF 20 DECIBELS
46743  TRA  0974                                  *
46744  TRA  0975  P121125  32114 D02320 042320      STR*A+Q*L(SDTTS+CRECV+B4)*SKIP-
46745  TRA  0976  P121126  03100 A00042 000042      RSH*AQ*VVALSB+3DD*SKIP-
46746  TRA  0977  P121127  61000 P61602 121602      JP*TRA72-SELECT THRESHOLD
46747  TRA  0978                                  *
46750  TRA  0979                                  * DECREMENT VVA BY VALUE BELOW MARGINAL AMPLITUDE
46751  TRA  0980                                  *
46752  TRA  0981  P121130  22000 A00012 000012      MUL*TRMVVA-CONVERT VVA CODE TO DB
46753  TRA  0982  P121131  26020 D04757 044757      ADD*Q*U(TRTWRK+TAMPA)-
46754  TRA  0983                                  *
46755  TRA  0984                                  * IS NEW VVA SETTING LESS THAN ZERO
46756  TRA  0985                                  *
46757  TRA  0986  P121132  27700 A00074 000074      SUB Q      TRMNCA2   ONEG-    IF ONEG., LESS THAN ZERO  405
46760  TRA  0987  P121133  61000 P61574 121574      JP*TRA73-NO
46761  TRA  0988                                  *
46762  TRA  0989                                  * SET VVA TO NO-ATTENUATION
46763  TRA  0990                                  *
46764  TRA  0991  P121134  10040 A77617 777617      ENT*Q*-VVAMSK-
46765  TRA  0992  P121135  57014 D02320 042320      RSE*SU*L(SDTTS+CRECV+B4)-
46766  TRA  0993                                  *
46767  TRA  0994                                  * SELECT NEXT HIGHER TRANSMIT ENERGY
46770  TRA  0995                                  *
46771  TRA  0996  P121136  10024 D02320 042320      ENT*Q*U(SDTTS+CXMIT+B4)-
46772  TRA  0997  P121137  40400 A00063 000063      ENT*LP*TEHPBMSK*AZERO-ASSEMBLE SELECTION INDEX
46773  TRA  0998  P121140  02100 A00003 000003      RSH*A*TELSB-1*SKIP-
*********                                     *****EMU
46774  TRA  0999  P121141  15130 A40163 000163      STR*A*W(SDXB3+SR2)*SKIP-
46775  TRA  1000  P121142  41100 A00003 000003      ADD*LP*HPBMSK*SKIP-
46776  TRA  1001                                  *
46777  TRA  1002                                  * DOES TARGET RANGE LIMIT TRANSMIT ENERGY TO SHORT PULSE
47000  TRA  1003                                  *
47001  TRA  1004  P121143  11114 D02313 042313      ENT*A*L(SDTTS+RNGS+B4)*SKIP-
*********                                     *****EMU
47002  TRA  1005  P121144  15130 A40163 000163      STR*A*W(SDXB3+SR2)*SKIP-
47003  TRA  1006  P121145  04700 A01440 001440      COM*A*TRMINLP*YMORE-
47004  TRA  1007  P121146  11123 D16007 056007      ENT*A*U(TRTGAG6+HIER+B3)*SKIP-
47005  TRA  1008  P121147  61000 P61602 121602      JP*TRA72-YES
47006  TRA  1009  P121150  61000 P61564 121564      JP*TRA77-
47007  TRA  1010                                  *
47010  TRA  1011                                  * ERE THESE BEAMS FIRED IN RGPD CLUTTER MODE
47011  TRA  1012                                  *
47012  TRA  1013  P121151  10000 A60000 060000 TRA62 ENT*Q*CCINMSK-
47013  TRA  1014  P121152  04700 A01400 001400      COM*A*TRMRGPD*YMORE-
47014  TRA  1015  P121153  61000 P61526 121526      JP*TRA81-YES
47015  TRA  1016                                  *
47016  TRA  1017                                  * IS LOWER MTI CLUTTER MODE DEMANDED BY BOTH BEAMS
47017  TRA  1018                                  *
47020  TRA  1019                                  * TRA 0690-069214    DELETED                  -051072
47021  TRA  1020  P121154  11730 D12050 052050      ENT A   W(TRVCPFLAG) ANEG-  NEG. SAYS DOWN        720
47022  TRA  1021  P121155  61000 P61536 121536      JP         TRA82-   DO NOT GO DOWN              720
47023  TRA  1022  P121156  10024 D02320 042320      ENT Q   U(SDTTS+CXMIT+B4)-                     041973
47024  TRA  1023  P121157  61000 P61564 121564      JP         TRA77-  SELECT SP NO CLUTTER PROCESSING 041673
47025  TRA  1029                                  *
47026  TRA  1030                                  * SELECT LOWER MTI CLUTTER MODE
47027  TRA  1031                                  *
47030  TRA  1032  P121160  50000 A00001 000001 TRA85 SEL*SET*TRMTI1VI-SET LOWEST VIDEO INTEGRATION LEVEL ALLOWED
47031  TRA  1033                                  *
47032  TRA  1034                                  * SET CLUTTER MODE INTO OUTPUT CONTROL WORD IMAGE
47033  TRA  1035                                  *
47034  TRA  1036  P121161  41000 A00010 000010 TRA84 ADD*LP*SRMSK-RETAIN SIZE REQUEST INDICATOR SETTING
47035  TRA  1037  P121162  15024 C02320 042320      STR A   U(SDTTS+CXMIT+B4)- CHG WAS REMOVE SKIP    407
47036  TRA  1038                                  *                                                   407
47037  TRA  1039                                  * DELETE TRA 0709 THRU TRA 0713 - PUT EARLIER THE CODE 407
47040  TRA  1040                                  * THAT SAVES CLUTTER MODE LAST FIRED                 407
47041  TRA  1041                                  *                                                   407
47042  TRA  1041                                  * IF TRACK IS TENTATIVE AND CP WAS USED LAST TIME, 041473
47043  TRA  1042                                  * USE SAME IPP THAT WAS USED LAST TIME              041473
47044  TRA  1043                                  *                                                 041473
47045  TRA  1044  P121163  11020 D04760 044760 TRA83 ENT A   U(TRTWRK+LASTCP)-  CP LAST USED         041473
47046  TRA  1045  P121164  52500 A76377 076377      SEL CL  76377 ANOT-         KEEP CP BITS ONLY    041473
47047  TRA  1046  P121165  61000 P61213 121213      JP         TRA8303-         NO CP, PROCESS IPP   041473
47050  TRA  1047  P121166  11600 C04770 044770      ENT A   UX(TRTWRK+STATUS) APOS- IF APOS, NOT TENT. 041473
47051  TRA  1048  P121167  61000 P61373 121373      JP         TRA8812-         USE OLD IPP          041473
47052  TRA  1042                                  *
47053  TRA  1043                                  * LOCATE CLUTTER INTER-PULSE PERIODS BASED ON RADIAL VELOCITY
47054  TRA  1044                                  *
47055  TRA  1045  P121170  10000 A01400 001400      ENT G   1400-              CP BITS MASK          041773
47056  TRA  1046  P121171  40520 D04760 044760      ENT LP  U(TRTWRK+LASTCP) ANOT-                   041773
47057  TRA  1047  P121172  61000 P61250 121250      JP         TRA8312-  CLUTTER NOT USED LAST TIME  041773
47060  TRA  1048  P121173  11000 A01274 001274      ENT A   1274-  700D , MTI RANGE                  041773
47061  TRA  1049  P121174  04614 D02322 042322      COM A   L(SDTTS+RNGP+B4) YLESS- IF YLESS, MTI PATH 041773
47062  TRA  1050  P121175  61000 P61213 121213      JP         TRA8303-  GO SEE IF RGPD LAST TIME    041773
47063  TRA  1051  P121176  11000 A00001 000001      ENT A   1-               MTI PATH                041773
47064  TRA  1052  P121177  04714 D02317 042317      COM A   L(SDTTS+J+B4) YMORE- IF YMORE, MISS GT 1 041773
47065  TRA  1053  P121200  61000 P61250 121250      JP         TRA8312-  MISS IS 0 OR 1              041773
47066  TRA  1054  P121201  11514 D02333 042333      ENT A   L(SDTTS+JT+B4) ANOT- IF ANOT, TOTAL MISS 041773
47067  TRA  1055  P121202  61000 P61373 121373      JP         TRA8812-  NOT TOTAL MISS, USE SAME IPP 041773
47070  TRA  1056  P121203  10000 A01600 001600      ENT Q   1600-  TOTAL MISS, GET DV, FD MASK       041773
47071  TRA  1057  P121204  40424 D02313 042313      ENT LP  U(SDTTS+FLAGS+B4) AZERO-                 041773
47072  TRA  1058  P121205  61000 P61211 121211      JP         TRA8305-         USING KLUDGE IPP     041773
47073  TRA  1059  P121206  65000 P61217 121217      BJP        TRA8400-  NOT USING KLUDGE IPP, GET ONE 041773
47074  TRA  1060  P121207  31424 D02323 042323      ENT Y-Q U(SDTTS+ERIPP+B4) AZERO- IF AO, SAME IPP 041773
47075  TRA  1061  P121210  61000 P61372 121372      JP         TRA8801-          GO STORE IPP        041773
47076  TRA  1062  P121211  65000 P61217 121217 TRA8305 BJP    TRA8400-    GET ANOTHER IPP           041773
47077  TRA  1063  P121212  61000 P61372 121372      JP         TRA8801-          GO STORE IPP        041773
47100  TRA  1064  P121213  40020 D04760 044760 TRA8303 ENT LP U(TRTWRK+LASTCP)-                     041773
47101  TRA  1065  P121214  21400 A01400 001400      SUB A   1400 AZERO-        IF AZERO, RGPD       041773
47102  TRA  1066  P121215  61000 P61250 121250      JP         TRA8312-  GO SET UP NEW VELOCITY     041773
47103  TRA  1067  P121216  61000 P61234 121234      JP         TRA8311-  GO CHECK FILTER FLAG       041773
```

What is claimed is:

1. In a radar system having a buffer circuit and a receiver, the system providing a pair of sequentially switched radar beams, a radar detector comprising in combination:

switching means electrically connected to the buffer circuit, for switching between two offset control levels provided by said radar detector;

a summing circuit, connected to the switching means, responsive to received signals processed by the radar system and to a signal output from the switching means;

a comparator circuit, having an input connection thereto from the summing circuit and having an output connection therefrom to the buffer circuit; and a mean level detector circuit, the input of which is connected to the output of the receiver and the output of which is connected to an input of the summing circuit.

2. The invention as stated in claim 1, wherein the switching means switches said pair of radar beams with respect to angular elevation.

3. The invention as stated in claim 2, wherein the switching means enables the detection level attributable to either of the beams to be greater in magnitude by about three decibels.

4. The invention as stated in claim 1, wherein voltage output from the mean level detector circuit and the voltage outputs from the switching means are summed by the summing circuit to provide two different threshold levels to provide the different magnitudes of the switched beam pair.

5. The invention as stated in claim 1, including a radar buffer responsive to output signals from the comparator circuit and providing switching control for the switching means.

6. The invention as stated in claim 1, wherein said radar detector provides equal threshold levels and consequently signal levels of said sequentially switched pair of radar beams for enabling tracking at elevation angles higher than the low elevation angles.

7. The invention as stated in claim 1, wherein the system inhibits the lower of the pair of switched beams from being less than 0.44° in angular elevation.

8. The invention as stated in claim 1, wherein the system inhibits the center of the pair of beams from being less than 0.56° in angular elevation.

9. The invention as stated in claim 5, including:

an exciter responsive to output signals from the radar buffer for providing a plurality of discrete frequencies;

a radar transmitter responsive to output signals from the exciter for amplification of the discrete frequencies; and a radar antenna responsive in elevation control to signals from the radar transmitter over an elevation range of 80°.

10. The invention as stated in claim 5, including a pitch and roll stabilization unit for providing input signals to the radar buffer.

11. The invention as stated in claim 5, including a digital computer for providing a plurality of ten bit words to the radar buffer so as to control elevation, and being responsive to detection data and stabilization data provided through said radar buffer.

12. The invention as stated in claim 9, including a radar receiver responsive to received signals provided by the radar antenna.

13. The invention as stated in claim 12, wherein the signals received by the radar system are provided as outputs from the radar receiver, and as inputs to the mean level detector circuit and to the comparator circuit.

14. A method for controlling of threshold levels and hence the required signal levels of a pair of sequentially switched radar beams of a radar system having a buffer circuit, comprising the steps of:

switching, in a predetermined time sequence, the threshold levels;

comparing the switched threshold levels with signals received by the system; and feeding the compared signals to the buffer circuit.

15. The invention as stated in claim 14, including the further step of controlling the sequency of switching by a computer.

16. The invention as stated in claim 14, where in the step of switching the detection level between said beams is greater in magnitude by about three decibels.

17. The invention as stated in claim 14, wherein the step of switching the lower of said beams is controlled to inhibit its angular elevation from falling below 0.44°.

18. The invention as stated in claim 14, wherein the step of switching the center of the pair of beams is controlled to inhibit its angular elevation from being less than 0.56°.

19. The invention as stated in claim 15, including the further step of programming the computer for execution in proper order of the foregoing steps.

* * * * *